US012585817B2

(12) United States Patent
Madhavan et al.

(10) Patent No.: US 12,585,817 B2
(45) Date of Patent: Mar. 24, 2026

(54) DATA LIFECYCLE DISCOVERY AND MANAGEMENT

(71) Applicant: PAYPAL, INC., San Jose, CA (US)

(72) Inventors: Deepa Madhavan, Chennai (IN); Sudheer Kilari, Chennai (IN); Meena Nagarajan, Chennai (IN); Alejandro Picos, New York, NY (US); Vladimir Bacvanski, Portola Valley, CA (US); Arunkumar Kannimar Ponnaiah, Chennai (IN); Srinivasabharathi Selvaraj, Chennai (IN)

(73) Assignee: PayPal, Inc., San Jose, CA (US)

( * ) Notice: Subject to any disclaimer, the term of this patent is extended or adjusted under 35 U.S.C. 154(b) by 267 days.

(21) Appl. No.: 18/242,873

(22) Filed: Sep. 6, 2023

(65) Prior Publication Data
US 2024/0045991 A1 Feb. 8, 2024

Related U.S. Application Data

(63) Continuation of application No. 17/127,367, filed on Dec. 18, 2020, now Pat. No. 11,893,130.

(51) Int. Cl.
*G06F 21/62* (2013.01)
*G06F 21/60* (2013.01)
(Continued)

(52) U.S. Cl.
CPC ........ *G06F 21/6245* (2013.01); *G06F 21/604* (2013.01); *G06N 20/00* (2019.01); *G06Q 50/265* (2013.01)

(58) Field of Classification Search
CPC .... G06F 21/6245; G06F 21/604; G06F 21/31; G06N 20/00; G06N 7/01; G06Q 50/265
See application file for complete search history.

(56) References Cited

U.S. PATENT DOCUMENTS 7,693,877 B1   4/2010   Zasman
9,967,285 B1   5/2018   Rossman et al.
(Continued)

OTHER PUBLICATIONS

Extended Search Report from EU application No. 21907925.8, dated Oct. 2, 2024, 7 pp.
(Continued)

*Primary Examiner* — Joseph P Hirl
*Assistant Examiner* — Aayush Aryal
(74) *Attorney, Agent, or Firm* — Greenberg Traurig, LLP

(57) ABSTRACT

Techniques for data lifecycle discovery and management are presented. Data lifecycle discovery platform (DLDP) can identify data of users, data type, and language of data stored in data stores (DSs) of entities based on scanning of data from databases. DLDP determines compliance of DLDP and DSs with obligations relating to data protection arising out of jurisdictional laws or agreements. DLDP generates rules to facilitate complying with and enforcing laws and agreements. DLDP can determine, and present to authorized users, risk scores relating to levels of compliance of the DLDP, associated platforms, or entities, risk indicator metrics, or a privacy health index of the organization associated with DLDP. DLDP can manage user rights regarding data, and access to data in DSs and information relating thereto stored in secure data store of DLDP. DLDP can remediate issues involving anomalies indicating non-compliance. DLDP can utilize machine learning to enhance various functions of DLDP.

20 Claims, 37 Drawing Sheets

(51) Int. Cl.
   *G06N 20/00*      (2019.01)
   *G06Q 50/26*      (2024.01)

(56)            References Cited

U.S. PATENT DOCUMENTS

| | | | | |
|---|---|---|---|---|
| 10,242,228 | B2 * | 3/2019 | Barday | H04L 63/20 |
| 10,282,557 | B1 | 5/2019 | Pore | |
| 10,484,429 | B1 | 11/2019 | Fawcett et al. | |
| 10,706,447 | B2 * | 7/2020 | Barday | G06Q 50/265 |
| 10,735,451 | B1 * | 8/2020 | Baker | H04L 63/20 |
| 10,979,461 | B1 | 4/2021 | Cervantez et al. | |
| 11,223,586 | B1 | 1/2022 | Rosenberg | |
| 11,388,195 | B1 | 7/2022 | McCaffery et al. | |
| 11,416,870 | B2 | 8/2022 | Maung et al. | |
| 11,563,778 | B1 | 1/2023 | Vanloo et al. | |
| 11,586,700 | B2 | 2/2023 | Whitney et al. | |
| 12,026,704 | B2 * | 7/2024 | Morse | G06Q 20/385 |
| 2003/0014418 | A1 | 1/2003 | Adler et al. | |
| 2003/0014654 | A1 | 1/2003 | Adler et al. | |
| 2004/0098285 | A1 | 5/2004 | Breslin et al. | |
| 2005/0010819 | A1 | 1/2005 | Williams et al. | |
| 2005/0160480 | A1 | 7/2005 | Birt et al. | |
| 2005/0187963 | A1 | 8/2005 | Markin | |
| 2005/0257267 | A1 | 11/2005 | Williams et al. | |
| 2007/0156696 | A1 | 7/2007 | Lim | |
| 2008/0033775 | A1 | 2/2008 | Dawson et al. | |
| 2008/0097843 | A1 | 4/2008 | Menon et al. | |
| 2009/0055267 | A1 | 2/2009 | Roker | |
| 2010/0121773 | A1 | 5/2010 | Currier et al. | |
| 2013/0041966 | A1 | 2/2013 | Duan | |
| 2013/0326579 | A1 | 12/2013 | Bhatti et al. | |
| 2014/0173684 | A1 | 6/2014 | McQuay et al. | |
| 2014/0282848 | A1 | 9/2014 | Patwardhan et al. | |
| 2015/0113663 | A1 | 4/2015 | Sher-Jan et al. | |
| 2015/0293900 | A1 | 10/2015 | Saadi | |
| 2016/0021133 | A1 | 1/2016 | Sher-Jan et al. | |
| 2016/0246991 | A1 | 8/2016 | Bell et al. | |
| 2017/0061559 | A1 | 3/2017 | Ehrhardt et al. | |
| 2017/0161336 | A1 | 6/2017 | Dubey et al. | |
| 2017/0193239 | A1 | 7/2017 | Chari et al. | |
| 2017/0236129 | A1 | 8/2017 | Kholkar et al. | |
| 2017/0249644 | A1 | 8/2017 | DiMaggio et al. | |
| 2017/0330197 | A1 | 11/2017 | DiMaggio et al. | |
| 2018/0039794 | A1 | 2/2018 | Sher-Jan | |
| 2018/0039990 | A1 * | 2/2018 | Lindemann | G06V 40/19 |
| 2018/0069899 | A1 | 3/2018 | Lang et al. | |
| 2018/0189797 | A1 | 7/2018 | Ravi | |
| 2018/0253661 | A1 * | 9/2018 | Strauss | G06N 20/00 |
| 2019/0018968 | A1 | 1/2019 | Ronca et al. | |
| 2019/0138734 | A1 | 5/2019 | Sher-Jan et al. | |
| 2019/0190953 | A1 | 6/2019 | Feintuch | |
| 2019/0272386 | A1 | 9/2019 | Ley | |
| 2019/0303611 | A1 | 10/2019 | Lefor et al. | |
| 2019/0332494 | A1 | 10/2019 | Natanzon et al. | |
| 2019/0347429 | A1 | 11/2019 | Jean-Louis | |
| 2020/0053090 | A1 * | 2/2020 | Kliger | H04L 63/107 |
| 2020/0143102 | A1 | 5/2020 | Ziraknejad et al. | |
| 2020/0193058 | A1 | 6/2020 | Vaidhyanathan et al. | |
| 2020/0202268 | A1 * | 6/2020 | Retna | G06N 20/00 |
| 2020/0210916 | A1 * | 7/2020 | Brannon | G06Q 10/067 |
| 2020/0293675 | A1 | 9/2020 | Antonatos et al. | |
| 2020/0311631 | A1 * | 10/2020 | Hecht | G06Q 10/063114 |
| 2020/0320216 | A1 | 10/2020 | Piecko | |
| 2020/0320418 | A1 | 10/2020 | Aminian et al. | |
| 2020/0342119 | A1 * | 10/2020 | Yared | H04L 9/0643 |
| 2020/0356697 | A1 | 11/2020 | Brannon et al. | |
| 2020/0364369 | A1 | 11/2020 | Brannon et al. | |
| 2020/0382534 | A1 * | 12/2020 | Simanovsky | G06F 21/552 |
| 2021/0014214 | A1 | 1/2021 | Ford et al. | |
| 2021/0026982 | A1 | 1/2021 | Amarendran et al. | |
| 2021/0042428 | A1 | 2/2021 | Daftary et al. | |
| 2021/0049527 | A1 * | 2/2021 | Beaumont | G06Q 50/265 |
| 2021/0073461 | A1 | 3/2021 | Heckel et al. | |
| 2021/0081567 | A1 | 3/2021 | Park et al. | |
| 2021/0119764 | A1 | 4/2021 | Meghji | |
| 2021/0141924 | A1 | 5/2021 | Gorman et al. | |
| 2021/0182413 | A1 | 6/2021 | Agarwal | |
| 2021/0182996 | A1 | 6/2021 | Cella et al. | |
| 2021/0184999 | A1 | 6/2021 | Klink | |
| 2021/0256163 | A1 | 8/2021 | Fleming et al. | |
| 2021/0320888 | A1 | 10/2021 | Greenberg | |
| 2021/0334402 | A1 | 10/2021 | Detchemendy | |
| 2021/0397735 | A1 | 12/2021 | Samatov et al. | |
| 2022/0019671 | A1 | 1/2022 | Boone et al. | |
| 2022/0050919 | A1 | 2/2022 | Childress et al. | |
| 2022/0067669 | A1 * | 3/2022 | Griffin | G16Y 40/20 |
| 2022/0100955 | A1 | 3/2022 | Law et al. | |
| 2022/0179993 | A1 | 6/2022 | Vax et al. | |

OTHER PUBLICATIONS

International Preliminary Report on Patentability for Application No. PCT/US2021/064127 mailed on Jun. 29, 2023, 10 pages.
Liu L., et al., "A Framework for Database Auditing," 2009 Fourth International Conference on Computer Sciences and Convergence Information Technology, 2009, pp. 982-986.
Non-Final Office Action for U.S. Appl. No. 17/127,367, mailed on Dec. 6, 2022, 18 pages.
Office Action for U.S. Appl. No. 17/127,368, mailed on May 24, 2023, 16 pages.
Non-final Office Action from U.S. Appl. No. 17/127,368, dated Jun. 20, 2024, 15 pp.
Final Office Action from U.S. Appl. No. 17/127,368, dated Oct. 24, 2023, 14 pp.
Non-final Office Action from U.S. Appl. No. 17/127,368, dated Feb. 27, 2024, 15 pp.
Final Office Action for U.S. Appl. No. 17/127,400, mailed on Apr. 6, 2023, 41 pages.
"General Data Protection Regulation GDPR," https://gdpr-info.eu/, Retrieved on Mar. 15, 2021, 7 pages.
International Search Report and Written Opinion for Application No. PCT/US2021/064127, dated Mar. 16, 2022, 17 pages.
Nicole O., "The Eight User Rights Under the GDPR," https://www.privacypolicies.com/blog/gdpr-eight-user-rights/, Retrieved on Mar. 15, 2021, 15 pages.
Non-Final Office Action for U.S. Appl. No. 17/127,400, mailed on Oct. 18, 2022, 34 pages.
Non-final Office Action for U.S. Appl. No. 17/127,400, mailed on Sep. 7, 2023, 45 pages.
Robert B., "8 User Rights Under the GDPR," https://www.termsfeed.com/blog/gdpr-8-user-rights/, Retrieved on Mar. 15, 2021, 5 pages.
Final Office Action from U.S. Appl. No. 17/127,400, dated Jan. 8, 2024, 47 pp..

\* cited by examiner

2600

2604                    2606                    2602

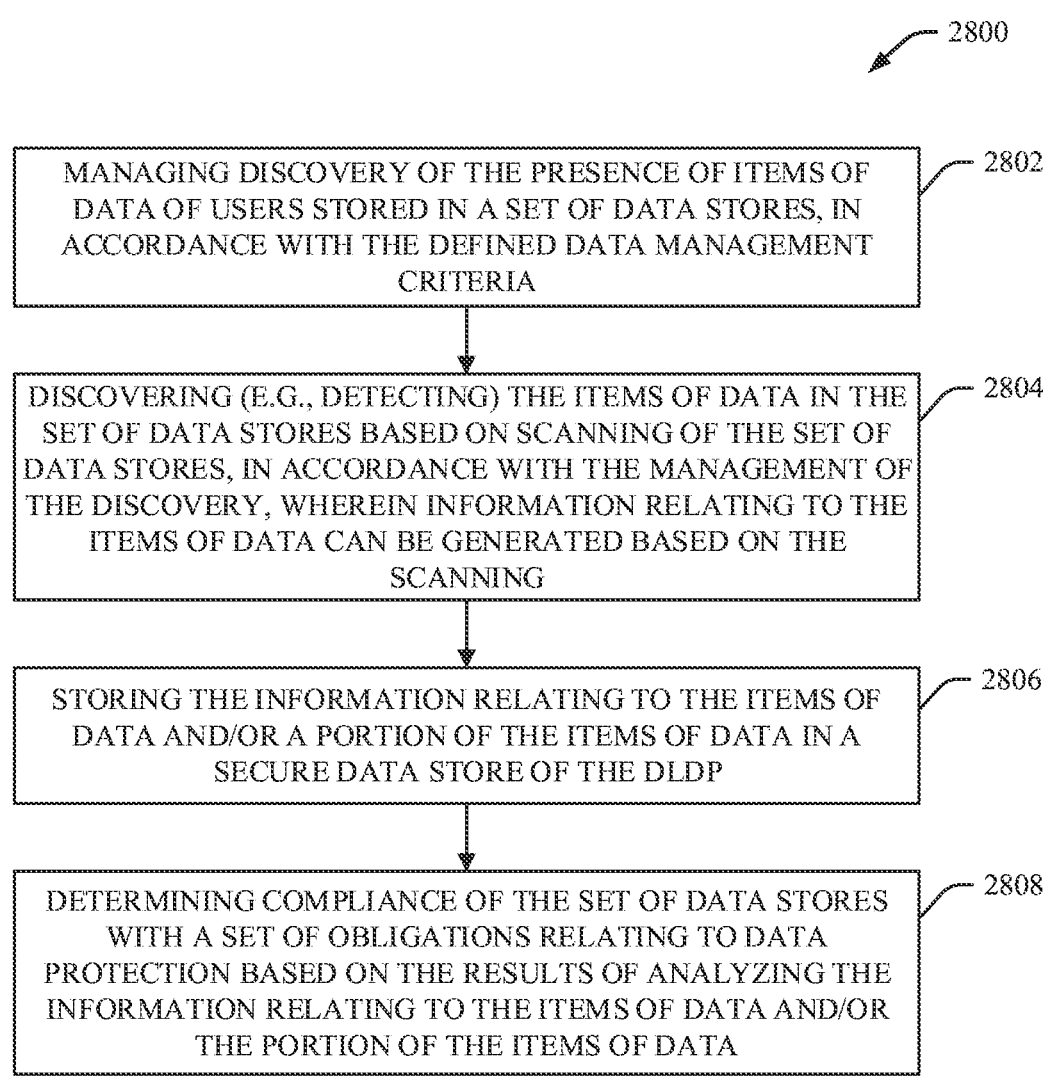

2800

MANAGING DISCOVERY OF THE PRESENCE OF ITEMS OF DATA OF USERS STORED IN A SET OF DATA STORES, IN ACCORDANCE WITH THE DEFINED DATA MANAGEMENT CRITERIA — 2802

DISCOVERING (E.G., DETECTING) THE ITEMS OF DATA IN THE SET OF DATA STORES BASED ON SCANNING OF THE SET OF DATA STORES, IN ACCORDANCE WITH THE MANAGEMENT OF THE DISCOVERY, WHEREIN INFORMATION RELATING TO THE ITEMS OF DATA CAN BE GENERATED BASED ON THE SCANNING — 2804

STORING THE INFORMATION RELATING TO THE ITEMS OF DATA AND/OR A PORTION OF THE ITEMS OF DATA IN A SECURE DATA STORE OF THE DLDP — 2806

DETERMINING COMPLIANCE OF THE SET OF DATA STORES WITH A SET OF OBLIGATIONS RELATING TO DATA PROTECTION BASED ON THE RESULTS OF ANALYZING THE INFORMATION RELATING TO THE ITEMS OF DATA AND/OR THE PORTION OF THE ITEMS OF DATA — 2808

FIG. 28

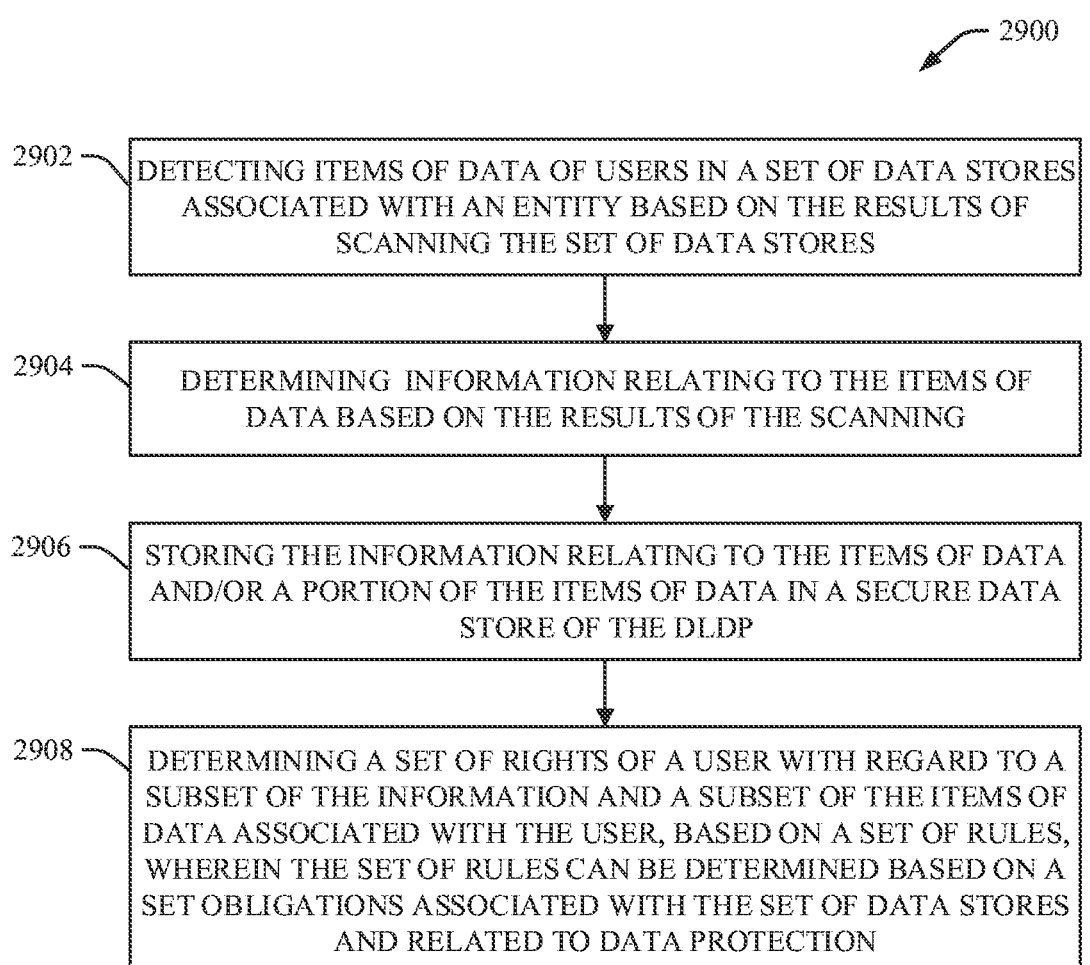

2900

2902 — DETECTING ITEMS OF DATA OF USERS IN A SET OF DATA STORES ASSOCIATED WITH AN ENTITY BASED ON THE RESULTS OF SCANNING THE SET OF DATA STORES

2904 — DETERMINING INFORMATION RELATING TO THE ITEMS OF DATA BASED ON THE RESULTS OF THE SCANNING

2906 — STORING THE INFORMATION RELATING TO THE ITEMS OF DATA AND/OR A PORTION OF THE ITEMS OF DATA IN A SECURE DATA STORE OF THE DLDP

2908 — DETERMINING A SET OF RIGHTS OF A USER WITH REGARD TO A SUBSET OF THE INFORMATION AND A SUBSET OF THE ITEMS OF DATA ASSOCIATED WITH THE USER, BASED ON A SET OF RULES, WHEREIN THE SET OF RULES CAN BE DETERMINED BASED ON A SET OBLIGATIONS ASSOCIATED WITH THE SET OF DATA STORES AND RELATED TO DATA PROTECTION

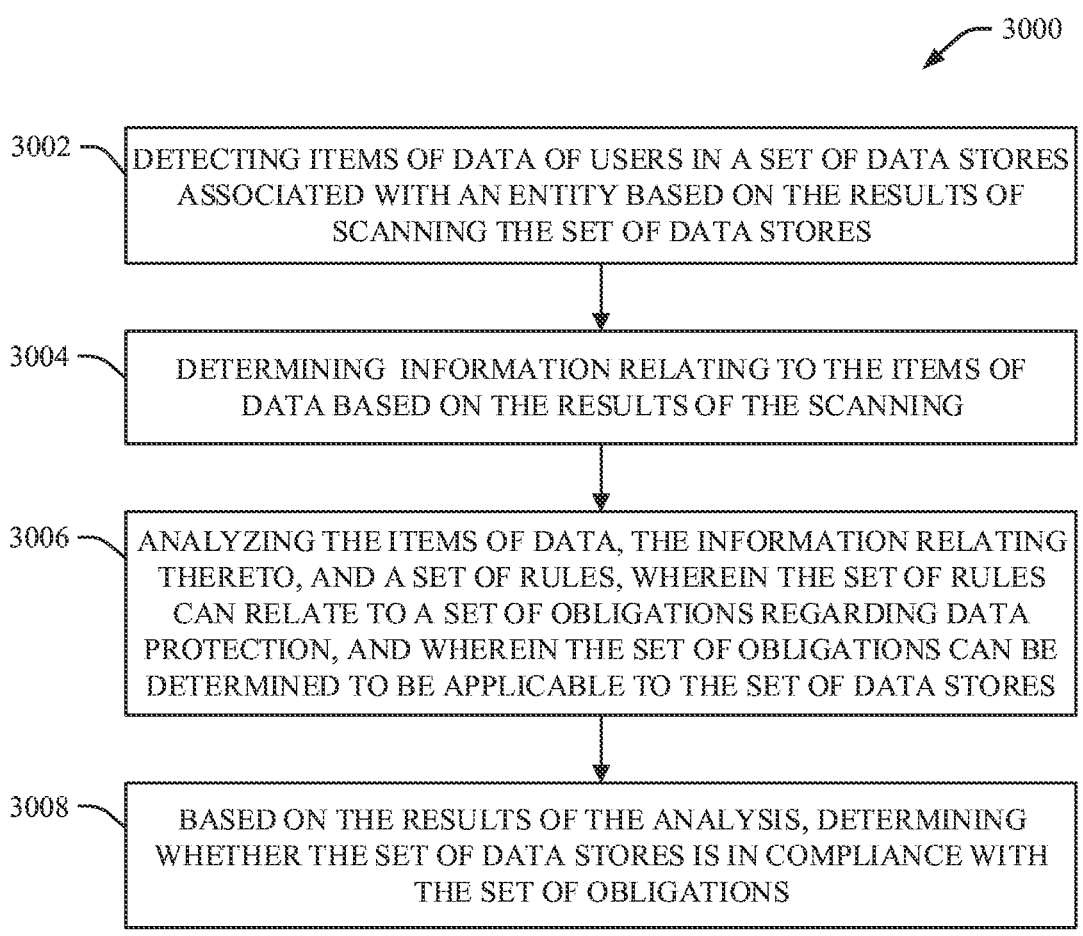

3002 — DETECTING ITEMS OF DATA OF USERS IN A SET OF DATA STORES ASSOCIATED WITH AN ENTITY BASED ON THE RESULTS OF SCANNING THE SET OF DATA STORES

3004 — DETERMINING INFORMATION RELATING TO THE ITEMS OF DATA BASED ON THE RESULTS OF THE SCANNING

3006 — ANALYZING THE ITEMS OF DATA, THE INFORMATION RELATING THERETO, AND A SET OF RULES, WHEREIN THE SET OF RULES CAN RELATE TO A SET OF OBLIGATIONS REGARDING DATA PROTECTION, AND WHEREIN THE SET OF OBLIGATIONS CAN BE DETERMINED TO BE APPLICABLE TO THE SET OF DATA STORES

3008 — BASED ON THE RESULTS OF THE ANALYSIS, DETERMINING WHETHER THE SET OF DATA STORES IS IN COMPLIANCE WITH THE SET OF OBLIGATIONS

FIG. 30

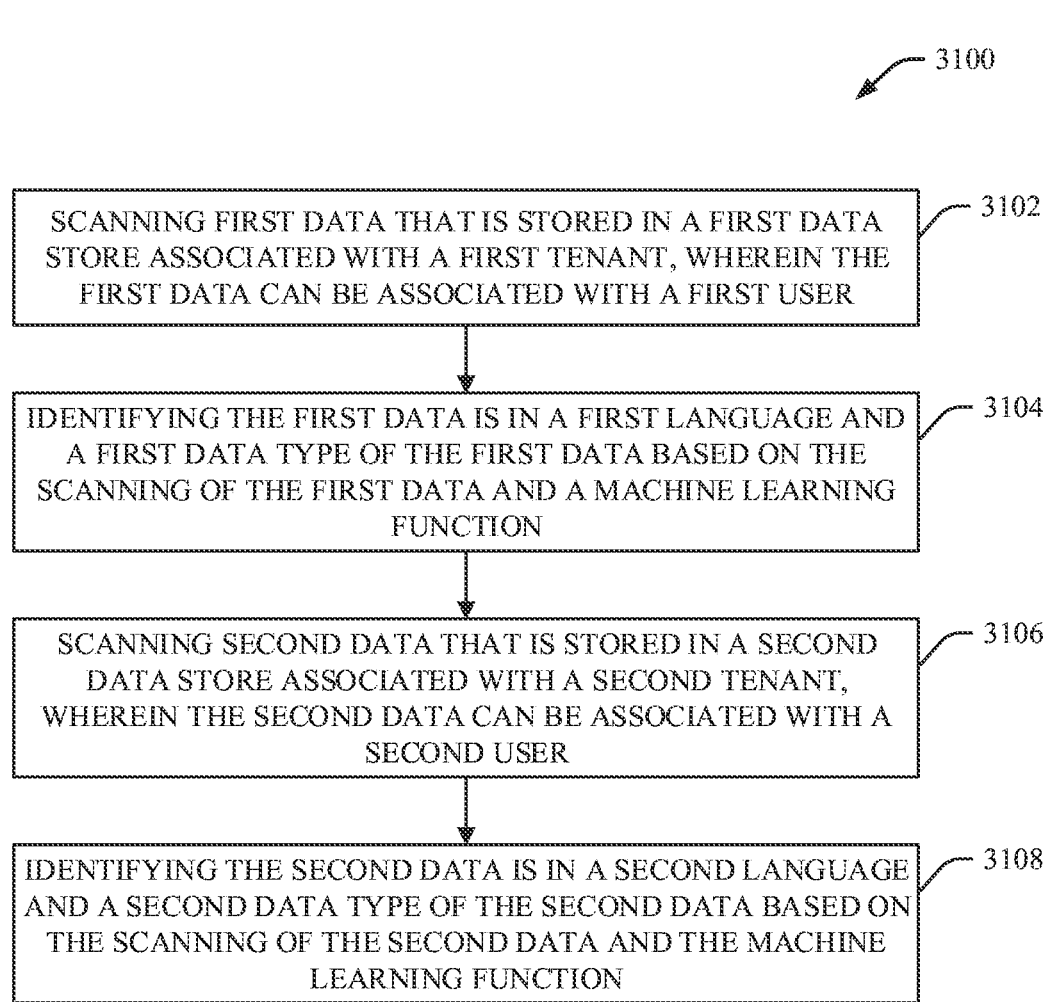

3100

SCANNING FIRST DATA THAT IS STORED IN A FIRST DATA STORE ASSOCIATED WITH A FIRST TENANT, WHEREIN THE FIRST DATA CAN BE ASSOCIATED WITH A FIRST USER — 3102

IDENTIFYING THE FIRST DATA IS IN A FIRST LANGUAGE AND A FIRST DATA TYPE OF THE FIRST DATA BASED ON THE SCANNING OF THE FIRST DATA AND A MACHINE LEARNING FUNCTION — 3104

SCANNING SECOND DATA THAT IS STORED IN A SECOND DATA STORE ASSOCIATED WITH A SECOND TENANT, WHEREIN THE SECOND DATA CAN BE ASSOCIATED WITH A SECOND USER — 3106

IDENTIFYING THE SECOND DATA IS IN A SECOND LANGUAGE AND A SECOND DATA TYPE OF THE SECOND DATA BASED ON THE SCANNING OF THE SECOND DATA AND THE MACHINE LEARNING FUNCTION — 3108

FIG. 31

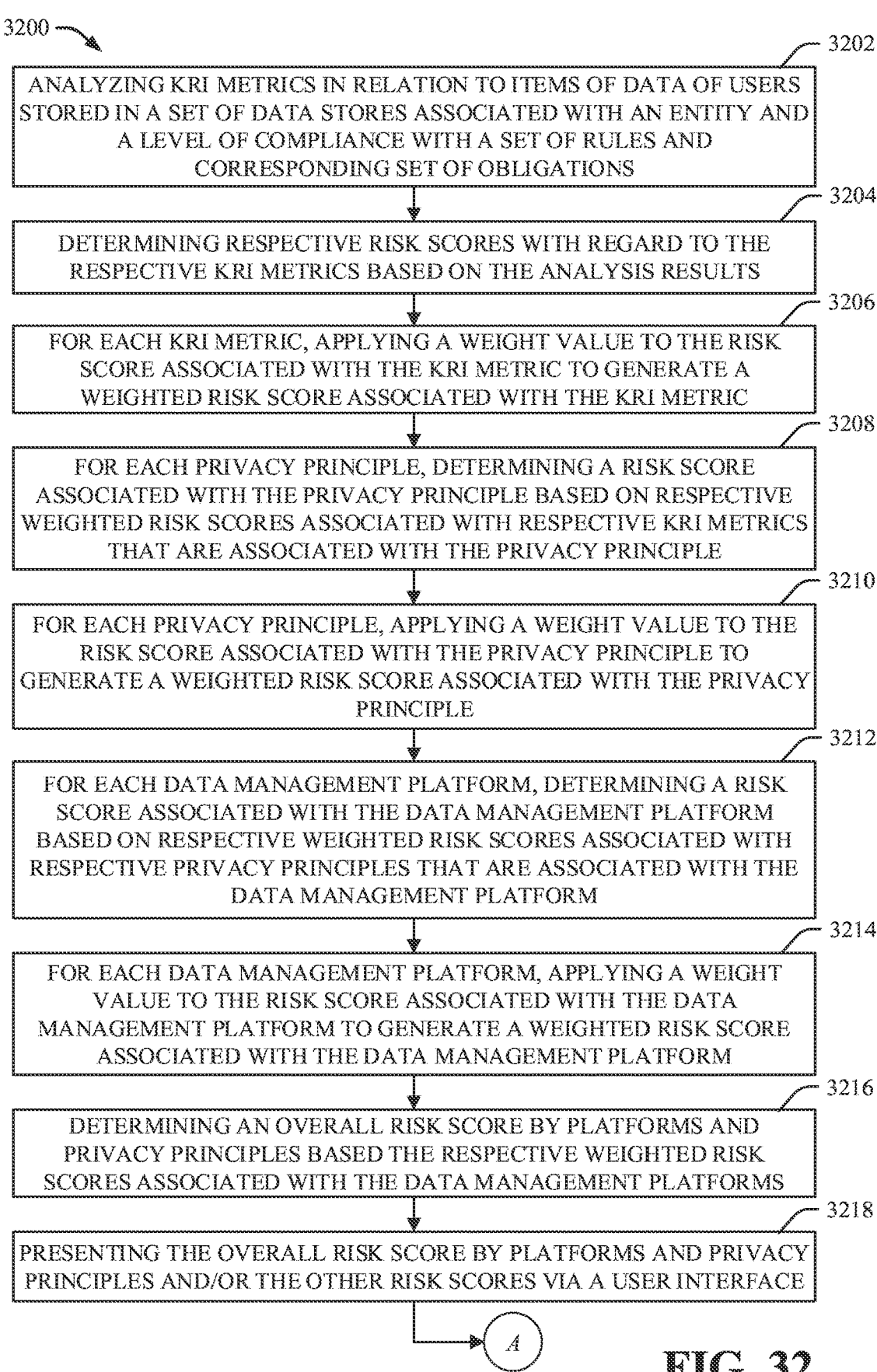

3200

3202

ANALYZING KRI METRICS IN RELATION TO ITEMS OF DATA OF USERS STORED IN A SET OF DATA STORES ASSOCIATED WITH AN ENTITY AND A LEVEL OF COMPLIANCE WITH A SET OF RULES AND CORRESPONDING SET OF OBLIGATIONS

3204

DETERMINING RESPECTIVE RISK SCORES WITH REGARD TO THE RESPECTIVE KRI METRICS BASED ON THE ANALYSIS RESULTS

3206

FOR EACH KRI METRIC, APPLYING A WEIGHT VALUE TO THE RISK SCORE ASSOCIATED WITH THE KRI METRIC TO GENERATE A WEIGHTED RISK SCORE ASSOCIATED WITH THE KRI METRIC

3208

FOR EACH PRIVACY PRINCIPLE, DETERMINING A RISK SCORE ASSOCIATED WITH THE PRIVACY PRINCIPLE BASED ON RESPECTIVE WEIGHTED RISK SCORES ASSOCIATED WITH RESPECTIVE KRI METRICS THAT ARE ASSOCIATED WITH THE PRIVACY PRINCIPLE

3210

FOR EACH PRIVACY PRINCIPLE, APPLYING A WEIGHT VALUE TO THE RISK SCORE ASSOCIATED WITH THE PRIVACY PRINCIPLE TO GENERATE A WEIGHTED RISK SCORE ASSOCIATED WITH THE PRIVACY PRINCIPLE

3212

FOR EACH DATA MANAGEMENT PLATFORM, DETERMINING A RISK SCORE ASSOCIATED WITH THE DATA MANAGEMENT PLATFORM BASED ON RESPECTIVE WEIGHTED RISK SCORES ASSOCIATED WITH RESPECTIVE PRIVACY PRINCIPLES THAT ARE ASSOCIATED WITH THE DATA MANAGEMENT PLATFORM

3214

FOR EACH DATA MANAGEMENT PLATFORM, APPLYING A WEIGHT VALUE TO THE RISK SCORE ASSOCIATED WITH THE DATA MANAGEMENT PLATFORM TO GENERATE A WEIGHTED RISK SCORE ASSOCIATED WITH THE DATA MANAGEMENT PLATFORM

3216

DETERMINING AN OVERALL RISK SCORE BY PLATFORMS AND PRIVACY PRINCIPLES BASED THE RESPECTIVE WEIGHTED RISK SCORES ASSOCIATED WITH THE DATA MANAGEMENT PLATFORMS

3218

PRESENTING THE OVERALL RISK SCORE BY PLATFORMS AND PRIVACY PRINCIPLES AND/OR THE OTHER RISK SCORES VIA A USER INTERFACE

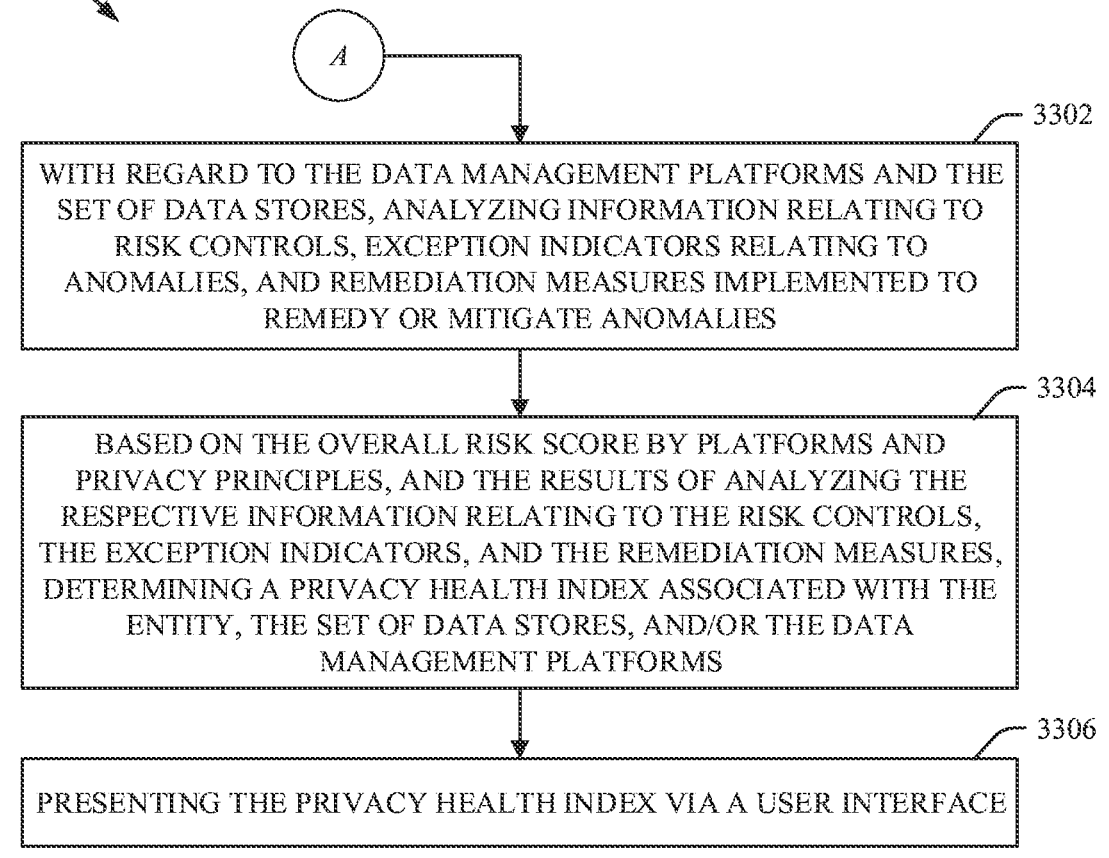

3300

A

WITH REGARD TO THE DATA MANAGEMENT PLATFORMS AND THE SET OF DATA STORES, ANALYZING INFORMATION RELATING TO RISK CONTROLS, EXCEPTION INDICATORS RELATING TO ANOMALIES, AND REMEDIATION MEASURES IMPLEMENTED TO REMEDY OR MITIGATE ANOMALIES — 3302

BASED ON THE OVERALL RISK SCORE BY PLATFORMS AND PRIVACY PRINCIPLES, AND THE RESULTS OF ANALYZING THE RESPECTIVE INFORMATION RELATING TO THE RISK CONTROLS, THE EXCEPTION INDICATORS, AND THE REMEDIATION MEASURES, DETERMINING A PRIVACY HEALTH INDEX ASSOCIATED WITH THE ENTITY, THE SET OF DATA STORES, AND/OR THE DATA MANAGEMENT PLATFORMS — 3304

PRESENTING THE PRIVACY HEALTH INDEX VIA A USER INTERFACE — 3306

FIG. 33

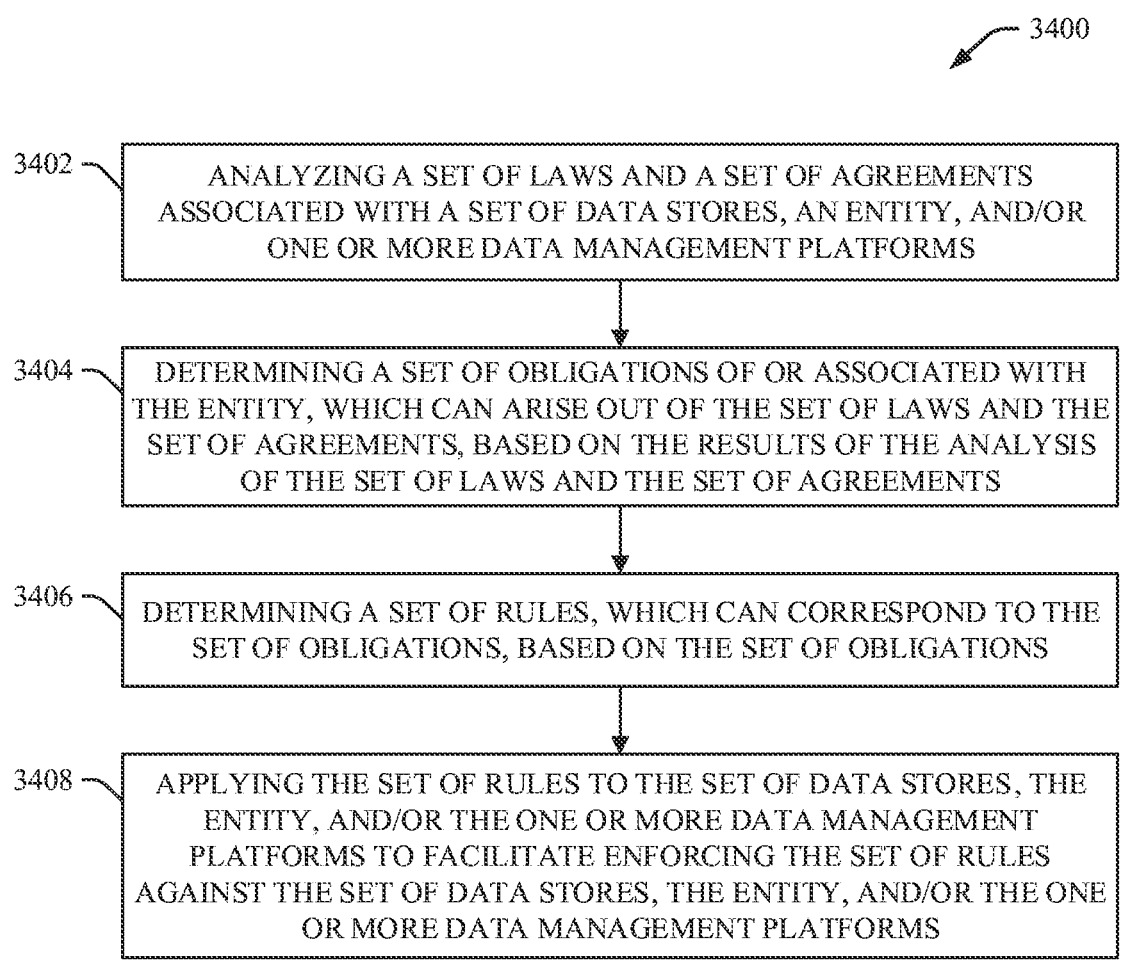

3400

3402 — ANALYZING A SET OF LAWS AND A SET OF AGREEMENTS ASSOCIATED WITH A SET OF DATA STORES, AN ENTITY, AND/OR ONE OR MORE DATA MANAGEMENT PLATFORMS

3404 — DETERMINING A SET OF OBLIGATIONS OF OR ASSOCIATED WITH THE ENTITY, WHICH CAN ARISE OUT OF THE SET OF LAWS AND THE SET OF AGREEMENTS, BASED ON THE RESULTS OF THE ANALYSIS OF THE SET OF LAWS AND THE SET OF AGREEMENTS

3406 — DETERMINING A SET OF RULES, WHICH CAN CORRESPOND TO THE SET OF OBLIGATIONS, BASED ON THE SET OF OBLIGATIONS

3408 — APPLYING THE SET OF RULES TO THE SET OF DATA STORES, THE ENTITY, AND/OR THE ONE OR MORE DATA MANAGEMENT PLATFORMS TO FACILITATE ENFORCING THE SET OF RULES AGAINST THE SET OF DATA STORES, THE ENTITY, AND/OR THE ONE OR MORE DATA MANAGEMENT PLATFORMS

FIG. 34

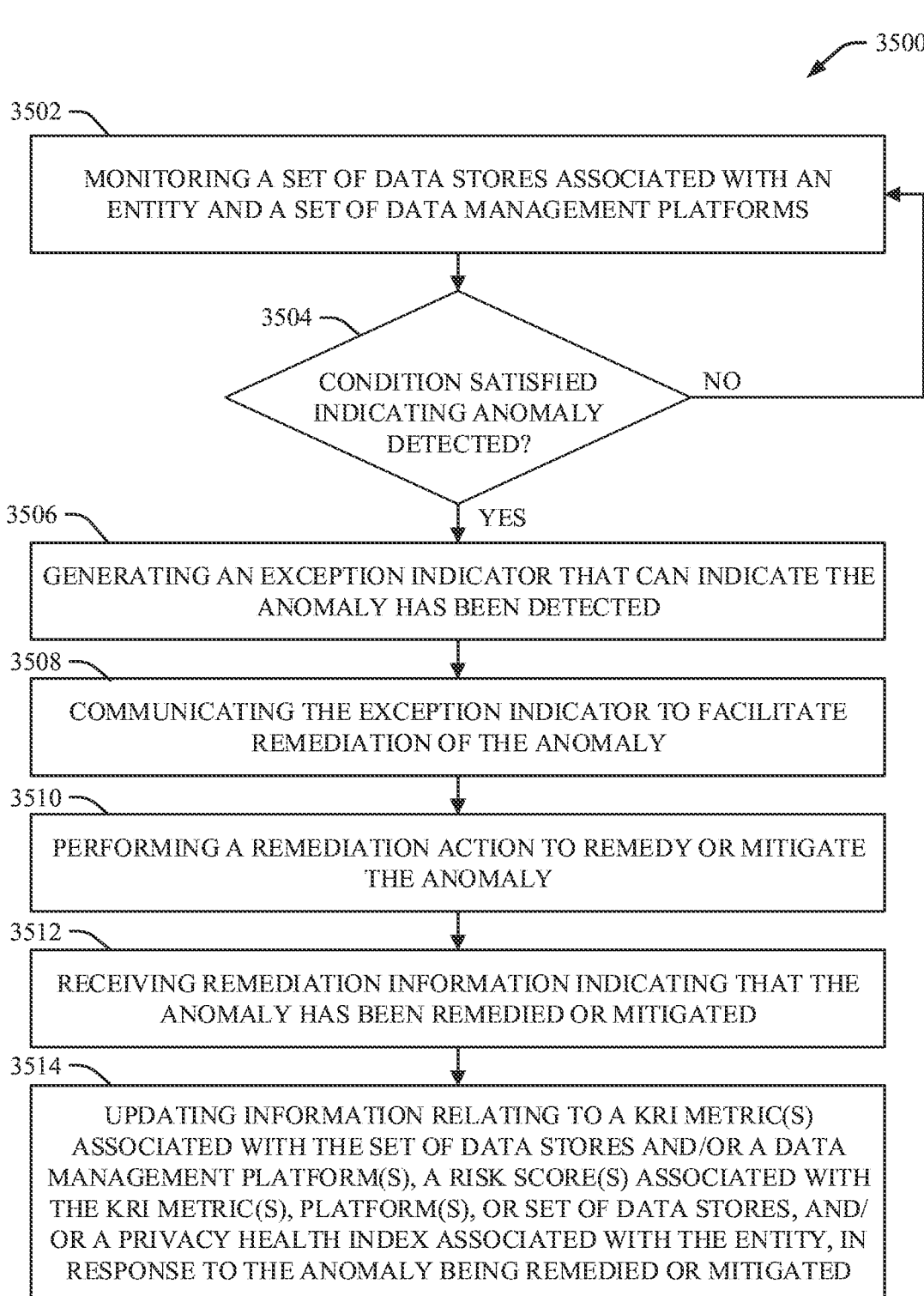

3500

3502

MONITORING A SET OF DATA STORES ASSOCIATED WITH AN ENTITY AND A SET OF DATA MANAGEMENT PLATFORMS

3504

CONDITION SATISFIED INDICATING ANOMALY DETECTED?

NO

YES

3506

GENERATING AN EXCEPTION INDICATOR THAT CAN INDICATE THE ANOMALY HAS BEEN DETECTED

3508

COMMUNICATING THE EXCEPTION INDICATOR TO FACILITATE REMEDIATION OF THE ANOMALY

3510

PERFORMING A REMEDIATION ACTION TO REMEDY OR MITIGATE THE ANOMALY

3512

RECEIVING REMEDIATION INFORMATION INDICATING THAT THE ANOMALY HAS BEEN REMEDIED OR MITIGATED

3514

UPDATING INFORMATION RELATING TO A KRI METRIC(S) ASSOCIATED WITH THE SET OF DATA STORES AND/OR A DATA MANAGEMENT PLATFORM(S), A RISK SCORE(S) ASSOCIATED WITH THE KRI METRIC(S), PLATFORM(S), OR SET OF DATA STORES, AND/ OR A PRIVACY HEALTH INDEX ASSOCIATED WITH THE ENTITY, IN RESPONSE TO THE ANOMALY BEING REMEDIED OR MITIGATED

FIG. 35

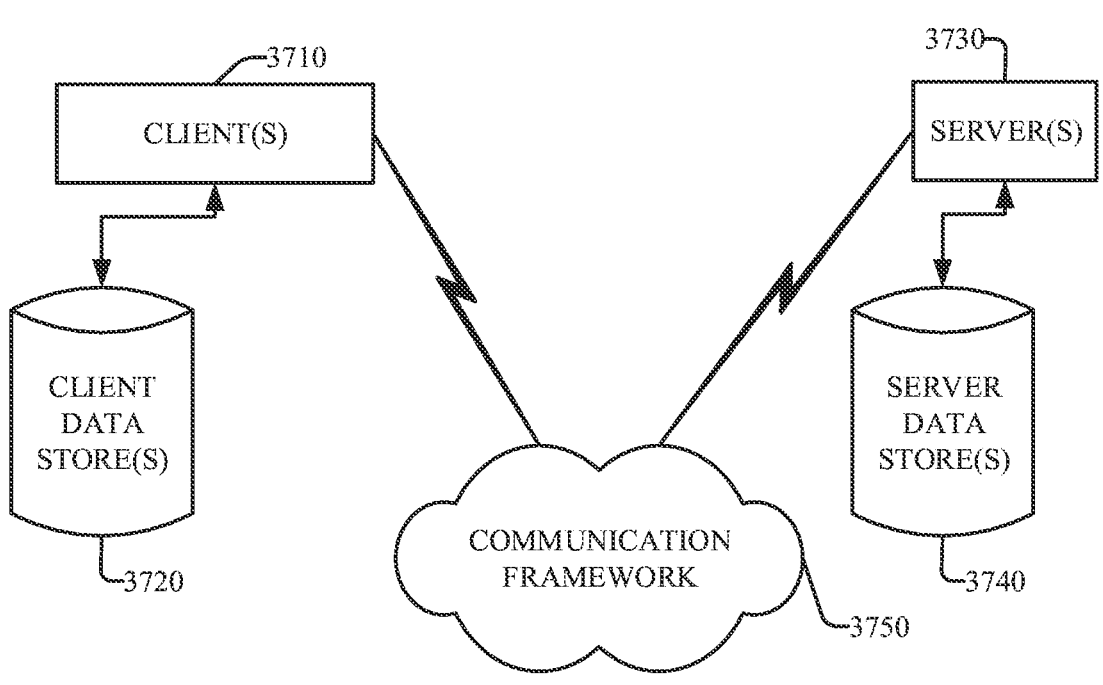
FIG. 37

DATA LIFECYCLE DISCOVERY AND MANAGEMENT

CROSS-REFERENCE TO RELATED APPLICATIONS

This application is a Continuation of U.S. patent application Ser. No. 17/127,367 entitled "DATA LIFECYCLE DISCOVERY AND MANAGEMENT," filed Dec. 18, 2020, the contents of which are incorporated herein for all purposes and in its entirety.

TECHNICAL FIELD

The subject disclosure relates generally to electronic information and communications, and more specifically to data lifecycle discovery and management.

BACKGROUND

Data can be electronically communicated (e.g., via communication networks), exchanged, stored, and displayed in connection with various types of communications, transactions (e.g., purchases, subscriptions, exchanges, etc.), or other interactions. For example, users can utilize various online and digital services to manage financial accounts, make payments on bills from financial accounts, purchase goods and services from businesses via websites of businesses, or send or transfer money to another person. For instance, there are digital wallet services that enable a person to use a communication device (e.g., mobile phone or computer) and an application (e.g., mobile digital wallet application) to transfer money, via an electronic transfer, from the person's digital wallet to another digital wallet of another entity, such as a friend or business. Users also can make online purchases for products or services where such purchases can be paid via electronic payment from bank accounts or credit accounts of the users.

In connection with the various types of online interactions, the data of users, businesses, and other entities can be communicated to various parts of the world and/or stored in various databases in various parts of the world. The data can include sensitive and/or personal data of entities (e.g., financial account numbers, financial information, Social Security Numbers, personal identification information, authentication information, and/or transaction information of entities). It is can be desirable to maintain the security of the data of users, businesses, and other entities, to ensure that only authorized entities are able to access and use the data, particularly sensitive and/or personal data, so that unauthorized and/or malicious users are not able to gain access to the data and/or so such data is not otherwise undesirably exposed and used. Further, laws and agreements have been implemented that can condition the access and use of data, particularly sensitive and/or personal data, in an effort to protect such data.

Conventional techniques, applications, and online and digital services relating to the communication, exchange, storage, access, and display of data can be deficient in protecting data of users, businesses, and other entities, and can be inefficient in implementation, can be undesirably limited in scope, and can be lacking in robustness, which can negatively impact the protection of such data.

Systems, methods, and/or techniques that can ameliorate one or more of these and other deficiencies of conventional technology can be desirable.

BRIEF DESCRIPTION OF THE DRAWINGS

FIG. 28 depicts a flow diagram of an example, non-limiting method that can desirably manage data discovery of data stored in data stores associated with one or more entities to facilitate determining compliance of the data stores and entities with obligations arising out laws and/or agreements relating to data protection, in accordance with various aspects and embodiments described herein.

FIG. 29 illustrates a flow diagram of an example, non-limiting method that can desirably determine a set of rights of a user with regard to data of the user that is stored in a set of data stores associated with an entity, in accordance with various aspects and embodiments described herein.

FIG. 30 illustrates a flow diagram of an example, non-limiting method that can desirably determine a set of obligations and corresponding set of rules relating to data protection, and determine compliance with the set of obligations by a set of data stores and associated entity, in accordance with various aspects and embodiments described herein.

FIG. 31 illustrates a flow diagram of another example, non-limiting method that can desirably identify data, data types of data, and languages of data stored in data stores associated with entities, in accordance with various aspects and embodiments described herein.

FIG. 32 illustrates a flow diagram of another example, non-limiting method that can desirably determine respective risk scores associated with KRI metrics, privacy principles, and/or data management platforms, in accordance with various aspects and embodiments described herein.

FIG. 33 illustrates a flow diagram of another example, non-limiting method that can desirably determine a privacy health index associated with an entity that is associated with a set of data stores that store data of users, in accordance with various aspects and embodiments described herein.

FIG. 34 presents a flow diagram of an example, non-limiting method that can determine and utilize a set of rules that can correspond to the set of obligations application to a set of data stores, an associated entity, and/or the DLDP and its constituent or associated platforms, in accordance with various aspects and embodiments of the disclosed subject matter.

FIG. 35 depicts a flow diagram of an example, non-limiting method that can determine an anomaly with regard to data of users has been detected and initiate a remediation action to remedy or mitigate the anomaly, in accordance with various aspects and embodiments of the disclosed subject matter.

FIG. 37 illustrates an example networking environment operable to execute various implementations described herein.

DETAILED DESCRIPTION

Figure 1:
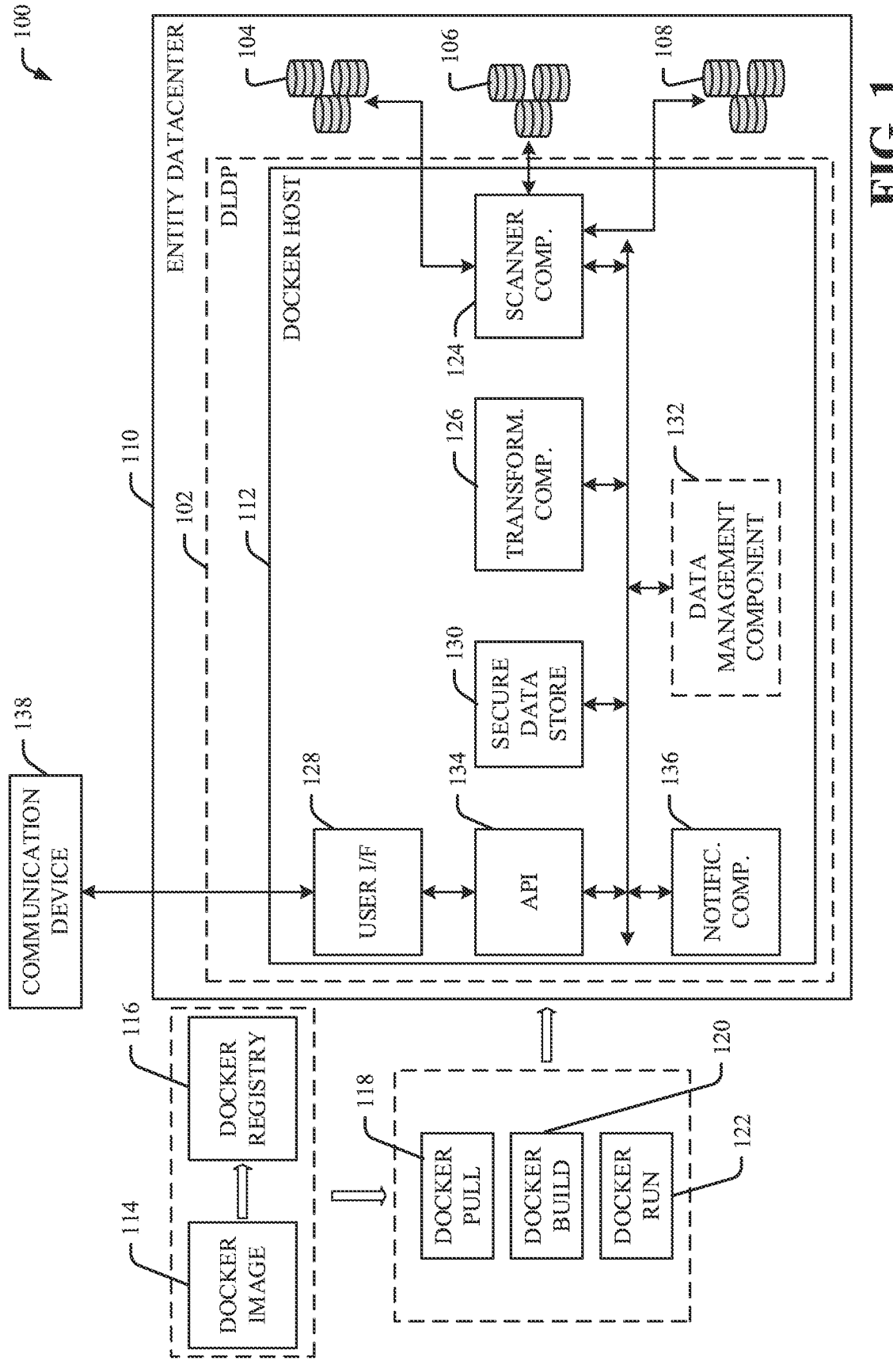
FIG. 1 illustrates a block diagram of an example, non-limiting system that can employ a data lifecycle discovery platform (DLDP) that can desirably discover and track data stored in various data stores and manage the data, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Data can be electronically communicated (e.g., via communication networks), exchanged, stored, and displayed in connection with various types of communications, transactions (e.g., purchases, subscriptions, exchanges, etc.), or other interactions. In connection with the various types of online interactions, the data of users, businesses, and other entities can be communicated to various parts of the world and/or stored in various data stores in various parts of the world. The data can include sensitive data, private data, personal data, protected data, and/or personally identifiable information (PII) of users or other entities (e.g., financial account numbers, financial information, Social Security Numbers, personal identification information, authentication information, and/or transaction information of users or other entities), and/or information relating to such data. It is can be desirable to maintain the security of the data of users, businesses, and other entities, and information relating to such data, to ensure that only authorized entities are able to access and use the data, particularly sensitive data, private data, personal data, protected data, and/or PII, so that unauthorized and/or malicious users are not able to gain access to the data and/or so such data is not otherwise undesirably exposed and used. Further, governmental agencies of various jurisdictions have implemented various laws and regulations that can condition the access and use of data, particularly sensitive data, private data, personal data, protected data, and/or PII, and/or can otherwise specify particular data protections, in an effort to protect such data. Also, there often can be agreements (e.g., contracts) between entities that can specify how data is to be handled, can condition the access and use of data, particularly sensitive data, private data, personal data, protected data, and/or PII, and/or can otherwise provide for the protection of data.

Conventional techniques, applications, and online and digital services relating to the communication, exchange, storage, access, and display of data can be deficient in protecting data of users, businesses, and other entities, can be inefficient in implementation, can be undesirably limited in scope, can be lacking in robustness, and can fail to provide sufficient information regarding the handling and usage of data by entities, each and all of which can negatively impact the protection of such data.

Various embodiments of the disclosed subject matter can address one or more of these issues/problems by facilitating desirable (e.g., efficient, enhanced, robust, and/or optimal) data lifecycle discovery and management. One or more embodiments described herein include systems, computer-implemented methods, apparatus, and/or computer program products that can facilitate data lifecycle discovery and management.

To that end, techniques for data lifecycle discovery and management are presented. A data lifecycle discovery platform (DLDP) can identify data of users, data type, and language of the data stored in data stores (e.g., database components or other data stores) of entities based at least in part on scanning of the data stored in the data stores (e.g., by a scanner component of or associated with the DLDP). The DLDP can be a multi-tenant, multi-lingual platform that can support multiple tenants and multiple languages. The DLDP or an associated platform (e.g., governance platform) can determine compliance (e.g., a level of compliance) of the DLDP and the data stores with obligations (e.g., legal and/or contractual requirements, responsibilities, duties, constraints, or provisions) relating to data protection (e.g., data protection, privacy, and security) that can arise out of applicable laws or regulations of jurisdictions (e.g., associated with the entity, data store, or DLDP) or agreements (e.g., service-level agreements (SLAs)) between entities. Based at least in part on the results of analyzing the applicable laws, regulations, and/or agreements, the DLDP or the associated platform can employ a rules engine to determine and generate rules to facilitate complying with and enforcing laws, regulations, and/or agreements.

The DLDP can comprise or be associated with a rights management platform that can manage rights of users with regard to their data and information relating to their data, and can manage access to data stored in the data stores and the information relating thereto, wherein the data or the information relating thereto can be stored in a secure data store of the DLDP or in a data store associated with an entity. The DLDP also can comprise or be associated with a governance platform that can further determine, and present to authorized users (e.g., via a user interface), information relating to key risk indicator (KRI) metrics, which can be or can comprise risk scores relating to levels of compliance (e.g., levels of adherence), non-compliance (e.g., non-adherence), or risks associated with non-compliance or potential non-compliance of the DLDP, its constituent or associated platforms (e.g., governance platform, rights management platform, etc.), or associated entities, with regard to applicable laws, regulations, or agreements. Based at least in part on the various KRI metrics, risk controls, remediation events or actions, and/or exception events (e.g., due to non-compliance or other data privacy or protection anomalies), the governance platform also can determine a privacy health index of an entity (e.g., organization) associated with the DLDP. Based at least in part on tracking and analysis of the handling and use of data by the DLDP or the data stores associated with entities, and applying the set of rules with regard to the handling and use of data, the governance platform or the DLDP can determine non-compliance issues associated with the DLDP, its constituent or associated platforms, or the data stores, and can remediate or facilitate remediating issues involving non-compliance. In accordance with various embodiments, the DLDP and/or its constituent or associated platforms can utilize artificial intelligence or machine learning to enhance various functions of or associated with the DLDP (e.g., determining risk scores, determining a privacy health index, determining or predicting a likelihood of a non-compliance issue occurring, etc.), as more fully described herein.

These and other aspects and embodiments of the disclosed subject matter will now be described with respect to the drawings.

FIG. 1 illustrates a block diagram of an example, non-limiting system 100 that can employ a DLDP that can desirably (e.g., efficiently or optimally) discover and track data stored in various data stores and manage the data, in accordance with various aspects and embodiments of the disclosed subject matter. The system 100 can comprise the DLDP 102 that can be employed to facilitate data protection, including data security and protecting data privacy, of data stored in the DLDP 102 or data stores (e.g., database components or other data stores), such as, data store 104, data store 106, and/or data store 108, associated with (e.g., communicatively connected to) the DLDP 102 and associated with an entity or entities (not shown in FIG. 1), wherein an entity can be, for example, an organization, a business, a company, a corporation, a user, or other type of entity. The DLDP 102 can employ a configurable design and solution that can satisfy (e.g., meet or exceed) global or regional data protection goals, standards, demands, or obligations of an entity or entities.

The DLDP 102 can be entity (e.g., company, organization, user, or other entity) and environment agnostic, and can readily be employed or deployed for use for any desired entity. The DLDP 102 also can be scalable to handle data and data protection for one or more entities and associated amounts of data of virtually any size. For instance, the DLDP 102 can be structured or designed to have a modular design and development model that can include a desirable technology stack (e.g., cutting edge technology stack), and can have the ability to incorporate future technology as well.

In some embodiments, the DLDP 102 and the data stores (e.g., data stores 104, 106, and/or 108) can be part of an entity datacenter 110 of or associated with an entity (e.g., as depicted in FIG. 1). In certain embodiments, additionally or alternatively, the DLDP 102 can be associated with one or more respective entity datacenters (e.g., entity datacenter 110 and/or one or more other entity datacenters (not shown in FIG. 1)) associated with one or more respective data stores of one or more respective entities. In that regard, the DLDP 102 can be multi-tenant (e.g., can support or handle multiple entities) and multi-lingual. For instance, the DLDP 102 can be utilized to handle data and data protection for respective data stores of respective entities in respective locations, and the DLDP 102 can recognize and/or identify respective languages of the data stored in the respective data stores of the respective entities, as more fully described herein.

In accordance with various embodiments, the DLDP 102 can be, can be part of, or can comprise a docker host 112 that can be or can comprise a server component (e.g., one or more servers) on which a docker daemon can run, wherein the server component can be or can comprise one or more physical machines (e.g., physical or hardware servers) and/or one or more virtual machines (VMs) that can operate as servers. The docker host 112 can comprise the docker engine and can operate as an operating system (OS) server where the OS and other processes can be run.

The docker host 112 can employ containerized applications, and can manage various containers and docker images, such as docker image 114, wherein the docker images can be part of or registered with a docker registry 116, which can be a storage and content delivery subsystem. In accordance with the modular design capabilities of the DLDP 102, every module of the application can be deployed as a container (e.g., docker container), wherein based on the infrastructure capacity of the system 100, the deployment of the application can be bundled, as desired, to utilize the resources of the system 100 in a desirably efficient manner. The disclosed subject matter can enable portability via dockerization such that every module of the application can be deployed as an independent component, for example, to facilitate supporting rolling upgrades of the modules. As desired, the containers can be isolated from each other and can bundle their respective software, libraries, and/or configuration files, wherein containers can communicate with each other through certain channels. The system 100, including the DLDP 102, can utilize the applications and associated containers to perform or implement the various aspects of the disclosed subject matter, as described herein.

In one embodiment, a docker image 114 can be a template that can be utilized to construct build containers. The docker image 114 can comprise one or more files (e.g., one or more read-only or unchangeable files) that can have no state. The docker image 114 can also comprise one or more layers. A container can be an instantiation of a docker image (e.g., a runtime instantiation of a docker image). A docker pull 118 can be employed to pull one or more images (e.g., docker image 114) from the docker registry 116 to facilitate instantiating one or more containers. For instance, using the docker pull 118, a desired docker image can be pulled from the docker registry 116 using a name and/or tag associated with the docker image. A docker build 120 can be utilized to build images (e.g., docker image 114) from a file (e.g., docker file) and a context, wherein a context of a build can comprise one or more files. A docker run 122 can be utilized (e.g., executed or performed) to run respective processes in respective containers (e.g., isolated containers). For instance, when a docker run 122 is utilized with regard to a container, the process for the container that runs can employ its own file system, networking, and/or process tree, which can be desirably isolated and separate from the docker host 112.

It is to be appreciated and understood that, while various aspects of the disclosed subject matter are being described with regard to docker-type implementations, the disclosed subject matter is not so limited, and, in accordance with various embodiments, the various aspects of the disclosed subject matter, including the system 100 and DLDP 102, can be implemented utilizing other types of architectures, models, features, and/or platform as a service (PaaS) products, as desired.

The system 100 also can include a scanner component 124 (SCANNER COMP.) that can scan data stored in the data stores 104, 106, and/or 108 to facilitate identifying the data that is stored in the data stores 104, 106, and/or 108, including identifying the data type of each item of data, the data format of each item of data, the language of each item of data, and/or other features (e.g., data attributes, data identifiers, and/or other metadata, etc.) of or associated with each item of data. The scanner component 124 can generate scan results based at least in part on the scanning of the data stored in the data stores 104, 106, and/or 108, wherein the scan results can comprise information relating to the data (e.g., scanned data), including information relating to the data type, data format, language, and/or the other features of or associated with each item of data, and/or other metadata relating to the data. The data stored in the data stores 104, 106, and/or 108 can comprise structured data (e.g., data contained in a relational database) and/or unstructured data (e.g., data contained in emails; image data (e.g., visual images, such as digital images, photographs, video images, or other type of image data); or other type of unstructured data). In some embodiments, the scanner component 124 can be located locally with respect to the DLDP 102 (e.g., as depicted in FIG. 1), whereas, in other embodiments, one or more scanner components (e.g., scanner component 124) can be deployed at or near the respective locations of respective data stores of the entity (e.g., organization or company) and/or one or more other entities (e.g., other tenants). The scanner component 124 can comprise or be associated with a classifier component (not shown in FIG. 1) that can analyze items of data scanned from the data stores 104, 106, and/or 108, and, based at least in part on the results of such analysis, can determine or identify each item of data, including the data type, data format, language, and/or other features of or associated with each item of data. In some embodiments, the DLDP 102 can employ artificial intelligence or machine learning to facilitate enhancing the performance of various aspects of the DLDP 102, including classification of items of data by the classifier component, as more fully described herein.

The DLDP 102 can include a transformation component 126 (TRANSFORM. COMP.) that can transform or modify data, such as data scanned from the data stores 104, 106, and/or 108, to put such data in a desired format, for example, for presentation of the data in the desired format via a user interface component 128 (USER I/F or UI) to a user (e.g., authorized and/or authenticated user), as more fully described herein. For instance, the transformation component 126 can receive items of data scanned from one or more of the data stores 104, 106, and/or 108. The transformation component 126 can analyze the items of data, and based at least in part on such analysis, can identify respective numeric values of the respective items of data and/or can identify numeric values relating to the respective items of data. For example, if an item of data is an address of a person (e.g., customer), the transformation component 126 can identify the numeric characters that can represent an address number and/or postal code (e.g., zip code) of the address, where the classifier component can classify the item of data as an address of the person, and the transformation component 126 can transform the item of data to facilitate presentation of the address of the person in a desirable form via the user interface component 128. As another example, if a group of items of data were scanned from a particular data set in a data store (e.g., 104), the transformation component 126 can identify the number of items of data in the group of items of data, based at least in part on the results of classification of the group of items of data by the classifier component, and can facilitate presenting the number of items of data in the group of items of data via the user interface component 128.

The DLDP 102 also can comprise a secure data store 130 (e.g., privacy data store) that can desirably (e.g., securely, suitably, and/or optimally) store desired data, such as certain items of data scanned from the data stores 104, 106, and/or 108 and/or information relating to items of data stored in the data stores 104, 106, and/or 108, wherein the information relating to the items of data can comprise scan results obtained from scanning the items of data, data attributes or features, and/or other metadata relating to the items of data. The secure data store 130 can be a multi-tenant, multilingual data store that can support a data aggregation model (e.g., centralized data aggregation model) and can support desirably (e.g., securely, suitably, or optimally) storing data associated with one or more desired entities (e.g., tenants), wherein data can be stored in one or more languages in the secure data store 130.

The DLDP 102 can include a data management component 132 that can manage and secure the data stored in the secure data store 130, can manage the compliance of the DLDP 102, its constituent or associated platforms, and the data stores (e.g., data stores 104, 106, and/or 108) associated with the DLDP 102 with the respective laws and regulations of the respective jurisdictions (e.g., legal and/or geographical jurisdictions) associated with the DLDP 102 and data stores and with the respective agreements (e.g., contracts or SLAs) associated with the DLDP 102 and data stores, wherein the laws and regulations can relate to data protection (e.g., data protection, privacy, and security), and wherein the agreements can relate to data protection. The data management component 132 also can manage various other operations and components of or associated with the DLDP 102, such as described herein. The constituent or associated platforms of the DLDP 102 can comprise, for example, a rights management platform (also referred to herein as rights management component), a governance platform (also referred to herein as governance component), and/or another desired platform that can be utilized to facilitate providing desirable data privacy, protection, and security. The rights management platform can manage various rights of users with regard to their data, or information relating to their data, stored in the secure data store 130 and/or data stores (e.g., data stores 104, 106, and/or 108) associated with the DLDP 102), as more fully described herein. The governance platform can track and manage laws and regulations associated with the various jurisdictions associated with the DLDP 102, associated data stores (e.g., data stores 104, 106, and/or 108), and associated entities, and can track and manage agreements associated with the DLDP 102, associated data stores, and associated entities, to facilitate compliance of the DLDP 102, associated data stores, and associated entities with applicable laws, regulations, and/or agreements, as more fully described herein.

The laws and regulations can comprise, for example, the General Data Protection Regulation (GDPR), Personal Information Protection and Electronic Documents Act (PIPEDA), Fair Credit Reporting Act (FCRA), Electronic Communications, Privacy Act (ECPA), Health Insurance Portability and Accountability Act of 1996 (HIPAA), Children's Online Privacy Protection Act (COPPA), Racketeer Influenced and Corrupt Organization (RICO) Act, Family Educational Rights and Privacy Act (FERPA), U.S. Privacy Act, Medical Computer Crime Act, Federal Computer Crime Act, Computer Fraud and Abuse Act, Video Privacy Protection Act, Digital Millenium Copyright Act (DMCA), Economic and Protection of Proprietary Information Act, California Consumer Privacy Act (CCPA), California Consumer Privacy Act, People's Republic of China (PRC) Cybersecurity Law, Phillipines Data Privacy Act, United Kingdom Computer Misuse Act, Australia Data Privacy Act, India Information Technology Act, India Information Technology Rules, Japan Act on Protection of Personal Information Amendment, Israel Privacy Protection Law, Mexico Federal Law on the Protection of Personal Data held by Private Properties, and/or any other law or regulation that has been enacted or that may be enacted through new legislation, new regulation, amendment to a law, or amendment to a regulation.

The laws, regulations, or agreements can relate to, specify, or indicate how data is to be handled or secured by an entity or the DLDP 102 (e.g., based on the type of data and/or a sensitivity, privacy, or protected status of data); various rights of users with regard to data of users or information relating thereto (e.g., information derived from, based on, or associated with the data of users); processing of data; sharing of data with third party entities; consents and choices of users (e.g., user consent to receiving of emails or text messages from an entity, or user consent to allow use of cookies by an entity, etc.); removal or unsubscription of users from receiving electronic communications; length of time to comply with request to remove or unsubscribe;

length of time to remedy or mitigate non-compliance with provision of a law, regulation, or agreement (e.g., safe harbor); encryption of data; security of communication channels; authentication requirements to access data, obtain copies of data, write data, modify data, or erase data; anonymization of data; and/or other aspects or factors relating to data protection of data of users and information relating thereto.

In some embodiments, the DLDP 102 can comprise an application programming interface component 134 (API) that can provide various interfaces (e.g., APIs) that can enable desirable communication of information between the secure data store 130 and the user interface component 128, the data management component 132, a notification component 136 of the DLDP 102, and/or other components of or associated with the DLDP 102, in accordance with various protocols and data formats supported by the API 134.

The notification component 136 can generate and provide (e.g., communicate) various types of notifications (e.g., notification or alert messages) to users via the user interface component 128, as more fully described herein. For example, when the DLDP 102 detects that an anomaly (e.g., data protection anomaly and/or breach) has occurred with regard to certain data of a user(s), a certain data store(s) (e.g., data store(s) 104, 106, and/or 108), the secure data store 130, the DLDP 102, or its constituent or associated platforms (e.g., the governance platform or rights management platform of or associated with the DLDP 102), the notification component 136 can generate a notification message that can notify a user (e.g., service representative of or associated with an entity) that the anomaly has occurred, can indicate that a remediation action is being performed to remedy or mitigate the anomaly, and/or can request that a remediation action be performed to remedy or mitigate the anomaly, wherein the anomaly can indicate non-compliance or potential non-compliance with an applicable law, regulation, or agreement has occurred. The notification component 136 can facilitate communicating the notification message to the user via the user interface component 128 to notify or alert the user that the anomaly has been detected by the DLDP 102, a remediation action is being performed, and/or performance of a remediation action is requested.

In some embodiments, the system 100 comprise one or more communication devices, such as communication device 138, that can be a client device(s) that can be associated with (e.g., communicatively connected to) the DLDP 102 via, for example, a communication network(s) (e.g., a packet-based (e.g., an Internet protocol (IP)-based) communication network, such as the Internet, an intranet, a local area network (LAN), a wide area network (WAN), a wireless network, a core or cellular network, or other type of communication network). The communication device 138 can connect to the DLDP 102 via a wireline or wireless communication connection or channel. A user (e.g., service representative of or associated with the entity; or user who has data being handled by the entity) can utilize the communication device 138 to communicate with the DLDP 102, authenticate with the DLDP 102, request information from the DLDP 102 and/or a data store (e.g., data store 104) associated with the DLDP 102, receive notifications or alerts from the DLDP 102, etc., such as more fully described herein.

Communication devices (e.g., communication device 138) can refer to or can include, but are not limited to, for example, a computer (e.g., a desktop computer, a laptop embedded equipment (LEE), a laptop mounted equipment (LME), or other type of computer), a tablet or pad (e.g., an electronic tablet or pad), an electronic notebook, a cellular and/or smart phone, a mobile terminal, a mobile device, a mobile communication device, user equipment (UE), a landline phone, a Personal Digital Assistant (PDA), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a media player (e.g., media player having communication functionality), speakers (e.g., powered speakers having communication functionality), a set-top box, an IP television (IPTV), a communication device associated or integrated with a vehicle (e.g., automobile, bus, train, or ship, or other type of vehicle), a virtual assistant (VA) device, and/or any other type of communication device (e.g., other types of Internet of Things (IoTs)).

These and other aspects and embodiments of the disclosed subject matter will be described with regard to the other drawings and/or FIG. 1.

Figure 2:
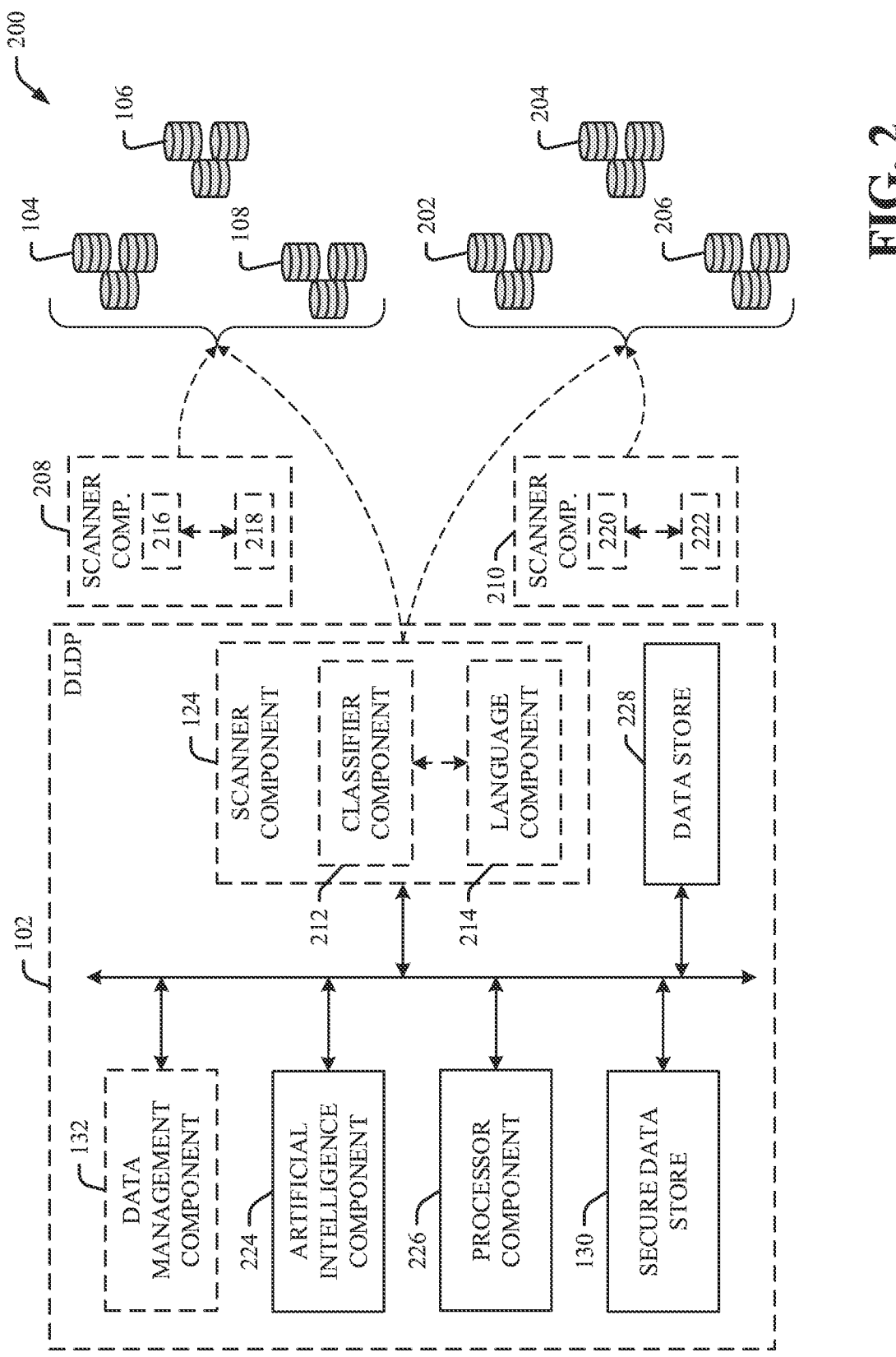
FIG. 2 depicts a block diagram of an example system that can utilize classification techniques, and artificial intelligence and machine learning techniques, to facilitate classifying or identifying data scanned from data stores to facilitate desirably discovering and tracking data stored in various data stores and managing the data, in accordance with various aspects and embodiments of the disclosed subject matter.

Referring to FIG. 2 (along with FIG. 1), FIG. 2 depicts a block diagram of an example system 200 that can utilize classification techniques, and artificial intelligence and machine learning techniques, to facilitate classifying or identifying data scanned from data stores to facilitate desirably (e.g., efficiently or optimally) discovering and tracking data stored in various data stores and managing the data, in accordance with various aspects and embodiments of the disclosed subject matter. The system 200 can comprise DLDP 102, which can be employed to facilitate data protection, including data security and protecting data privacy, of data stored in the DLDP 102 or data stores associated with (e.g., communicatively connected to) the DLDP 102. The system 200 can comprise a first set of data stores, including data store 104, data store 106, and/or data store 108, associated with a first entity (e.g., first organization or company), and a second set of data stores, including data store 202, data store 204, and/or data store 206, associated with a second entity (e.g., second organization or company). The first set of data stores (e.g., 104, 106, and/or 108) and the first entity can be located in or associated with a first jurisdiction, and the second set of data stores (e.g., 202, 204, and/or 206) and the second entity can be located in or associated with a second jurisdiction.

The DLDP 102 can comprise the secure data store 130 (e.g., privacy data store), which can desirably store desired data, such as certain items of data scanned from the first set of data stores (e.g., 104, 106, and/or 108), the second set of data stores (e.g., 202, 204, and/or 206), and/or information relating to items of data stored in the first set of data stores and/or second set of data stores, wherein the information relating to the items of data can comprise scan results obtained from scanning the items of data, data attributes or data features, and/or other metadata relating to the items of data. The secure data store 130 can be a multi-tenant, multi-lingual data store that can support desirably storing data associated with one or more desired entities (e.g., tenants), such as the first entity and second entity, wherein data can be stored in one or more languages in the secure data store 130. For instance, a first set of data stored in the first set of data stores (e.g., 104, 106, and/or 108) can be in a first language, and a second set of data stored in the second set of data stores (e.g., 202, 204, and/or 206) can be in a second language. It is to be appreciated and understood that a set of data stores (e.g., 104, 106, and/or 108) can store items of data that can be in more than one language.

The DLDP 102 can include the data management component 132 that can manage and secure the data stored in the secure data store 130, can manage the compliance (e.g., adherence) of the DLDP 102, its constituent or associated platforms (e.g., governance platform and rights management platform), and the first set of data stores (e.g., 104, 106, and/or 108) and second set of data stores (e.g., 202, 204, and/or 206) associated with the DLDP 102 with the respective laws and regulations of the respective jurisdictions (e.g., legal and/or geographical jurisdictions) associated with the DLDP 102 and data stores and with the respective agreements (e.g., contracts or SLAs) associated with the DLDP 102 and data stores, wherein the laws and regulations can relate to data protection, and wherein the agreements can relate to data protection. For instance, the first set of data stores (e.g., 104, 106, and/or 108) and first entity can be associated with a first set of laws and regulations associated with (e.g., applicable to) the first jurisdiction and/or a first agreement between the first entity and another entity(ies) and relating to data stored in the first set of data stores. The second set of data stores (e.g., 202, 204, and/or 206) and second entity can be associated with a second set of laws and regulations associated with (e.g., applicable to) the second jurisdiction and/or a second agreement between the second entity and another entity(ies) and relating to data stored in the second set of data stores.

In accordance with various aspects and embodiments, the system 200 can comprise the scanner component 124, a scanner component 208, and/or a scanner component 210. The scanner component 124 can be located locally with respect to the DLDP 102 (e.g., can be part of or in relatively close proximity to the DLDP 102); the scanner component 208 can be deployed at a first location that can be in proximity to the first set of data stores (e.g., 104, 106, and/or 108); and/or the scanner component 210 can be deployed at a second location that can be in proximity to the second set of data stores (e.g., 202, 204, and/or 206). The scanner component 124 and/or scanner component 208 can be associated with (e.g., communicatively connected to) the first set of data stores (e.g., 104, 106, and/or 108). The scanner component 124 and/or scanner component 210 can be associated with (e.g., communicatively connected to) the second set of data stores (e.g., 202, 204, and/or 206). In some embodiments, the scanner component 210 can be owned, managed, or operated by the first entity, but can be located at a location in proximity to the second set of data stores.

The scanner component 124 and/or scanner component 208 can scan data (e.g., all or a desired portion of the first set of data) stored in the first set of data stores (e.g., 104, 106, and/or 108) to facilitate identifying the data that is stored in the first set of data stores, including identifying the data type, the data format, the language (e.g., the first language), and/or other features (e.g., data attributes, data identifiers, and/or other metadata, etc.) of or associated with each item of data. The scanner component 124 and/or scanner component 208 can generate scan results based at least in part on the scanning of the data stored in the first set of data stores (e.g., 104, 106, and/or 108), wherein the scan results can comprise information relating to the data (e.g., data scanned from the first set of data stores), including information relating to the data type, data format, language, and/or the other features of or associated with each item of data, and/or other metadata relating to the data.

The scanner component 124 and/or scanner component 210 can scan data (e.g., all or a desired portion of the second set of data) stored in the second set of data stores (e.g., 202, 204, and/or 206) to facilitate identifying the data that is stored in the second set of data stores, including identifying the data type, the data format, the language (e.g., the second language), and/or other features of or associated with each item of data. The scanner component 124 and/or scanner component 210 can generate scan results based at least in part on the scanning of the data stored in the second set of data stores (e.g., 202, 204, and/or 206), wherein the scan results can comprise information relating to the data (e.g., data scanned from the second set of data stores), including information relating to the data type, data format, language, and/or the other features of or associated with each item of data, and/or other metadata relating to the data.

In accordance with various aspects and embodiments, the scanner component 124 can comprise a classifier component 212 and language component 214, the scanner component 208 can comprise a classifier component 216 and language component 218, and/or the scanner component 210 can comprise a classifier component 220 and language component 222. The classifier component 212 and/or classifier component 216 can analyze all or a desired portion of the first set of data that was scanned from the first set of data stores 104, 106, and/or 108. Based at least in part on the results of the analysis, the classifier component 212 and/or classifier component 216 can determine, identify, or classify items of data of the first set of data, including determining, identifying, or classifying the data type, the data format, the language, and/or the other features of or associated with each of those items of data. Similarly, the classifier component 212 and/or classifier component 220 can analyze all or a desired portion of the second set of data that was scanned from the second set of data stores 202, 204, and/or 206. Based at least in part on the results of such analysis, the classifier component 212 and/or classifier component 220 can determine, identify, or classify items of data of the second set of data, including determining, identifying, or classifying the data type, the data format, the language, and/or the other features of or associated with each of those items of data.

The language component 214 of scanner component 124 and/or the language component 218 of scanner component 208 can facilitate identifying or determining the language (e.g., first language) of the items of data scanned from the first set of data stores 104, 106, and/or 108. The language component 214 of scanner component 124 and/or the language component 222 of scanner component 210 can facilitate identifying or determining the language (e.g., second language) of the items of data scanned from the second set of data stores 202, 204, and/or 206. A language component (e.g., 214, 218, or 222) can comprise libraries, dictionaries, or other language or grammar related information regarding various different languages. The languages that can be identified, determined, or recognized by the scanner component(s) (e.g., 124, 208, and/or 210) can comprise, for example, English, Spanish, French, Italian, Portuguese, Scottish Gaelic, German, Greek, Romanian, Hungarian, Chinese, Japanese, Korean, Vietnamese, Taiwanese, Thai, Indonesian, Malay, Javanese, Filipino, Tagalog, Dutch, Russian, Ukrainian, Arabic, Kurdish, Persian, Hebrew, Hindi, Bengali, Sinhala, Tamil, Turkish, Bosnian, Serbian, Croatian, African, Icelandic, Nordic, Native American languages, and/or any other desired language, and/or respective language dialects relating thereto. A classifier component (e.g., 212, 216, or 220) can access such libraries, dictionaries or other language or grammar related information, and, based at least in part on an analysis of items of data scanned from a data store(s) and the information in the libraries, dictionaries or other language or grammar related information, the classifier component (e.g., 212, 216, or 220) can determine, identify, or classify the characters (e.g., letters, numbers, symbols, accents, punctuation, or other characters) of each item of data, the language of each item of data, and/or the grammar of each item of data, as well as determine, identify, or classify the data type, data format, or other features of or associated with each item of data.

In some embodiments, the DLDP 102 can comprise an artificial intelligence (AI) component 224 that can utilize (e.g., apply) artificial or machine learning to facilitate enhancing the performance of various aspects of the DLDP 102, including classification of items of data by the classifier component(s) (e.g., 212, 216, or 220). The AI component 224 can be associated with (e.g., communicatively connected to) the other components (e.g., secure data store 130, data management component 132, scanner component(s) (e.g., 124, 208, or 210), processor component 226, or other component) of the system 200 to enable the AI component 224 to communicate with such other components and facilitate performance of operations by the system 200. The AI component 224 can employ artificial intelligence techniques and algorithms, and/or machine learning techniques and algorithms, to facilitate determining or inferring characters of an item of data, language of the item of data, grammar of the item of data, data type of the item of data, data format of the item of data, or other features of or associated with the item of data, determining or inferring a likelihood or probability of an anomaly (e.g., non-compliance issue) occurring (e.g., within a defined amount of time) with regard to an obligation(s) (e.g., arising out of an applicable law, regulation, or agreement), determining or inferring a level of compliance with an obligation(s) or a risk score with regard to a risk indicator metric (e.g., a key risk indicator (KRI) metric), a platform (e.g., DLDP 102, governance platform, rights management platform, data discovery platform, data subject rights platform, third party management platform, and/or notice and consents platform, etc.), a data store associated with an entity, or an entity, determining or inferring a remediation that can be performed to remedy or mitigate an anomaly, and/or automating one or more functions or features of the disclosed subject matter, as more fully described herein.

The machine learning techniques and algorithms can comprise, for example, a random forest technique, a linear regression technique, a regression boosting technique, a gradient boosting technique, a support vector machine technique, a Bayesian technique (e.g., a Bayesian-type or Bayesian-based technique), a k-means technique, a k-nearest neighbor (kNN) technique, a classification and regression tree technique, or other desired type of machine learning technique or algorithm. Employing the desired machine learning technique(s) and algorithm(s), and based at least in part on the results of analyzing items of data scanned from a data store(s) or historical information relating to data, types of characters, types of languages, types of grammar, data types, data formats, or other features of data, the AI component 224 can learn over time to more desirably and progressively determine, identify, or classify characters, language, grammar, data type, data format, or other features of or associated with items of data. Based at least in part on such learning (e.g., progressive machine learning), the performance of the AI component 224 and associated classifier component(s) (e.g., 212, 216, or 220) can be enhanced (e.g., progressively enhanced or improved) over time with regard to classification of items of data.

In certain embodiments, additionally or alternatively, the AI component 224 can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 224 can examine the entirety or a subset of the data (e.g., data scanned from a data store(s) by a scanner component(s) (e.g., 124, 208, or 210), data stored in the secure data store 130, data in or associated with the data management component 132, data in or associated with the processor component 226, or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data)) as well as implicitly trained (e.g., via observing behavior, preferences, historical information, receiving extrinsic information, and so on) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

The processor component 226 can work in conjunction with the other components (e.g., secure data store 130, data management component 132, scanner component(s) (e.g., 124, 208, or 210), AI component 224, or data store 228, etc.) to facilitate performing the various functions of the system 200. The processor component 226 can employ one or more processors, microprocessors, or controllers that can process data, such as information relating to the DLDP 102, governance platform, rights management platform, users (e.g., users associated with items of data, users who are attempting to access items of data or information relating to items of data), items of data scanned from data stores, laws, regulations, agreements, obligations, rules, communication devices, identifiers or authentication credentials associated with users or communication devices, KRI metrics, privacy principles, risk scores, privacy health index, non-compliance with obligations, notifications, alerts, remediation, data parsing, data filtering, data classification, data or user security, parameters, traffic flows, policies, defined data management criteria, algorithms (e.g., data management algorithms, filtering algorithms, data classification algorithms AI algorithms, machine learning algorithms, etc., including as one or more of these algorithms are expressed in the form of the methods and techniques described herein), protocols, interfaces, tools, and/or other information, to facilitate operation of the system 200, as more fully disclosed herein, and control data flow between the system 200 and other components (e.g., a communication device, a base station or other network component or device of the communication network, data sources, or applications, etc.) associated with the system 200.

The data store 228 can store data structures (e.g., user data, metadata), code structure(s) (e.g., modules, objects, hashes, classes, procedures) or instructions, information relating to the DLDP 102, governance platform, rights management platform, users (e.g., users associated with items of data, users who are attempting to access items of data or information relating to items of data), items of data scanned from data stores, laws, regulations, agreements, obligations, rules, communication devices, identifiers or authentication credentials associated with users or communication devices, KRI metrics, privacy principles, risk scores, privacy health index, non-compliance with obligations, notifications, alerts, remediation, data parsing, data filtering, data classification, data or user security, parameters, traffic flows, policies, defined data management criteria, algorithms (e.g., data management algorithms, filtering algorithms, data classification algorithms AI algorithms, machine learning algorithms, etc., including as one or more of these algorithms are expressed in the form of the methods and techniques described herein), protocols, interfaces, tools, and/or other information, to facilitate controlling operations associated with the system 200. In an aspect, the processor component 226 can be functionally coupled (e.g., through a memory bus) to the data store 228 in order to store and retrieve information desired to operate and/or confer functionality, at least in part, to the DLDP 102, secure data store 130, data management component 132, scanner component(s) (e.g., 124, 208, or 210), AI component 224, data store 228, etc., and/or substantially any other operational aspects of the system 200.

Figure 3:
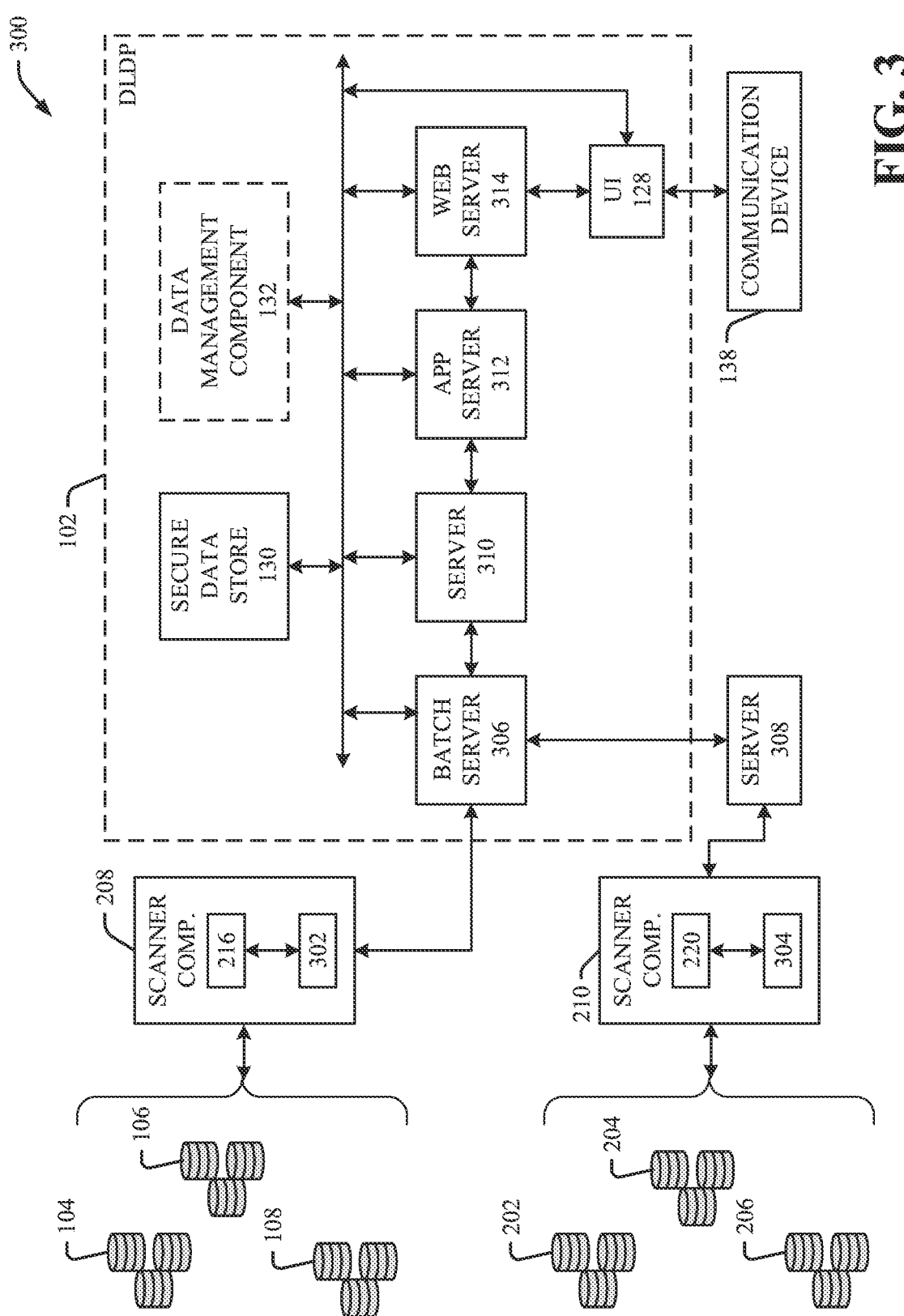
FIG. 3 depicts a block diagram of an example system that can illustrate a DLDP process flow in connection with the DLDP desirably discovering and tracking data stored in various data stores and managing the data, in accordance with various aspects and embodiments of the disclosed subject matter.

Turning to FIG. 3 (along with FIGS. 1 and 2), FIG. 3 depicts a block diagram of an example system 300 that can illustrate a DLDP process flow in connection with the DLDP desirably (e.g., efficiently or optimally) discovering and tracking data stored in various data stores and managing the data, in accordance with various aspects and embodiments of the disclosed subject matter. The system 300 can comprise the DLDP 102, the user interface component 128 (UI), the secure data store 130, and the data management component 132. The DLDP 102 can comprise and can provide various cloud services relating to data discovery, data tracking, data management, user rights management, governance, and data protection, as such cloud services can be provided by the first entity, which can own, manage, or operate the DLDP 102. In some embodiments, the DLDP 102 can comprise or be part of a docker container, such as described herein.

The system 300 also can comprise the first set of data stores (e.g., 104, 106, and 108) associated with the first entity, and the second set of data stores (e.g., 202, 204, and 206) associated with the second entity. The first set of data stores (e.g., 104, 106, and 108) can store a first set of data that can comprise data stored in databases (e.g., relational databases), files, images (e.g., digital videos or photographs), files, emails, and/or messages (e.g., text or multimedia messages), audio data or files, etc., associated with users (e.g., first group of users). The second set of data stores (e.g., 202, 204, and 206) can store a second set of data that can comprise data stored in databases, files, images, files, emails, and/or messages, audio data or files, etc., associated with users (e.g., second group of users).

The system 300 also can comprise scanner component 208 and scanner component 210 that can be associated with (e.g., communicatively connected to) the DLDP 102. The scanner component 208 can comprise classifier component 216 and data store 302, and scanner component 210 can comprise classifier component 220 and data store 304. In some embodiments, a scanner component(s) (e.g., 124, 208, and/or 210) can be or can comprise a split-post dielectric resonator (SPDR) scanner. In certain embodiments, the first set of data stores (e.g., 104, 106, and 108), the scanner component 208, and the DLDP 102 can be associated with the first entity (e.g., owned, managed, or operated by the first entity), and the second set of data stores (e.g., 202, 204, and 206) and/or the scanner component 210 can be associated with the second entity.

The scanner component 208 can scan all or a desired portion of the first set of data stored in the first set of data stores (e.g., 104, 106, and 108), in accordance with the first set of laws and regulations associated with the first jurisdiction and/or the first agreement that are associated with the first set of data stores, the first entity, and/or the DLDP 102. The classifier component 216 can analyze the scanned data of the first set of data to classify the scanned data to generate first classification results, such as more fully described herein. The scanner component 208 can store the first scan results, comprising the first scanned data, or portion thereof, first information relating to the first scanned data, and/or the first classification results, in the data store 302.

The scanner component 210 can scan all or a desired portion of the second set of data stored in the first set of data stores (e.g., 202, 204, and 206), in accordance with the second set of laws and regulations associated with the second jurisdiction and/or the second agreement that are associated with the second set of data stores, the second entity, and/or the DLDP 102. The classifier component 220 can analyze the second scanned data of the second set of data to classify the second scanned data to generate second classification results, such as more fully described herein. The scanner component 210 can store the second scan results, comprising the second scanned data, or portion thereof, second information relating to the second scanned data, and/or the second classification results, in the data store 304.

With regard to the first scan results obtained by the scanner component 208, the DLDP 102 can receive the first scan results from the scanner component 208. In certain embodiments, the DLDP 102 can comprise a batch server component 306 that can establish a communication connection with the scanner component 208, wherein the batch server component 306 (BATCH SERVER) can read the first scan results from the data store 302 of the scanner component 208. The batch server component 306 can be located in a highly restricted zone (HRZ) of the DLDP 102, to facilitate desirably securing the data. The HRZ of the DLDP 102 can be a desirably (e.g., highly) secure area of the DLDP 102 where data of users, including sensitive data of users, protected data of users, PII of users, and/or information relating to the data of users, can be desirably and securely stored (e.g., in the secure data store 130), protected, and/or processed by the DLDP 102. The DLDP 102 can desirably prevent or inhibit unauthorized access of the DLDP 102, particularly the HRZ of the DLDP 102, and the data stored therein, by unauthorized users, entities, or devices, as more fully described herein. In some embodiments, the batch server component 306 can utilize a desired (e.g., standard) API, such as, for example, native open database connectivity (ODBC), to facilitate establishing the communication connection and transferring the first scan results from the scanner component 208 to the batch server component 306. The native ODBC can be an open standard API that can be utilized to facilitate accessing the data store 302 and communicating data (e.g., first scan results). In certain embodiments, the batch server component 306 can be an extract, transform, load (ETL) server that can utilize an ETL batch process to facilitate reading and transferring the first scan results from the scanner component 208 to the batch server component 306.

With regard to the second scan results obtained by the scanner component 210, the system 300 can employ a server component 308 (SERVER), which can be utilized as an intermediary server or a drop zone server that can receive the second scan results from the scanner component 210. In some embodiments, the scanner component 210 can establish a communication connection with the server component 308 and can utilize a desired data transfer process and protocol, such as, for example, a secure file transfer protocol (SFTP) push process and protocol (SFTP also can refer to secure shell protocol (SSH) file transfer protocol), to transfer the second scan results to the server component 308. The batch server component 306 can establish a communication connection with the server component 308, and can utilize a desired data transfer process and protocol, such as, for example, an SFTP pull process and protocol, to transfer the second scan results from the server component 308 to the batch server component 306.

The batch server component 306 can store the first scan results and the second scan results in the secure data store 130. The secure data store 130 can be associated with, or can comprise, a server component 310 (SERVER) (e.g., a database server). The server component 310 can utilize a desired (e.g., suitable or optimal) common data model to facilitate storage of the first scan results and second scan results in the secure data store 130. The secure data store 130 also can be located in the HRZ of the DLDP 102. In some embodiments, the batch server component 306 and secure data store 130 (e.g., server component 310 of the secure data store 130) can utilize native ODBC to facilitate establishing the communication connection and transferring the first scan results and second scan results from the batch server component 306 to the secure data store 130.

The DLDP 102 also can comprise an application server component 312 (APP SERVER) that can provide various services relating to servicing data requests for data stored in the secure data store 130. In some embodiments, the services provided by the application server component 312 can include representational state transfer (REST)ful (RESTful) services that can have a RESTful architectural style and associated constraints to facilitate creation of web services. The application server component 312 can reside in the HRZ.

The DLDP 102 further can include a web server component 314 (WEB SERVER) that can employ a web application and provide web-related services to communication devices, such as communication device 138, associated with (e.g., communicatively connected to) the DLDP 102. The web server component 314 can be part of or associated with the user interface component 128. The web server component 314 can be situated at a point within or between the HRZ and a demilitarized zone (DMZ), which can be a perimeter network that can be a network area that can be positioned between the internal network of the DLDP 102 (e.g., the HRZ or other desirably secure internal network or area of the DLDP 102) and an external network, and can facilitate providing desirable isolation between the internal network of the DLDP 102 and the external network to facilitate desirable security of the internal network of the DLDP 102.

When a user desires to access information regarding the first set of data stores (e.g., 104, 106, and/or 108) associated with the first entity and/or the second set of data stores (e.g., 202, 204, and/or 206) associated with the second entity from the DLDP 102, the user can utilize the communication device 138 to connect to the DLDP 102 via the user interface component 128 (e.g., via the web server component 314 of or associated with the user interface component 128). The user and/or associated communication device 138 can provide authentication information (e.g., authentication credential(s) and/or an identifier, such as a device identifier) to facilitate authenticating the user and/or communication device 138 with the web server component 314. The web server component 314 can employ a desired authentication protocol(s) to authenticate the user and/or communication device 138. In accordance with various embodiments, the web server component 314 can utilize a single sign-on (SSO) authentication protocol, which can allow the user to log in and authenticate with the DLDP 102 using a user identification (user ID) and password, or can utilize multi-factor (e.g., two-step) authentication, which can have a user go through multiple steps, factors, or layers of authentication in order to authenticate the user and/or communication device 138 with the DLDP 102. In certain embodiments, the web server component 314 also can employ (e.g., can utilize or apply) identity and access management (IAM) policies, procedures, and technologies to facilitate ensuring that the proper (e.g., authorized) people of or associated with an entity (e.g., first entity or second entity) have the appropriate access (e.g., access that is authorized) to the data and resources of or associated with the DLDP 102 (e.g., DLDP 102, including the secure data store 130, the first set of data stores, or the second set of data stores, etc.). In accordance with IAM policies, the access to data and resources that is authorized for a person can be based at least in part on a role of that person in or in relation to an entity or can be based at least in part on another factor (e.g., a subscription level of a subscription of a user with an entity).

If the user and/or communication device 138 fail to provide proper authentication information to the web server component 314, the web server component 314 can deny the user and/or communication device 138 access to the DLDP 102. If, instead, the user and/or communication device 138 provide proper authentication information to the web server component 314, the web server component 314 can authenticate (e.g., approve access) to the DLDP 102, in accordance with the access level permitted for the user and/or communication device 138. The user, via the communication device 138, can submit a request for data to the DLDP 102 (e.g., via the user interface component 128 and web server component 314). In response to the request for data, the web server component 314 can initiate a secure API call to the application server component 312 (e.g., can call services or API endpoints in a secure manner) using a desired authentication protocol and service. In some embodiments, the web server component 314 can initiate the secure API call to the application server component 312 to facilitate authenticating the web server component 314 with the application server component 312, wherein the authentication can secure all communication endpoints (e.g., hypertext transfer protocol (HTTP) endpoints) with a desired level of authentication. The web server component 314 also can convey (e.g., communicate) the data request to the application server component 312.

If the application server component 312 receives proper authentication information from the web server component 314, the application server component 312 can authenticate the web server component 314 and associated user and/or communication device 138 with the application server component 312. In response to authenticating the web server component 314 (and associated user and/or communication device 138), and in response to the data request, the application server component 312 can call the server component 310 of or associated with the secure data store 130 using a desired data access API or other suitable data access mechanism. For example, the application server component 312 can call the server component 310 using Java database connectivity (JDBC) and/or a close function callback (e.g., Oracle Close Callback (OCC)), wherein the JDBC can be a Java-based data access API that can define how a client (e.g., application server component 312) can access the server component 310 (e.g., database of the server component 310).

The data management component 132 and/or server component 310 can determine whether the data request is permitted based at least in part on the level of access granted to the user and/or communication device 138, in accordance with a set of rules that can be based at least in part on the applicable law(s), regulation(s), and/or agreement(s) (e.g., first set of laws and regulations and/or first agreement; and/or second set of laws and regulations and/or second agreement). In response to determining that the data requested by the data request is permitted to be accessed by the user and/or communication device 138, the data management component 132 and/or server component 310 can determine the data that is responsive to the data request, and can provide such data to the communication device 138 and associated user via a secure communication channel, wherein, via the secure communication channel, the data management component 132 and/or server component 310 can forward the data to the application server component 312, which can forward the data to the web server component 314, which can forward the data to the communication device 138. The data management component 132 and/or user interface component 128 can present (e.g., display) the data in a desired format and desired user interface that can be desirable (e.g., suitable or optimal) with regard to the data requested.

Figure 4:
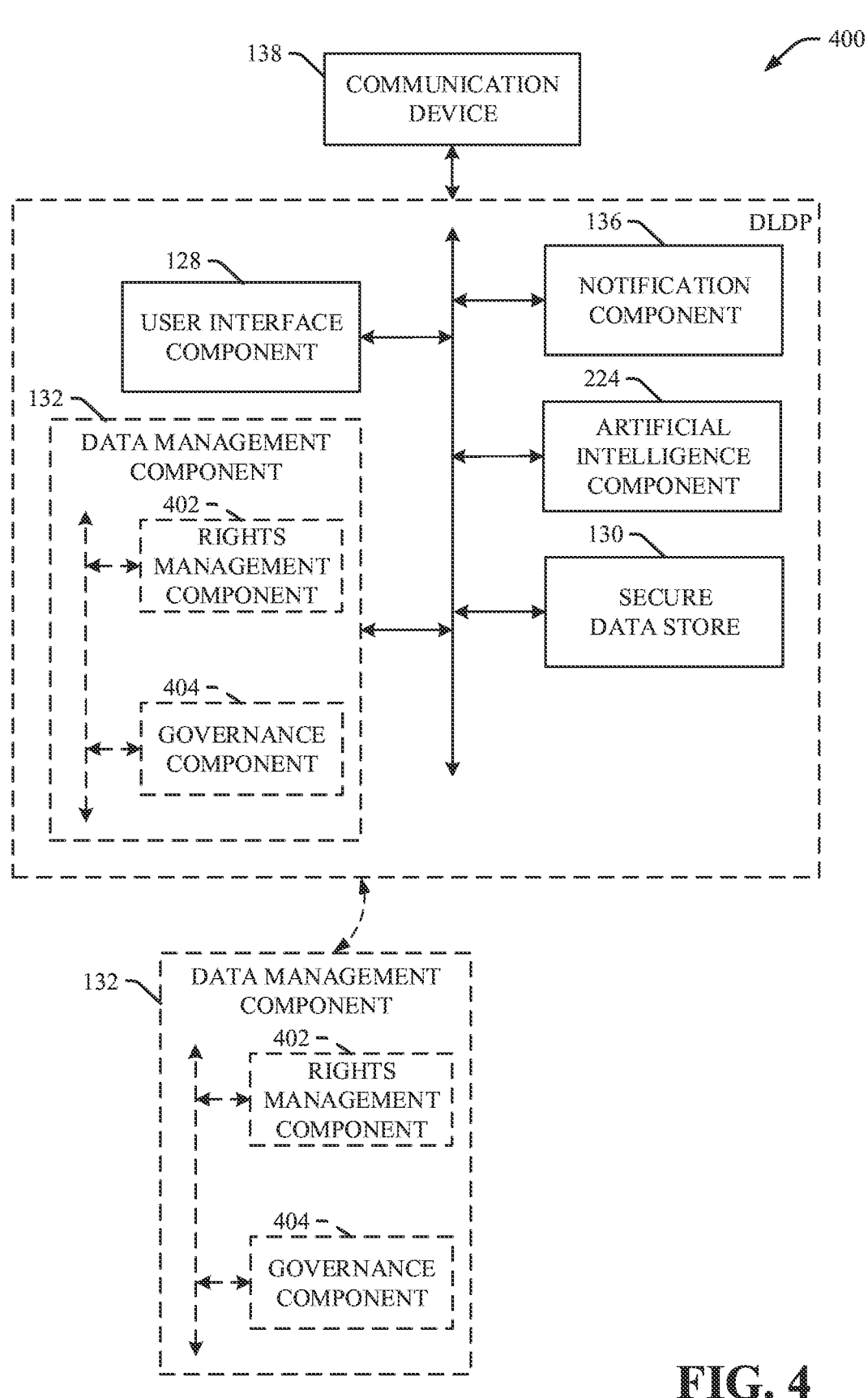
FIG. 4 illustrates a block diagram of an example system that can manage user data rights, governance, and data discovery with regard to data of users and information relating to the data of users that is stored in the DLDP or in data stores associated with the DLDP to facilitate desirably protecting and securing data of users and information relating thereto, in accordance with various aspects and embodiments of the disclosed subject matter.

Turning to FIG. 4 (along with FIGS. 1 and 2), FIG. 4 illustrates a block diagram of an example system 400 that can manage user data rights, governance, and data discovery with regard to data of users and information relating to the data of users that is stored in the DLDP or in data stores associated with the DLDP to facilitate desirably protecting and securing data of users and information relating thereto, in accordance with various aspects and embodiments of the disclosed subject matter. The system 400 can comprise the DLDP 102, the user interface component 128 of the DLDP, the secure data store 130 of the DLDP 102, the data management component 132 of the DLDP 102, and the AI component 224 of the DLDP 102. The system 400 also can comprise communication device 138, which can be associated with (e.g., communicatively connected to) the DLDP 102.

The data management component 132 can manage (e.g., control) scanning of, and discovery of the presence of, data of users, and information relating thereto, stored in data stores (e.g., the first set of data stores (e.g., 104, 106, and/or 108) or the second set of data stores (e.g., 202, 204, and/or 206), etc.) associated with entities, in accordance with the defined data management criteria. The data management component 132 can control a scanner component(s) (e.g., 124, 208, or 210) to scan desired data stores (e.g., the first set of data stores (e.g., 104, 106, and/or 108) or the second set of data stores (e.g., 202, 204, and/or 206), etc.) in real time, or substantially in real time, on a rolling basis, at periodic times, dynamically (e.g., in response to a condition or event), or as otherwise desired. The frequency or amount of scanning performed by the scanner component(s) (e.g., 124, 208, or 210) to scan respective data stores, as controlled by the data management component 132, can be based at least in part on applicable laws, regulations, or agreements.

In accordance with various embodiments, the data management component 132 can comprise a rights management component 402 and a governance component 404. The rights management component 402 can be or can comprise a rights management platform that can determine and facilitate enforcing rights of users with regard to their data and the information relating thereto that is stored in the secure data store 130 and/or data stores (e.g., the first set of data stores (e.g., 104, 106, and/or 108) or the second set of data stores (e.g., 202, 204, and/or 206)) associated with the DLDP 102, in accordance with the set of rules and the defined data management criteria. The rights management component 402 also can manage access of the data and the information relating thereto by users in the secure data store 130 and/or data stores (e.g., the first set of data stores or the second set of data stores) associated with the DLDP 102, in accordance with the set of rules and the defined data management criteria.

The rights management component 402 and/or the governance component 404 can analyze the respective laws and regulations associated with respective jurisdictions that are associated with respective users and respective entities, and respective agreements associated with respective users and respective entities, to facilitate determining respective sets of rights of respective users with regard to their data and information relating thereto. The rights management component 402 and/or the governance component 404 can determine the respective sets of rights of respective users with regard to their data and information relating thereto, based at least in part on the results of such analysis of the laws, regulations, and agreements.

For example, a first law or regulation associated with a first jurisdiction, and/or a first agreement, can provide users with a first set of rights with regard to their data and/or information relating thereto that is in the custody or control of entities (e.g., a first entity's data stores or systems) associated with the first jurisdiction, wherein the first set of rights can have a first scope (e.g., a scope that can indicate or specify how broad, extensive, or expansive each of the rights of the first set of rights is). A second law or regulation associated with a second jurisdiction, and/or a second agreement, can provide users with a second set of rights with regard to their data and/or information relating thereto that is in the custody or control of entities (e.g., a second entity's data stores or systems) associated with the second jurisdiction, wherein the second set of rights can have a second scope. Based at least in part on the results of the analysis of the first law and regulation, and/or first agreement, the rights management component 402 and/or the governance component 404 can identify the first set of rights of users with regard to their data and/or information relating thereto, the first scope of the first set of rights, and the first obligations of entities associated with (e.g., subject to) the first jurisdiction with regard to the first set of rights of users. Also, based at least in part on the results of the analysis of the second law and regulation, and/or the second agreement, the rights management component 402 and/or the governance component 404 can identify the second set of rights of users with regard to their data and/or information relating thereto, the second scope of the second set of rights of users, and the second obligations of entities associated with (e.g., subject to) the second jurisdiction with regard to second set of rights of users.

The rights of users with regard to their data and/or information relating thereto can comprise, for example, the right of access to their data and/or information relating thereto, the right to information, the right to rectification, the right of erasure, the right to restriction of processing, the right to data portability, the right to object, the right to avoid automated decision making, and/or other rights of users that can be specified in applicable laws, regulations, or agreements.

The right of access can allow a user to access his or her data, including personal or sensitive data, PII, and/or information relating thereto that belongs to the user and is in possession of or is processed by an entity via the systems, data stores, etc., of the entity. The personal or sensitive data can be or can comprise, for example, personal data elements or PII of the user, wherein PII can include any data (e.g., phone number, residential or mailing address, Social Security number, email address, biometric information, username, password, passcode, personal identification number (PIN), IP address, geolocation data, social media data, or digital images, etc.) that can be used to identify the user. The right of access also can allow the user the right to ask an entity why and how it processes the user's data, categories of the data of the user involved in the data processing, who (e.g., entity, what representatives of the entity, third-party entity, etc.) has access to the user's data, the length of time the entity intends to store the user's data, whether the entity uses automated decision making with regard to the user's data, and/or other rights of access the user can have with regard to their data as specified in the particular law, regulation, or agreement that provides such right of access.

The right to information can involve the right of users to information that an entity has to provide users when the entity is collecting data (e.g., personal or sensitive data) from users (e.g., data subjects). For instance, a user can have the right to inquire an entity (e.g., entity storing or controlling data of users) what types of data (e.g., data of or associated with users) the entity processes and why the entity wants such data. The right to information in a law, regulation, or agreement also can specify when (e.g., at time of or prior to collecting the data; or within a defined time thereafter) the entity has to provide a use the information that is to be disclosed or provided to the user pursuant to the right of information. The right of information can include, for example, identity information regarding the identity of the entity, legal basis and purposes for processing the data of users, identification of the country where the processing of data will occur, identification of legitimate interests of the entity and third party entities with regard to the data of users, identification of recipients of data (e.g., personal or sensitive data) of users, information regarding the intent of an entity to transfer data of users outside of the identified country to a third country for processing, information regarding the data retention policy of the entity, information explaining the various rights of users with regard to their data, information explaining a right of the user to withdraw consent with regard to their data, tracking of activity of the user or electronic communications between the entity and the user, information regarding the existence of automated decision making with regard to data of users, and/or other information relating to the right of information.

The right to rectification can provide a user with the right to modify (e.g., alter, revise, or change) their data when the user believes or finds that their data in custody of (e.g., stored or processed by) an entity is wrong, inaccurate, out of date, or otherwise not valid. The right to rectification also can specify how long an entity has to respond to, address, process, or complete an action relating to a user's right to rectification when the user exercises such right (e.g., when the user requests that incorrect or invalid data of the user be modified). The right of rectification also can indicate the mechanisms or ways that the entity is provide to a user in order to enable the user to exercise the right to rectification.

The right of erasure (also colloquially known as the right to be forgotten) provides a user the right to request an entity to delete data (e.g., personal or sensitive data) of the user of which the entity has custody (e.g., data of the user that is stored in a data store of the entity). The right to erasure also can specify how long an entity has to respond to, address, process, or complete an action (e.g., deleting the user's data) relating to a user's right to erasure when the user exercises such right (e.g., when the user requests that the user's data be deleted by the entity). The right of erasure also can indicate the mechanisms or ways that the entity is provide to a user in order to enable the user to exercise the right to erasure. As part of the scope of the right of erasure, the right of erasure also can indicate or specify instances, situations, or circumstances under which the right of erasure does not apply, such as, for example, when the entity is required by applicable law or regulation to retain the data of users in their data stores or systems for at least a defined period of time, when retaining the data of the user is determined to be necessary for public health interests or in the public interest, when retaining the data of the user is determined to be necessary to perform preventative or occupational medicine, or when the data of the user is being used to exercise legal claims or establish a legal defense to a legal claim.

The right to restriction of processing can provide a user the right to request that an entity restrict processing of data of user under certain conditions. For instance, the user can exercise the right to restriction of processing of data of the user that the user contends or believes is inaccurate, when the user objects to unlawful processing of the user's data, or when the entity does not have to have the user's data for processing, but does have to retain the user's data in its systems or data stores by law or to enable the entity to exercise a legal claim or establish a legal defense to a legal claim. The length of time of the restriction of processing can be temporary (e.g., for a defined or undefined period of time) or can be permanent.

The right to data portability can provide that a user have a right to obtain (e.g., obtain a copy of) the data (e.g., personal or sensitive data) of the user that is in the custody of (e.g., stored in the systems or data stores of or associated with) the entity, under certain conditions or circumstances. Under such certain conditions or circumstances, the user can exercise right to data portability, for example, to obtain the user's data for personal use or purposes, or to provide the user's data to another entity for storage or processing. The right to data portability also can indicate or specify a data or file format(s) that can or is to be utilized when providing the user's data to the user or can indicate or specify that the entity is to provide the user's data to the user in a structured, commonly used, and machine-readable format. The right to data portability also can specify how long an entity has to respond to, address, process, or complete an action relating to a user's right to data portability when the user exercises such right to request that the entity provide the user's data to the user or another entity.

The right to object can allow a user to object to the processing of data of the user, including profiling, by an entity, under certain conditions or circumstances. For instance, the user can exercise the right to object to processing of the user's data by the entity when the processing of the user's data relates to direct marketing to the user (e.g., entity sending marketing emails to the user). The right to object also can specify how long an entity has to respond to, address, process, or complete an action relating to a user's right to object when the user exercises such right (e.g., can specify how long the entity has to cease sending marketing emails to the user). The right to object (or another right of the user) can indicate or specify that the entity has to disclose the user's right to object (and/or disclose the other rights the user has) to the user (e.g., in a privacy policy statement).

The right to avoid automated decision making can provide a user the right to not be subject to a decision of the entity based solely on automated processing or decision making, including profiling, except under certain circumstances, as defined by law, regulation, or agreement. As part of exercising the right to avoid automated decision making, the user can request to have human intervention to have a human user (e.g., human representative of or associated with the entity) intervene and interact with the user.

In addition to or as an alternative to these rights of users, depending on the applicable law, regulation, or agreement, a user can have certain other rights relating to the use, storage, or processing of the user's data by an entity, consent (e.g., explicit or implicit consent) or withdrawal of consent with regard to the user's data or electronic communications between the entity and the user, and personalization of the user's data or of the user by the entity, etc.

The rights management component 402 or governance component 404 can monitor and track the exercising of the various rights of users by users and the responses or actions taken by entities in response to the exercising of the various rights of users by users. Based at least in part on the monitoring and tracking, the rights management component 402 or governance component 404 can determine whether respective entities are desirably (e.g., suitably, sufficiently, or acceptably) complying with the respective sets of rights of respective users, in accordance with respective applicable laws, regulations, or agreements, as more fully described herein.

With further regard to the governance component 404, the governance component 404 (e.g., governance platform) can determine and enforce the set of rules, which the governance component 404 can determine based at least in part on respective laws and regulations of respective jurisdictions and/or respective agreements, in accordance with the defined data management criteria, as more fully described herein. The governance component 404 also can determine levels of compliance (e.g., with laws, regulations, or agreements) and/or risk scores for or with regard to KRI metrics, the DLDP 102, the rights management platform, the governance platform, another platform, a set of data stores (e.g., the first set of data stores (e.g., 104, 106, and/or 108) or the second set of data stores (e.g., 202, 204, and/or 206)), and/or an entity (e.g., the first entity or the second entity), etc., as more fully described herein.

In some embodiments, the rights management platform 402 and the governance component 404 can be part of the DLDP 102. In other embodiments, the rights management platform 402 and/or the governance component 404 can be separate from and associated with (e.g., communicatively connected to) the DLDP 102.

Figure 5:
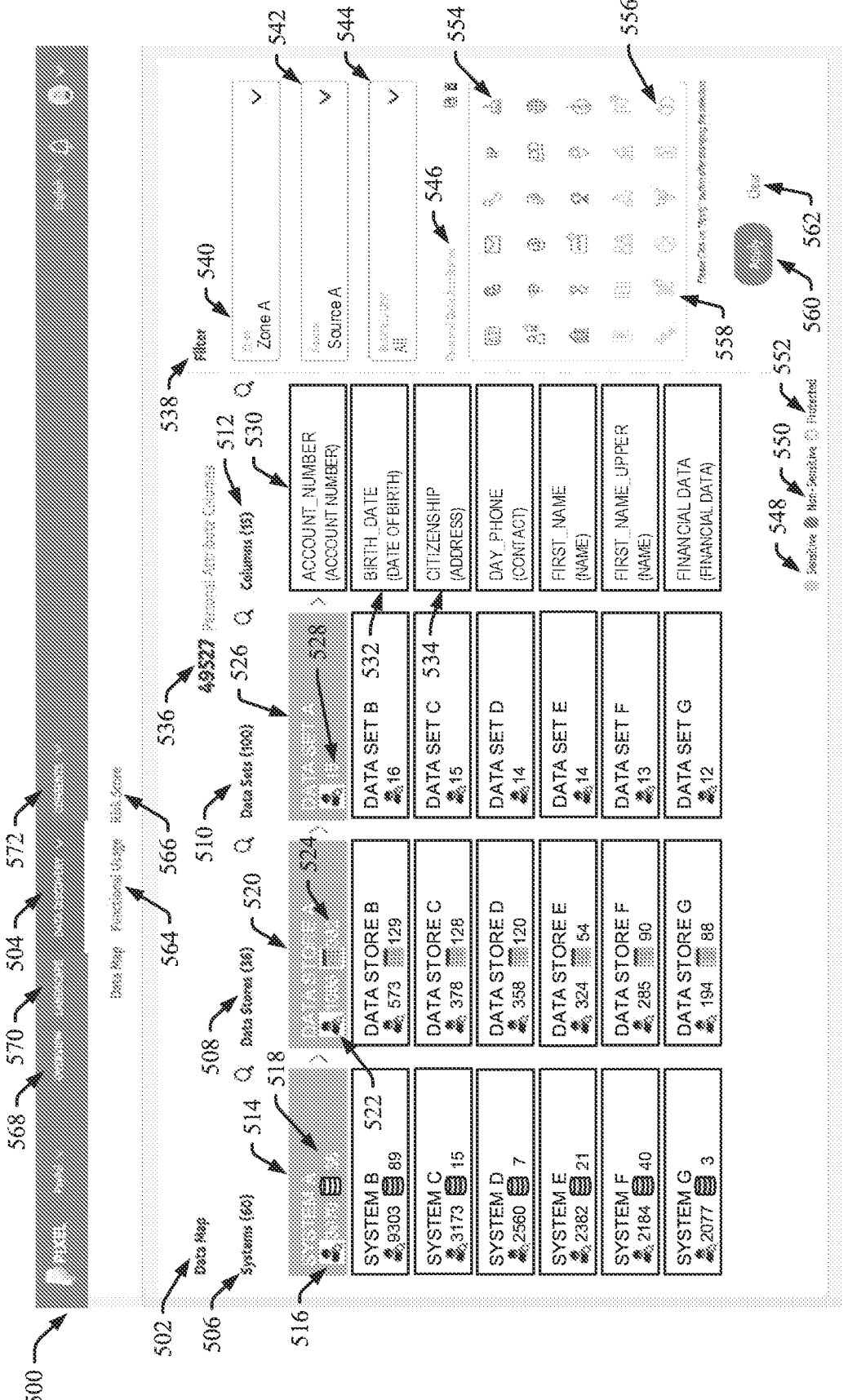
FIG. 5 presents a diagram of an example user interface relating to example data that can be presented to a user by the DLDP 102 in response to a data request, in accordance with various aspects and embodiments of the disclosed subject matter.

Referring to FIG. 5 (along with FIGS. 1, 2, and 4), FIG. 5 presents a diagram of an example user interface 500 relating to example data that can be presented to a user by the DLDP 102 in response to a data request, in accordance with various aspects and embodiments of the disclosed subject matter. For instance, a user can desire to view or obtain certain data associated with the first entity and stored in the first set of data stores (e.g., 104, 106, and/or 108) associated with the first entity. The user, using communication device 138, can authenticate with the DLDP 102, as more fully described herein. In response to being authenticated by the DLDP 102, the rights management component 402 can determine what access rights the user and/or communication device 138 is permitted to have to access data tracked and/or managed by the DLDP 102 in the secure data store 130 and data stores (e.g., the first set of data stores (e.g., 104, 106, and/or 108)) associated with the DLDP 102, based at least in part on the authentication information provided by the user and/or communication device 138, a role of the user with or in relation to the first entity, and/or another desired factor. The rights management component 402 can grant the user and/or communication device 138 a set of access rights, in accordance with the determination regarding the access rights the user and/or communication device 138 is permitted to have.

The user, via the communication device 138, can submit a data request to request certain data. Example user interface 500 can be example results to the data request. The example user interface 500 can comprise a data map 502 that can provide information regarding data associated with the first entity, as stored in the first set of data stores (e.g., 104, 106, and/or 108), or portion thereof, and/or the secure data store 130, as part of data discovery 504 of the DLDP 102. The data map 502 can provide information regarding, for example, the systems 506 of or associated with the first entity, data stores 508 for each of the systems 506, data sets 510 for each of the data stores 508, and columns 512 for each of the data sets 510 (e.g., as such information has been filtered by the selected filters, such as described herein). With regard to each system, such as SYSTEM A 514, of the systems 506, the DLDP 102 can provide information regarding the number of personal data elements 516 (e.g., 3970 personal data elements) and the number of data stores 518 (e.g., 36 data stores) in which those personal data elements are stored. With regard to each data store, such as DATA STORE A 520, of the data stores 508, the DLDP 102 can provide information regarding the number of personal data elements 522 (e.g., 1065 personal data elements) and the number of data sets 524 (e.g., 15 data sets) in which such personal data elements are stored. With regard to each data set, such as DATA SET A 526, of the data stores 508, the DLDP 102 can provide information regarding the number of personal data elements 528 (e.g., 15 personal data elements) that are stored in that data set. The columns 512 portion of the user interface 500 can present various personal data elements, such as, for example, account number 530, birth date 532, and/or citizenship 534, etc. Other types of personal data elements (e.g., PII elements or personal attributes) can include, for example, full name (e.g., first name, last name, and/or maiden name), phone number (e.g., day phone number, home phone number, work phone number, and/or cell phone number), home address, work address, email address, Social Security Number, passport number, driver's license number or other government ID number, financial information (e.g., bank or credit account information, loan information, income information, or wealth information, etc.), age, education, gender, race, ethnicity, national origin, religion, genetic information, health information, political affiliation, trade union membership, location information, transaction history information, marital status information, family information, communication services provider (e.g., Internet service provider), log in or authentication information, biometric information, and/or other desired information regarding users or entities.

The user interface 500 also can present information indicating the overall number of personal attribute columns 536 (e.g., 49527 personal attribute columns (or personal data element columns)) contained in the systems 506 (e.g., as such information has been filtered by the selected filters, such as described herein). The data management component 132 can facilitate presenting various types of filters 538 to the user via the user interface 500, and the user can apply desired filters to the information to filter out undesired information. For instance, as shown in the example user interface 500, there can be a zone filter 540 that can filter the information by zone(s). In the example user interface 500, a filter for ZONE A has been applied to filter the information to include information relating to ZONE A. Also, as shown in the example user interface 500, there can be a source filter 542 that can filter the information by source(s) of the information. In the example user interface 500, a filter for SOURCE A has been applied to filter the information to include information relating to SOURCE A. Further, as shown in the example user interface 500, there can be a business unit filter 544 that can filter the information by business unit(s) associated with the information. In the example user interface 500, an all filter for all business units has been applied to filter the information to include information relating to all of the business units.

In some embodiments, the user interface 500 can present personal data attributes filters 546, which can be presented in a desired form, such as, icons, as depicted in the user interface 500. Respective icons can represent respective types of personal data attribute filters. In certain embodiments, the icons of the personal data attributes filters 546 can be colored, highlighted, or modified to represent different types of information or different types of information statuses (e.g., data privacy status or attribute). For example, sensitive personal data can be represented by a first color 548 to indicate that the personal data is considered to be sensitive, non-sensitive data can be represented by a second color 550 to indicate that such personal data is considered to be non-sensitive, and/or protected data can be represented by an icon modified to have a lock 552 to indicate that such personal data can be protected personal data. In the example user interface 500, the birth date filter icon 554 can have the second color 550 to indicate that birth date information regarding users is considered to be non-sensitive; the birth date filter icon 554 can have the second color 550 to indicate that birth date information regarding users is considered to be non-sensitive; the marital status filter icon 556 can have the first color 548 to indicate that marital status information regarding users is considered to be sensitive; and the biometric information filter icon 558 can have the first color 548 and a lock to indicate that biometric information regarding users is considered to be sensitive and protected personal data. It is to be appreciated and understood that different types of data can be considered to be sensitive, non-sensitive, or protected data based at least in part on applicable laws, regulations, and/or agreements, and/or as desired by the entity (as permitted by the applicable laws, regulations, and/or agreements), in accordance with the defined data management criteria.

To apply one or more filters to the information, the user can select one or more desired filters and press the apply button 560 to apply the one or more filters to the information. To remove or clear filters, the user can select the clear button 562 to remove or clear any filters that had been applied to the information.

As also can be observed in the example user interface 500, in accordance with various aspects and embodiments, as desired, and when in accordance with the set of access rights granted to the user, the user can access information regarding functional usage 564, which can indicate the functions of the DLDP 102 or system that the user has access rights to access and/or that the user is utilizing, and/or the user can access information regarding risk scores 566, which can indicate the risk scores (e.g., risk levels or ratings) of various parts of the system (e.g., risk scores of KRI metrics, risk score of the DLDP 102, risk score of the access rights platform, risk score of the governance platform, and/or risk score for the third party management platform, etc.).

The example user interface 500 also can enable the user, when in accordance with the set of access rights, to view an overview 568 of the information associated with the first entity that is tracked and managed by the DLDP 102, a landscape 570 of the physical and/or logical relationships between various systems, data stores, databases, data sets, and/or other data layers or types associated with the first entity. The example user interface 500 also can enable the user, when in accordance with the set of access rights, to view information relating to consents 572 of users including information regarding types of consents that can be given by users and/or types of consents that have been given by users with regard to data (e.g., personal data) of users.

Figure 6:
FIG. 6 presents a diagram of an example user interface relating to example data that can be presented in a first language to a user by the DLDP in response to a data request, in accordance with various aspects and embodiments of the disclosed subject matter.
Figure 7:
FIG. 7 presents a diagram of an example user interface relating to example data that can be presented in a second language to a user by the DLDP in response to a data request, in accordance with various aspects and embodiments of the disclosed subject matter.

Turning to FIGS. 6 and 7 (along with FIGS. 1, 2, and 4), FIG. 6 presents a diagram of an example user interface 600 relating to example data that can be presented in a first language to a user by the DLDP 102 in response to a data request, and FIG. 7 presents a diagram of an example user interface 700 relating to example data that can be presented in a second language to a user by the DLDP 102 in response to a data request, in accordance with various aspects and embodiments of the disclosed subject matter. In the example user interface 600, in response to a data request from the user, and when in accordance with the set of access rights granted to the user by the rights management component 402, the data management component 132 can determine and generate the example data in the first language (e.g., English) and can present the example data via the user interface 600. For instance, based on the data request, the data management component 132 can generate a scan overview 602 associated with the first entity and relating to the scanning performed of the systems, including the first set of data stores (e.g., 104, 106, and/or 108), associated with the first entity. The scan overview 602 can include an overall risk score 604 (e.g., 25/100, low risk) associated with the first entity (e.g., associated with the systems, data stores, or data, etc.) associated with the first entity, and other information, such as, for example, information relating to the number of environments 606, information relating to the number of databases 608, information relating to the number of tables containing PII 610, information relating to the number of data sources 612, information relating to the number of tables 614, and information relating to the number of PII columns 616, as all such information was discovered as a result of scanning of the systems, data stores, etc., by the scanner component (e.g., 124 or 208).

Also, based on the data request, the data management component 132 can determine and generate a scan trend 618 over a defined period of time (e.g., last 12 months) of the scanning of the systems, data stores, etc., associated with the first entity, where the scan trend 618 can indicate the coverage 620 of the scanning at given times (e.g., each month) over the defined time period, the amount of sensitive data 622 discovered through scanning at the given times, and the core PII 624 discovered through scanning at the given times, as well as the total number of items of core PII 626 and total number of items of sensitive data 628 discovered through scanning over the defined time period.

The data management component 132 also can determine and generate a scan coverage 630 that can indicate the percentage of tables associated with the first entity that have been scanned and the percentage of tables associated with the first entity for which scanning is still pending. Further, as desired, in response to the data request, the data management component 132 can determine and generate a data distribution by geography 632 that can provide information regarding the distribution of sensitive data, core PII, number of data sources, etc., per geographical region (e.g., continent, country, state, territory, or province, etc.), with regard to the first entity. Also, as desired, in response to the data request, the data management component 132 can determine and generate information relating to sensitive data categories 634 that, for each of desired categories of sensitive data, can indicate a distribution of each such type of sensitive data and/or a number of items of each such type of sensitive data.

With regard to the example user interface 700 of FIG. 7, the data management component 132 can present the same example data as presented in the example user interface 600 of FIG. 6, except that the data management component 132 can generate the example data in a second language (e.g., Spanish), and can present the example data in the second language in the example user interface 700 to the user. The language that the data management component 132 utilizes to present the information to the user via a user interface (e.g., user interface 600, or user interface 700, etc.) can be determined by the data management component 132 based at least in part on the language employed in the data as it is collected through scanning, a language preference of the user, a location of the user, and/or another desired factor. For example, if the language of the data was in Spanish as it was scanned from the systems, data stores, etc., associated with an entity, the data management component 132 can present the data, or portion thereof, or information relating to or based on the data, in Spanish in a user interface. As another example, alternatively, if there is a user preference to have information conveyed in a first language (e.g., English), and the data is in a second language (e.g., Spanish) when it is scanned from the systems, data stores, etc., associated with an entity, based on the user preference, the data management component 132 can translate the data, or portion thereof, or information relating to or based on the data, from the second language to the first language, and can present the data and/or associated information in the first language in the user interface to the user.

Figure 8:
FIG. 8 depicts a diagram of an example user interface that can comprise information relating to data collection with regard to data associated with an entity, in accordance with various aspects and embodiments of the disclosed subject matter.

Referring to FIG. 8 (along with FIGS. 1, 2, and 4), FIG. 8 depicts a diagram of an example user interface 800 that can comprise information relating to data collection with regard to data associated with an entity, in accordance with various aspects and embodiments of the disclosed subject matter. The data management component 132 can determine and generate the data presented in the user interface 800 in response to a request from a user (e.g., authorized and/or authenticated user), and in accordance with a set of access rights that can be granted to the user based at least in part on a set of rules, in accordance with the defined data management criteria. For instance, in response to the data request, and based at least in part on a results of the scanning of the data from the systems, data stores (e.g., 104, 106, and/or 108), data, etc., associated with the first entity, and an analysis of such data, the data management component 132 can determine and generate information regarding the PII collected by all channels 802, which can include, for example, the percentage of the PII that was collected by the DLDP 102 via API, the percentage of the PII obtained by the DLDP 102 via file transfer, and the percentage of PII obtained by the DLDP 102 via email.

Also, based at least in part on the results of the data scanning, and the analysis of such data, the data management component 132 can determine and generate information regarding PII collected by all business functions 804 associated with the first entity, including, for example, information regarding PII collected by onboarding, compliance, customer success operations (CS-OPS), marketing, and risk, wherein, for each business function, the information regarding such PII can be aggregated or broken down by the amount or percentage of PII collected by channel (e.g., API, file transfer, or email).

As desired, and based at least in part on the results of the data scanning, and the analysis of such data, the data management component 132 also can determine and generate information regarding PII attributes 806 for PII collected by all business functions associated with the first entity, including, for example, information regarding PII collected by name, contact number, address, email gender, and date of birth (DOB), and/or can indicate which types of PII (e.g., gender information) are considered sensitive information (e.g., by using a color code or other type of emphasis to indicate the type of information is sensitive information).

In connection with data collection, the DLDP 102 can enable the user to apply desired filters 808 to filter the data collection to have the DLDP 102 collect desired data based at least in part on one or more selected filters. For instance, as presented in the example user interface 800, the DLDP 102 can enable filtering by process 810 (e.g., process of data collection) or PII 812, method 814 of data collection (e.g., method or channel of data collection, such as, for example, API, file transfer, or email, etc.), boundary 816 of the data collection (e.g., internal or external), business function 818, and PII attributes 820. The apply button 822 can be utilized to apply the selected filters, and the clear button 824 can be utilized to clear any filters that had been applied. As depicted in the example user interface 800, process 810 has been selected, API has been selected as the method, the boundary that is selected is internal, the business function that is selected is onboarding, and there are four PII attributes selected. Based at least in part on the selected filters, the DLDP 102 can filter the collected data to present filtered information 826 comprising information regarding onboarding with regard to the four selected PII attributes, name 828, email 830, biometrics 832, and rewards 834, wherein the information regarding name 828 and email 830 can be non-sensitive information, and wherein the information regarding biometrics 832 and rewards 834 can be sensitive information. The user can select a PII attribute(s) (e.g., name 828, email 830, biometrics 832, or rewards 834) in the user interface 800 to obtain further information (e.g., to drill down to see additional information) regarding the selected PII attribute(s).

Figure 9:
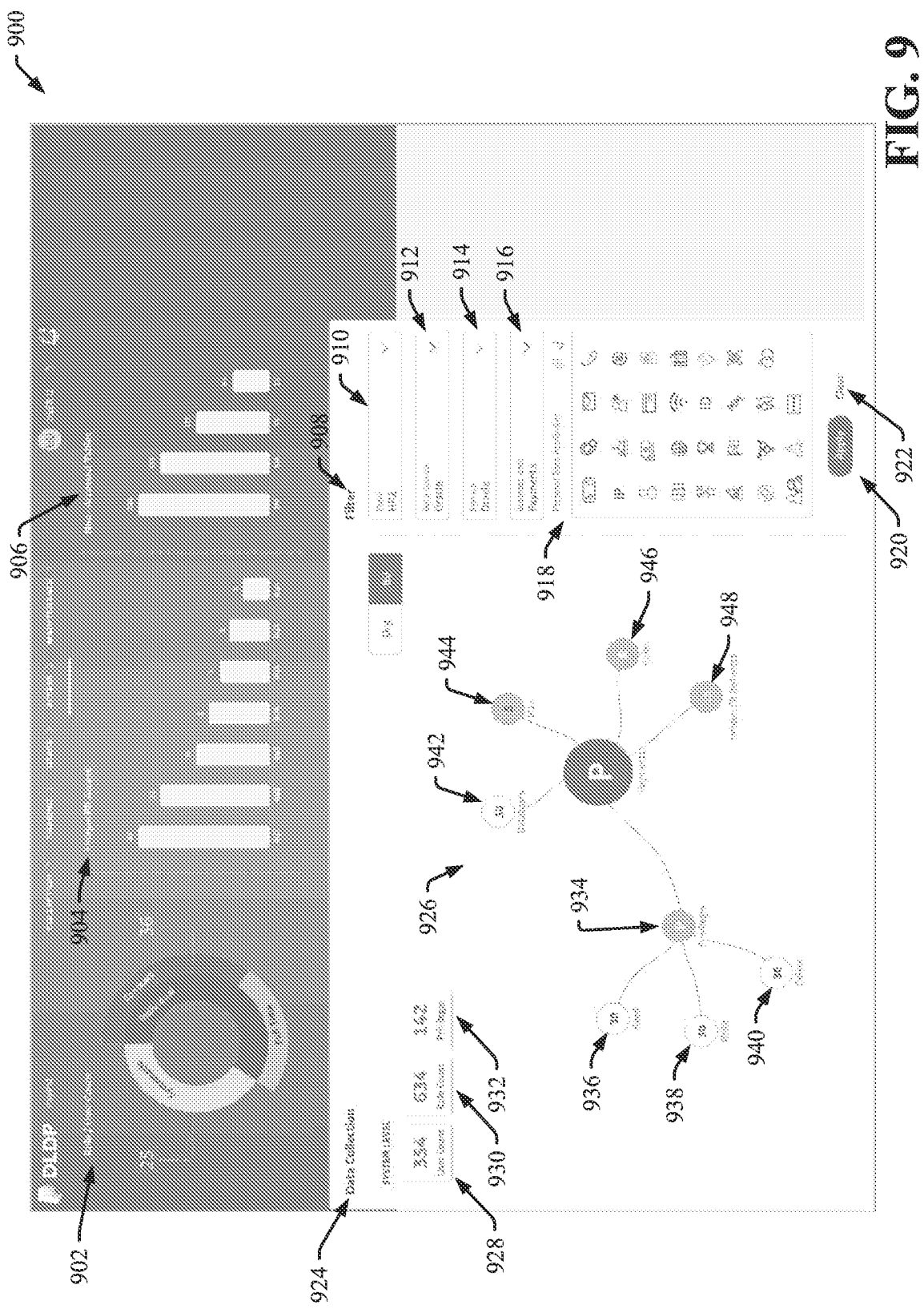
FIG. 9 illustrates a diagram of an example user interface that can comprise information relating to access of data and access controls to control access to data associated with an entity, in accordance with various aspects and embodiments of the disclosed subject matter.

Turning to FIG. 9 (along with FIGS. 1, 2, and 4), FIG. 9 illustrates a diagram of an example user interface 900 that can comprise information relating to access of data and access controls to control access to data associated with an entity, in accordance with various aspects and embodiments of the disclosed subject matter. The data management component 132 can determine and generate the data presented in the user interface 900 in response to a request from a user (e.g., authorized and/or authenticated user), and in accordance with a set of access rights that can be granted to the user based at least in part on a set of rules, in accordance with the defined data management criteria. The data management component 132 (e.g., the rights management component 402 of the data management component 132) can track the accessing of data, including personal, sensitive, and/or protected data of customers, associated with the first entity by users (e.g., users of or associated with the first entity, or users associated with a third party entity, etc.) and access controls implemented on the data, and can determine whether appropriate access controls have been implemented to desirably (e.g., sufficiently) protect the data of customers, particularly the personal, sensitive, and/or protected data of the customers. The data management component 132 can provide details regarding, for example, the number of users who have performed read operations, write operations, or delete operations on data (e.g., personal, sensitive, and/or protected data) of customers across the various systems, data stores (e.g., 104, 106, and/or 108), etc., associated with the first entity and whether such read operations, write operations, or delete operations were appropriate or not (e.g., whether such access to data and such operations by the users were permitted based at least in part on the applicable laws, regulations, and/or agreements).

For instance, in response to a data request from the user, and based at least in part on a results of the scanning of the data from the systems, data stores (e.g., 104, 106, and/or 108), data, etc., associated with the first entity by the scanner component (e.g., scanner component 124 or 208), and an analysis of such data, the data management component 132 can determine and generate information regarding the role and user count 902 of the users who accessed the data or performed operations on the data, and can present such information regarding the role and user count 902 to the requesting user via the example user interface 900. The information regarding the role and user count 902 can indicate, for example, the number of individual users who have accessed the data and/or performed operations on the data over a defined period of time, the number of systematic data accesses or data operations that have been performed, the respective roles (e.g., full-time employee of the first entity, or a user who is under contract with the first entity) of the individual users who have accessed the data in the systems, data stores, etc., associated with the first entity.

Also, based at least in part on the results of the data scanning by the scanner component (e.g., scanner component 124 or 208), and the analysis of such data, the data management component 132 can determine and generate information regarding unique PII access 904 of data (e.g., PII) of users by business unit (BU), such as BU1, BU2, BU3, etc., and information regarding non-accessed tables 906 in the first set of data stores (e.g., 104, 106, and/or 108) to indicate which tables in the data stores have not been accessed over different time periods (e.g., in the last 3 months, last 6 months, last year, and last two years).

Further, in connection with presenting information regarding data access and access controls, the DLDP 102 can enable the user to apply desired filters 908 to filter information relating to data access and access controls to have the DLDP 102 present desired (e.g., filtered) data based at least in part on one or more selected filters. For instance, as presented in the example user interface 900, the DLDP 102 can enable filtering by zone 910 (e.g., HRZ, DMZ, or HRZ-DMZ), data source 912, system 914 of the first entity, business unit 916 of the first entity (e.g., the whole organization of the first entity, or one or more particular business units of the organization), and personal data attributes 918. The apply button 920 can be utilized to apply the selected filters, and the clear button 922 can be utilized to clear any filters that had been applied. As depicted in the example user interface 900, for zone 910, HRZ has been selected, for data source 912, Oracle has been selected, for system 914, Oracle has been selected, and for business unit 916, payments has been selected.

The data management component 132 can filter the information based at least in part on the selected filters. In accordance with the filters, the data management component 132 can present the filtered information, which can include, the system level information 924 and the data mapping 926. The system level information 924 can comprise, with regard to the payments business unit, the user count 928, which can indicate the number of users who have accessed the data or performed operations over the defined time period, the role count 930, which can indicate the number of roles associated with the users, and the privilege number 932, which can indicate the number of privileges over the defined time period. The information relating to the data mapping 926 can include, with regard to the payments business unit, information relating to privileges 934, and information relating to read operations 936, write operations 938, and delete operations 940 performed by users, wherein the operations information can comprise the number of operations or more detailed information regarding such operations (e.g., by selecting read operations 936, write operations 938, or delete operations 940). The information relating to the data mapping 926 also can comprise information relating to the databases 942 that contain information associated with the payments business unit and were accessed by users. The information relating to the data mapping 926 further can include information relating to the business units 944 associated with the payments business unit, roles information 946 relating to roles of users who accessed data relating to the payments business unit, and information relating to unique PII instances 948 associated with the payments business unit and data accessed by users, wherein the information relating to unique PII instances 948 can comprise the number of unique PII instances or more detailed information regarding such unique PII instances.

Figure 10:
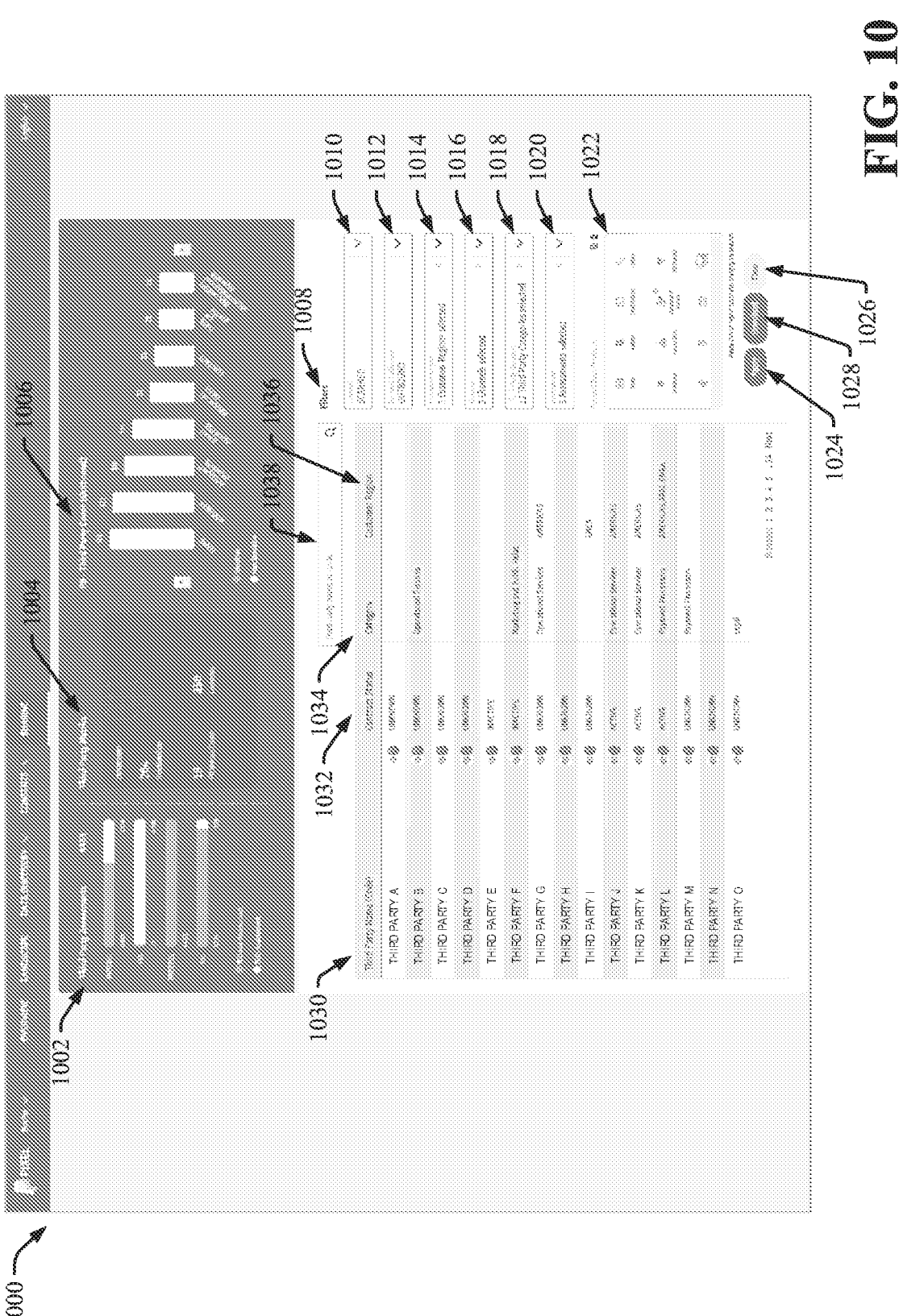
FIG. 10 depicts a diagram of an example user interface that can comprise information relating to data sharing of data associated with an entity with third party entities, in accordance with various aspects and embodiments of the disclosed subject matter.

Turning to FIG. 10 (along with FIGS. 1, 2, and 4), FIG. 10 depicts a diagram of an example user interface 1000 that can comprise information relating to data sharing of data associated with an entity with third party entities, in accordance with various aspects and embodiments of the disclosed subject matter. The data management component 132 can determine and generate the information presented in the user interface 1000 in response to a request from a user (e.g., authorized and/or authenticated user), and in accordance with a set of access rights that can be granted to the user based at least in part on a set of rules, in accordance with the defined data management criteria. The data management component 132 (e.g., the rights management component 402 of the data management component 132) can track the accessing and sharing of data, including personal, sensitive, and/or protected data of customers, associated with the first entity with third party entities, and can determine whether the data shared with the third party entities was only for permitted purposes, in accordance with applicable laws, regulations, agreements (e.g., SLA or vendor agreement), and/or notices (e.g., notices provided to users regarding the sharing of data of users with third party entities).

In response to a data request relating to third party data sharing that is received from the user, and based at least in part on a results of the scanning of the data from the systems, data stores (e.g., 104, 106, and/or 108), data, etc., associated with the first entity by the scanner component (e.g., scanner component 124 or 208), and an analysis of such data, the data management component 132 can determine and generate information regarding third party assessments 1002, which can include information regarding, for example, information security (INFOSEC), risk or impact assessments (e.g., privacy impact assessment (PIA)), process, and/or records and information governance (RIG), and can indicate whether such information is with assessment or without assessment. The data management component 132 also can determine and generate information regarding third party metrics 1004, which can include information regarding outbound data sharing (e.g., data outbound from the first entity to third entities), such as, for example, the number of relationships of the first entity with third party entities, the PIT unique count, and/or the number of countries (e.g., countries where third party entities are located). The data management component 132 can present such information regarding third party metrics 1004 to the requesting user via the user interface 1000.

In response to the data request, the data management component 132 further can determine and generate information regarding PII—third party count 1006, which can comprise information regarding respective types (e.g., attributes) of personal data of users (e.g., customers) and the number of third party entities with which the respective types of personal data have been shared. The personal data of users (e.g., name, address, account number, or email address, etc.) can be indicated as being sensitive data or non-sensitive data, for example. The data management component 132 can present such information regarding PII—third party count 1006 to the requesting user via the user interface 1000.

Further, in connection with presenting information regarding data access and access controls, the DLDP 102 can enable the user to apply desired filters 1008 to filter information relating to data sharing with third party entities to have the DLDP 102 present desired (e.g., filtered) data based at least in part on one or more selected filters. For instance, as presented in the example user interface 1000, the DLDP 102 can enable filtering by whether the data has been scanned 1010 (e.g., scanned or not scanned), inbound or outbound 1012, customer region 1014 (e.g., by continent, country, state, province, district, or other region or jurisdiction), channel 1016 of sharing of data (e.g., API, file transfer, or other channel), third party category 1018 (e.g., operational services, marketing and public relations, payment processors, or legal, etc.), assessment 1020, and personal data attributes 1022. The apply button 1024 can be utilized to apply the selected filters, and the clear button 1026 can be utilized to clear any filters that had been applied. As depicted in the example user interface 1000, for scanned 1010, scanned has been selected to indicate the information was scanned from the systems, data stores, etc., associated with the first entity, for inbound outbound 1012, outbound has been selected to indicate filtering information to include information that was shared outbound from the first entity to third party entities, for customer regions 1014, five customer regions have been selected, for channel 1016, three channels have been selected, for third party category 1018, twelve third party categories have been selected, and for assessment 1020, five assessments have been selected. In some embodiments, the user interface 1000 can include a download button 1028 that can be selected by the user to download the information (e.g., filtered information) relating to data sharing with third party entities.

The data management component 132 can filter the information based at least in part on the selected filters. In accordance with the filters, the data management component 132 can present the filtered information, which can comprise, for example, third party names 1030 (e.g., third party A, third party B, or third party C, etc.), contract status 1032 (e.g., active, inactive, or unknown) to indicate the respective contract statuses of the third party entities with the first entity, category 1034, which can indicate the respective categories (e.g., operational services, marketing and public relations, payment processors, or legal, etc.) of the relationships of the third party entities with the first entity, and customer region 1036, which can indicate the respective regions (e.g., Americas, including, for example, North America, Central America, and South America; Europe, Middle East, and Africa (EMEA); or Asia Pacific (APAC); etc.) covered by the third party entities. The data management component 132 can present such information (e.g., filtered information) regarding third party names 1030, contract status 1032, category 1034, customer region 1036, and/or desired filtered information to the requesting user via the user interface 1000.

In some embodiments, the user interface 1000 can provide a search function 1038 that can enable the user to enter search terms (e.g., third party name or code or other desired search term) to filter information based at least in part on the search terms entered into the search function 1038. Based at least in part on the search terms entered in the search function 1038 and/or the filters 1008 selected, the data management component 132 can filter the information (e.g., information relating to data sharing with third party entities) to present desired filtered information in the user interface 1000 or another user interface associated with (e.g., user interface that can be accessed via selection of a button on) the user interface 1000.

While enabling a requestor (e.g., user, entity, or device) to use the search function 1038 and search terms to search for data of a user(s) (e.g., the requesting user or another user), the data management component 132 can desirably (e.g., to a high degree, suitably, or optimally, etc.) secure and protect data of the user(s), and/or information relating thereto, that is stored in the secure data store 130 or in a data store (e.g., data store(s) 104, 106, and/or 108) associated with the DLDP 102, in accordance with the defined data management criteria, the corresponding set of rules, and/or corresponding applicable law, regulation, agreement, and/or consent of the user. For instance, if a requestor (e.g., requesting user, entity, or device) attempts to access data of a user (e.g., the requesting user or another user) and/or information relating thereto, using the search function 1038 or otherwise, the data management component 132 can determine what data of the user or related information (if any), and/or what type(s) of data (e.g., non-sensitive or non-protected data, personal or sensitive data, protected data, and/or PII, etc.) or related information, the requestor is authorized to access, based at least in part on the identity or role of the requestor, and/or the authentication information of the requestor, and based at least in part on the set of rules. The data management component 132 can allow the requestor to access to only such data of the user or related information stored in the secure data store 130 and/or data store(s) (e.g., data store(s) 104, 106, and/or 108) associated with the DLDP 102 that the requestor is permitted to access, and can prevent the requestor from accessing other data of the user or related information in the secure data store 130 and/or data store(s) that the requestor is not permitted to access, based at least in part on the set of rules.

In some instances, a requestor may be permitted to access certain data of a user in the secure data store 130 or in a data store (e.g., data store(s) 104, 106, and/or 108) associated with the DLDP 102 only under (e.g., subject to) certain restrictions. In such instances, the data management component 132 can enforce the restrictions (e.g., can enforce a rule(s) of the set of rules relating to such restrictions) to allow the requestor to only access the certain data of the user in accordance with the applicable restrictions. For example, an item of data of the user may be restricted to be read-only or view-only with regard to the requestor, and the data management component 132 can enforce such restriction to only allow the requestor to view the item of data, but can restrict or prevent the requestor from overwriting, editing, deleting, erasing, downloading, or printing the item of data. Thus, the data management component 132 can maintain desirable (e.g., a high level of, suitable, applicable, or optimal, etc.) security of the data of users and information relating thereto that is stored in the secure data store 130 or in a data store (e.g., data store(s) 104, 106, and/or 108) associated with the DLDP 102 to prevent or inhibit unauthorized access, sharing, or use of the data of users and the information relating thereto, in accordance with the defined data management criteria and the corresponding set of rules, which can be based at least in part on applicable law, regulation, agreement, and/or consent of the user.

Figure 11:
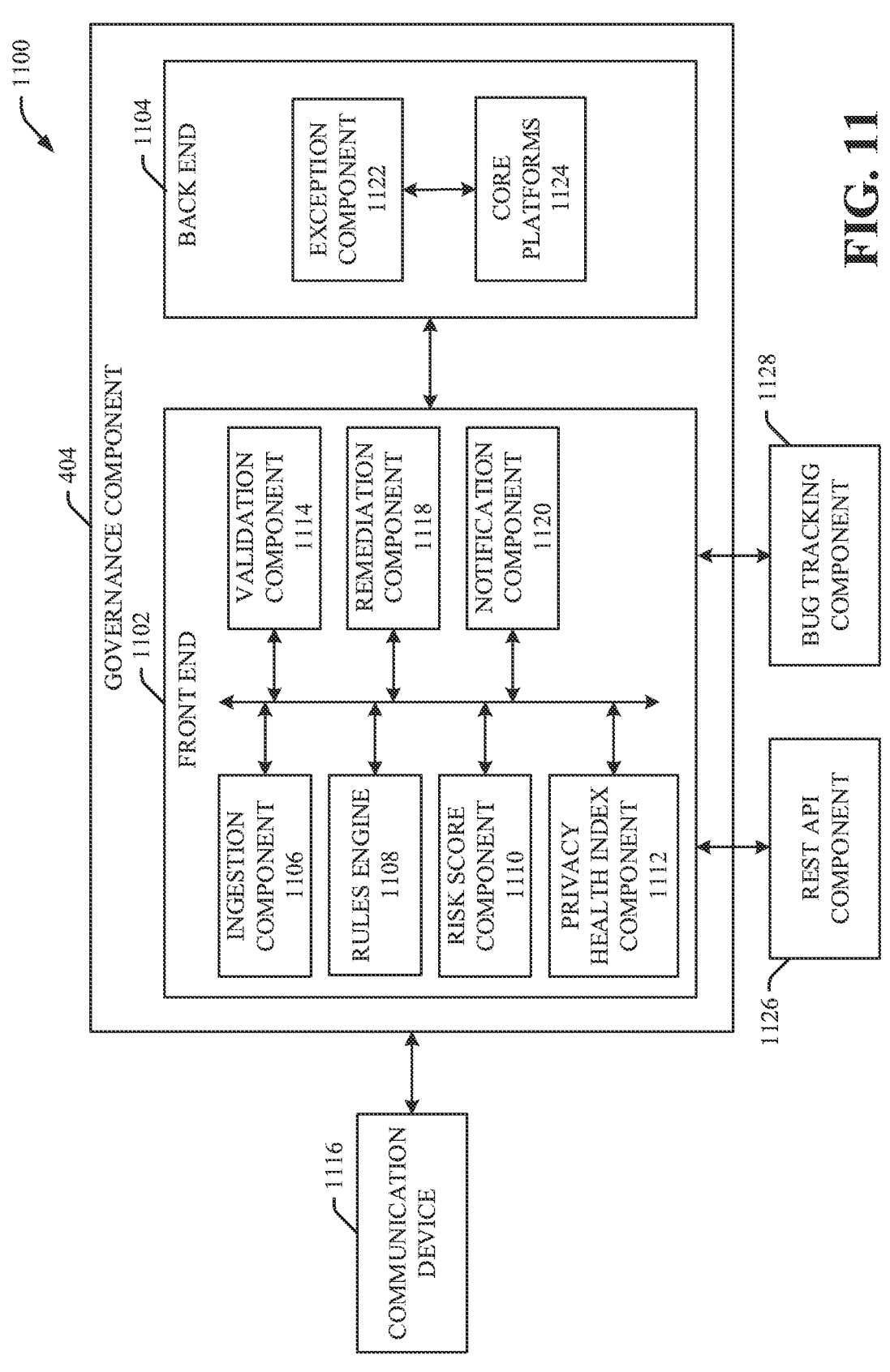
FIG. 11 illustrates a block diagram of an example system that can employ a governance component to facilitate governing the DLDP and associated systems, data stores, data, etc., of entities, data sharing, and compliance with laws, regulations, and agreements, in accordance with various aspects and embodiments of the disclosed subject matter.

Referring to FIG. 11 (along with FIGS. 1, 2, and 4), and with further regard to governance of the DLDP 102, the secure data store 130, and associated systems, data stores, data, etc., of entities associated with the DLDP 102 by the governance component 404, FIG. 11 illustrates a block diagram of an example system 1100 that can employ a governance component to facilitate governing the DLDP 102 and associated systems, data stores, data, etc., of entities, data sharing, and compliance with laws, regulations, and agreements, in accordance with various aspects and embodiments of the disclosed subject matter. The system 1100 can comprise the governance component 404 that can perform various governance-related operations to facilitate determining whether the DLDP 102 and associated systems, data stores, data, etc., associated with entities are in compliance (e.g., adherence) with applicable laws, regulations, and/or agreements, and/or to facilitate ensuring desirable (e.g., suitable, acceptable, or optimal) compliance of the DLDP 102 and the associated systems, data stores, data, etc., associated with the entities with the applicable laws, regulations, and/or agreements, in accordance with the defined data management criteria, such as more fully described herein. The governance component 404 can facilitate managing the DLDP 102, secure data store 130, and/or the associated systems, data stores, data, etc., associated with the entities with regard to, for example, data discovery-related issues (e.g., issues discovered from scanning of systems, data stores, data, etc., associated with entities), data subject rights (DSR) request-related issues (e.g., issue relating to whether a requesting user gained improper access to data), consent-related issues (e.g., issues relating to consent to receive emails, issues relating to consent to collect data of users, and/or issues relating to consent to share data of users, etc.), and/or third party-related issues (e.g., issues relating to whether sharing of data of a user(s) with third party entities is or was permitted by an applicable law, regulation, agreement, and/or consent of the user(s)).

The governance component 404 can comprise a front end 1102 and a back end 1104. The front end 1102 of the governance component 404 can perform certain governance-related operations (e.g., determining rules relating to laws, regulations, and/or agreements, determining compliance with the rules, determining if and when anomalies, such as non-compliance with the rules occur, determining risk scores, or determining a privacy health index, etc.). The back end 1104 of the governance component 404 can perform other types of governance-related operations (e.g., generating or processing exception messages relating to non-compliance, performing or facilitating performing remediation actions in response to exception messages, or notifying when remediation actions have been completed, etc.).

The front end 1102 of the governance component 404 can comprise an ingestion component 1106 that can monitor and track information relating to respective laws and regulations associated with respective jurisdictions and respective agreements associated with respective entities. For instance, in connection with monitoring and tracking such information, the ingestion component 1106 can receive respective laws and regulations (e.g., GDPR, HIPAA, COPPA, FCRA, ECPA, FERPA, PIPEDA, CCPA, PRC Cybersecurity Law, India Information Technology Act, India Information Technology Rules, and/or other laws or regulations) relating to data protection and associated with respective jurisdictions, or other information relating thereto, and can continue to monitor and track for any updates (e.g., modifications or changes) made to any laws and regulations. The ingestion component 1106 also can receive respective agreements relating to data protection and associated with entities and/or the DLDP 102, or information relating thereto, and can continue to monitor and track for any updates made to any agreements.

Based at least in part on the laws and regulations, agreements, and other information relating thereto, the governance component 404 can determine a set of rules relating to data protection of data associated with the DLDP 102 and systems, data stores (e.g., 104, 106, and/or 108; 202, 204, and/or 206), etc., associated with entities (e.g., first entity, second entity, or other entity) and the DLDP 102, in accordance with the defined data management criteria, as more fully described herein. The DLDP 102 can apply the set of rules with regard to the DLDP 102 and the systems, data stores, data, etc., associated with the entities to facilitate desirable management, access, and erasure of data associated therewith, in accordance with the set of rules.

The ingestion component 1106 also can monitor and track activity (e.g., data-related activity) associated with systems, data stores, data, etc., associated with entities. For instance, in connection with monitoring and tracking such activity, the ingestion component 1106 can receive information (e.g., scanning results or other information) relating to the scanning of systems, data stores (e.g., 104, 106, and/or 108; 202, 204, and/or 206), data, etc., associated with the entities (e.g., first entity, second entity, or other entity) that are associated with the DLDP 102. Such information can relate to or indicate data of users that has been accessed in or retrieved from the systems or data stores associated with entities, data of users that has been shared with third party entities, and/or data of users that has been erased or deleted from the systems or data stores associated with entities.

The ingestion component 1106 can monitor and track activity associated with the secure data store 130. For example, in connection with monitoring and tracking such activity, the ingestion component 1106 can track and receive information relating to accessing of data of users stored in the secure data store 130, data of users retrieved from the secure data store 130 that is shared with third party entities, and/or data of users that is erased or deleted from the secure data store 130.

The ingestion component 1106 also can monitor and track information relating to DSR requests made by users, consents made by users with regard to data, or changes in consents made by users with regard to data. For example, in connection with monitoring and tracking such information, the ingestion component 1106 can receive information regarding DSR requests made by users, who those requesting users are, what data those users were requesting, what data those users were able to gain access to, what system or data store (e.g., 104, 106, and/or 108; 202, 204, and/or 206) of an entity (e.g., first entity, second entity, or other entity) the data was retrieved from, the dates of the requests, and/or other desired information relating to DSR requests. As another example, the ingestion component 1106 can receive information regarding consents or changes in consents, or refusals (e.g., denials) of consents, provided by users with regard to data of users or online activity of users, such as consents, or refusals of consents, relating to cookies or other tracking of user data or activity, consents relating to receiving electronic communications (e.g., emails, text messages, or pop-up messages, etc.) from entities, or opt in or opt out consents.

The ingestion component 1106 further can monitor and track sharing of data with third party entities by the DLDP 102 or by systems, data stores, etc., associated with entities that can be monitored by the DLDP 102. For instance, in connection with monitoring and tracking such data, the ingestion component 1106 can receive information relating to the sharing of data of user with third party entities by the DLDP 102 or by systems, data stores (e.g., 104, 106, and/or 108; 202, 204, and/or 206), etc., associated with entities (e.g., first entity, second entity, or other entity) that can be monitored by the DLDP 102.

The governance component 404 can analyze the various information, which can be obtained as a result of the monitoring and tracking of activity and data associated with the DLDP 102 and the systems, data stores (e.g., 104, 106, and/or 108; 202, 204, and/or 206), data, etc., associated with the entities (e.g., first entity, second entity, or other entity) that are associated with the DLDP 102. Based at least in part on the results of analyzing such information, the governance component 404 can determine whether the DLDP 102 and/or the systems, data stores, data, etc., associated with the entities are in compliance with the set of rules, and correspondingly, applicable laws, regulations, or agreements, as more fully described herein. The governance component 404 also can determine various risk scores (e.g., relating to risk of not being in compliance) associated with various parts of the DLDP 102 or associated entities and/or a privacy health index associated with a particular entity, based at least in part on the results of analyzing such information and the set of rules, as more fully described herein. The governance component 404 further can determine when anomalies (e.g., non-compliance issues) occur, based at least in part on the results of analyzing such information and applying the set of rules, as more fully described herein. The governance component 404 further can initiate, perform, or facilitate performing remediation actions to remedy or mitigate any detected anomalies, in accordance with the defined data management criteria and applicable laws, regulations, or agreements, as more fully described herein.

The governance component 404 can comprise a rules engine 1108 that can determine the set of rules based at least in part on the various laws, regulations, and/or agreements. The rules engine 1108 can analyze respective laws or regulations associated with respective jurisdictions, respective agreements associated with respective entities, and/or information relating thereto. Based at least in part on the results of such analysis, the rules engine 1108 can determine respective obligations (e.g., legal obligations or requirements, or contractual obligations or requirements) relating to (e.g., deriving from, arising out of, or necessitated by) the respective laws or regulations associated with the respective jurisdictions or the respective agreements associated with the respective entities. The rules engine 1108 can determine respective rules of the set of rules for managing or governing data and communications of data associated with the DLDP 102 and the associated systems, data stores (e.g., 104, 106, and/or 108; 202, 204, and/or 206), etc., associated with the entities (e.g., first entity, second entity, or other entity), based at least in part on the respective obligations, in accordance with the defined data management criteria.

For example, the various laws, regulations, and/or agreements can comprise a first subset of laws or regulations associated with a first subset of jurisdictions and/or a first subset of agreements between a first subset of entities, comprising the first entity, and a second subset of laws or regulations associated with a second subset of jurisdictions and/or a second subset of agreements between a second subset of entities, comprising the second entity. Based at least in part on the results of analyzing the various laws, regulations, or agreements, including the first subset of laws or regulations, the first subset of agreements, the second subset of laws or regulations, and the second subset of agreements, the rules engine 1108 can determine a set of obligations comprising a first subset of obligations and a second subset of obligations. The first subset of obligations (e.g., first subset of legal or contractual obligations or requirements) can relate to (e.g., can derive from, arise out of, be necessitated by, and/or correspond to) the first subset of laws or regulations and/or the first subset of agreements. The second subset of obligations (e.g., second subset of legal or contractual obligations or requirements) can relate to the second subset of laws or regulations and/or the second subset of agreements. Based at least in part on the set of obligations, comprising the first subset of obligations and the second subset of obligations, the rules engine 1108 can determine and generate the set of rules, comprising a first subset of rules and a second subset of rules. The first subset of rules can correspond to, and facilitate enforcement of (e.g., by the DLDP 102 and/or the governance component 404) and compliance with, the first subset of obligations, and accordingly, the first subset of laws or regulations and/or the first subset of agreements. The second subset of rules can correspond to, and facilitate enforcement of (e.g., by the DLDP 102 and/or the governance component 404) and compliance with, the second subset of obligations, and accordingly, the second subset of laws or regulations and/or the second subset of agreements. The rules engine 1108 also can similarly determine a third subset of rules that can correspond to a third subset of obligations based at least in part on the results of analyzing a third subset of laws or regulations associated with a third jurisdiction and/or a third subset of agreements, and/or determine a fourth subset of rules that can correspond to a fourth subset of obligations based at least in part on the results of analyzing a fourth subset of laws or regulations associated with a fourth jurisdiction and/or a fourth subset of agreements, and so on.

The laws, regulations, and/or agreements, and correspondingly the rules, can relate to the type of data, the privacy status or privacy type of data, DSRs of users with regard to their data, data subject rights of users, data access requests of users, data change requests of users, data protection requests of users, data erasure requests of users, the amount or type of data that can be collected, the users or entities that are permitted to access data of users, the type of data that users or entities are permitted to access, sharing of data with third party entities, the length of time that data associated with a user can be retained in a data store, the type or amount (e.g., number or frequency) of electronic communications (e.g., email messages, text messages, or phone calls) that are permitted to be sent to users, the amount of time within which to stop sending electronic communications after the user requests to no longer receive electronic communications, security, authentication, or encryption protocols or algorithms that are to be used to secure stored data or to securely communicate data, notices relating to data or user rights that are to be provided to users, the disposal (e.g., erasure or deletion of data), consents of users with regard to data, monitoring and enforcement relating to addressing privacy complaints or compliance with laws, rules, or agreements, and/or other aspects relating to data protection. For example, a law, regulation, or agreement can specify or indicate the type(s) and/or privacy type(s) of data regarding a user that an entity (e.g., organization) is permitted to have access to, can specify or indicate what rights users have with regard to their data (e.g., data subject rights), can specify or indicate how DSRs are to be processed, and/or can specify or indicate an amount of time (e.g., 10 days (e.g., 10 business or calendar days), 15 days, or 30 days) that an entity has to comply with a request of a user to no longer receive a particular type of electronic communication (e.g., email message, text message, or phone call) from the entity.

The types of data can be or can comprise the types of personal data elements, such as described herein. The privacy status or type of data can comprise, for example, sensitive or personal data, protected data, non-sensitive data, or other desired type of privacy status or privacy type of data.

The rules generated by the rules engine 1108 can specify or indicate particular actions or issues with regard to data are in non-compliance with an applicable law, regulation, or agreement. The rules generated by the rules engine 1108 also can comprise or relate to trends or trend spikes relating to data of users that is stored, accessed, tracked, communicated, or shared by an entity or platform. Certain rules also can comprise a defined threshold value that can indicate whether a rule is being violated and/or whether a particular data or consent issue should be checked into further to see if there is a problem to be addressed (e.g., remedied). For example, the governance component 404 can track the trends of users (e.g., customers) opting in to or opting out of receiving electronic communications from an entity, and can apply a rule that can include a defined threshold value(s) to the trend data determined based at least in part on the tracking of such trends. The defined threshold value(s) can relate to an amount of difference between an average number of users opting in to receive electronic communications from the entity and a particular number of users opting in at a given time (e.g., a spike in users opting in at a given time), can relate to an amount of difference between an average number of users opting out from receiving electronic communications from the entity and a particular number of users opting out at a given time (e.g., a spike in users opting out at a given time), can relate to a total number of users opting in at a given time, or can relate to a total number of users opting out at a given time. The governance component 404 can analyze the trend data and apply the rule, including the defined threshold value(s). Based at least in part on the results of the analysis and applying of the rule, the governance component 404 can determine whether a defined threshold value(s) has been satisfied (e.g., breached or exceeded), which can indicate that there can be an anomaly (e.g., spike in the trend and/or possible non-compliance issue) with regard to opting in or opting out by users. If an anomaly is detected, the governance component 404 can provide information (e.g., notification) to notify the entity of the anomaly and/or can facilitate remediating the anomaly, as more fully described herein.

The data management component 132, including the rights management component 402 and governance component 404, can utilize and apply (e.g., enforce) the respective rules of the set of rules (e.g., first subset of rules, second subset of rules, or other rules) with regard to the DLDP 102 and respective systems, respective data stores (e.g., 104, 106, and/or 108; 202, 204, and/or 206), respective data of users, and/or respective communications associated with users, etc., associated with respective entities (e.g., first entity, second entity, or other entity), to ensure or substantially ensure compliance, and/or to mitigate non-compliance, with the respective laws or regulations and/or respective agreements associated with (e.g., respectively applicable to) the DLDP 102 and the respective systems, respective data stores, respective data of users, and/or respective communications associated with users, etc., associated with the respective entities.

The governance component 404 also can comprise a risk score component 1110 (also referred to as risk assessment component herein) that can determine (e.g., calculate) and generate risk scores (e.g., risk ratings) that can indicate risk levels associated with the securing, storing, accessing, tracking, communicating, or sharing of data of users by an entity or platform. KRI metrics can be or comprise the risk scores. KRIs can comprise leading indicators, current indicators, or lagging indicators. For instance, a leading KRI can relate to an emerging or potentially emerging risk trend regarding data protection that has some likelihood (e.g., a probability) of occurring in the future. A current KRI can relate to current data that can indicate a level of risk regarding data protection. A lagging KRI can relate to risk-related events regarding data protection that occurred in the past and have some likelihood of occurring again in the future.

The risk score component 1110 can determine or calculate a risk score of a particular aspect (e.g., KRI metric, privacy principle, or platform) of or associated with an entity as a function of the impact of an anomaly (e.g., irregularity or non-compliance issue with regard to data protection) occurring and a likelihood of the anomaly occurring (e.g., with regard to a particular KRI metric, privacy principle, or platform), in accordance with the defined data management criteria. The impact of an anomaly can be or can relate to a consequence to the entity or user if the anomaly occurs. The likelihood of the anomaly occurring can be or can relate to a probability that the anomaly will occur (e.g., will occur at any time in the future, or will occur within a defined amount of time in the future). In some embodiments, the risk score component 1110 can apply a rule-based approach, using the set of rules, to facilitate determining (e.g., calculating) an impact (e.g., an amount and/or type of impact) that an anomaly can have on an entity or user. In certain embodiments, the risk score component 1110 can apply a learning-based approach, using the artificial intelligence and/or machine learning techniques and algorithms, such as described herein, to facilitate determining (e.g., calculating) a likelihood (e.g., an amount of likelihood or probability) that an anomaly can have on an entity or user.

Figure 12:
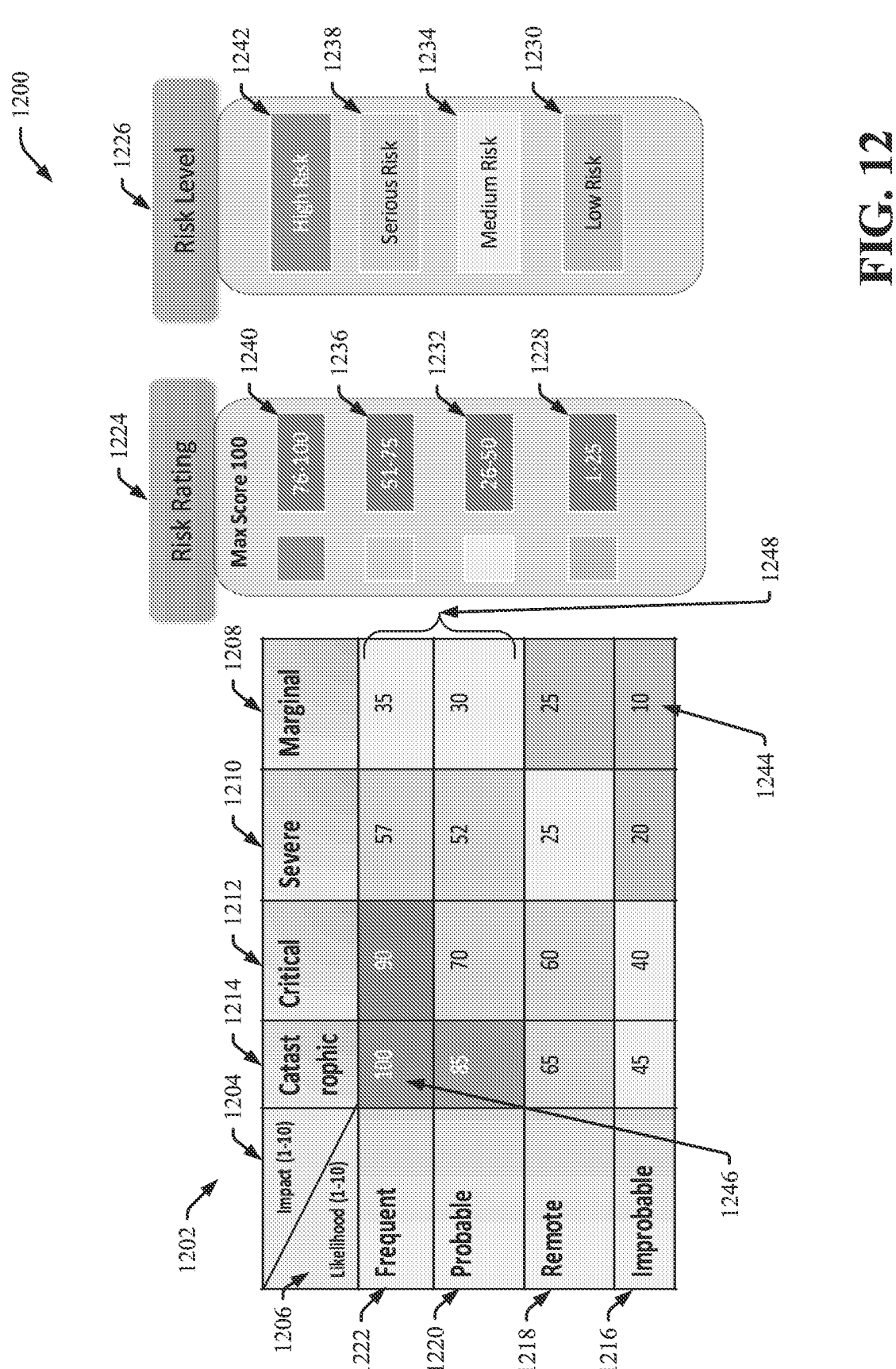
FIG. 12 presents a diagram of an example risk score matrix system that can be used to facilitate determining risk scores associated with an entity, in accordance with various aspects and embodiments of the disclosed subject matter.

In some embodiments, the risk score component 1110 can apply a risk score matrix to facilitate determining risk scores associated with an entity. Referring to FIG. 12 (along with FIGS. 1, 2, 4, and 11), FIG. 12 presents a diagram of an example risk score matrix system 1200 that can be used to facilitate determining risk scores associated with an entity, in accordance with various aspects and embodiments of the disclosed subject matter. The example risk score matrix system 1200 can comprise a risk score matrix 1202 that can be an n×n matrix that can present the impact 1204 of an occurrence of an anomaly as a function of the likelihood 1206 of the anomaly occurring, wherein n can be virtually any desired number. In the example risk score matrix 1202, n can be 4, although a number less than or greater than 4 can be utilized. It is to be appreciated and understood that, in other embodiments, if desired, the risk score matrix 1202 can be an n×m matrix or m×n matrix, wherein n and m can be virtually any desired numbers, and wherein n can be different from (e.g., greater than or less than) m.

The risk score matrix 1202 can indicate an impact 1204 on an entity or user of an occurrence of an anomaly, wherein, for example, the impact 1204 can range from 1 (or less than 1) to 10, and wherein such number can be an integer or real number. The impact 1204 can range from marginal impact 1208 to severe impact 1210 to critical impact 1212 to catastrophic impact 1214 as the number of the impact 1204 increases from 1 (or less than 1) to 10. For instance, on the lower end (e.g., 1 (or less than 1) up to 2.5) of the range of impact 1204, the impact 1204 can be marginal 1208, which can indicate that there may be a marginal impact (e.g., a marginal amount of negative impact) to an entity or user if the particular type of anomaly occurs, but relatively speaking, the amount of impact to the entity or user if the anomaly were to occur is relatively low or minimal. In the lower-middle part (e.g., 2.51 up to 5.00) of the range of impact 1204, the impact 1204 can be severe 1210, which can indicate that there may be a more significant or severe impact (e.g., severe negative impact) to an entity or user if the particular type of anomaly occurs, but relatively speaking, the amount of impact of the anomaly to the entity or user still can be manageable and/or addressable (e.g., can be mitigated, remedied, absorbable) if the anomaly occurs. In the upper-middle part (e.g., 5.01 up to 7.50) of the range of impact 1204, the impact 1204 can be critical 1212, which can indicate that there can or may be a critical, harmful, or unacceptable impact (e.g., critical or unacceptably high negative impact) to an entity or user if the particular type of anomaly occurs, wherein the amount of impact to the entity or user still may possibly be manageable, however, the consequences of such an anomaly are undesirably (e.g., unacceptably) high, it can be desirable to address (e.g., can be mitigate or remedy) such an impact if it were to occur, although it can be more difficult or problematic to address such an impact if it were to occur. In the upper part (e.g., 7.51 up to 10.00) of the range of impact 1204, the impact 1204 can be catastrophic 1214, which can indicate that such an impact to an entity or user if the particular type of anomaly occurs would be catastrophic to the entity or user, likely would not be manageable, and likely would not be able to be desirably remedied, mitigated, or corrected if such an impact were to occur.

With regard to the likelihood 1206 of an anomaly occurring, the risk score matrix 1202 can indicate relative ranges of likelihood (e.g., probability) that a particular anomaly will occur (e.g., at any time in the future, or within a defined amount of time in the future). For instance, on the lower end of the range of likelihood 1206, the likelihood 1206 can be improbable 1216, which can indicate that there is a relatively (e.g., very) low likelihood that a particular type of anomaly will occur. For example, a likelihood in the improbable range 1216 can indicate that there is less than a 1% probability (or other desirably low probability, such as, e.g., 5% probability or less) that the particular type of anomaly will occur. In the lower-middle part of the range of likelihood 1206, the likelihood 1206 can be remote 1218, which can indicate that the likelihood that a particular anomaly will occur can still be relatively low (e.g., probability of less than 50%), but such likelihood is higher than that of the improbable range 1216. In the upper-middle part of the range of likelihood 1206, the likelihood 1206 can be probable 1220, which can indicate that there can be a relatively high likelihood (e.g., greater than 50% probability, but less than 75% probability) that a particular type of anomaly will occur. In the upper part of the range of likelihood 1206, the likelihood 1206 can be frequent 1222, which can indicate that a particular type of anomaly can frequently occur and/or there can be a high probability (e.g., greater than 75% probability) that the particular type of anomaly will occur.

As can be observed in FIG. 12, the example risk score matrix 1202 includes some example risk scores that can be associated with an example type of anomaly. The example risk scores can range from 1 to 100, for example. A risk rating 1224 (e.g., risk score) can indicate an amount or degree of risk that an anomaly may occur and an associated risk level 1226 that can indicate what particular level of risk is associated with a particular risk rating. For instance, the risk rating 1224 can range from 1 up to a maximum score of 100, where 100 can indicate the most (e.g., worst) risk and 1 can indicate the lowest level of risk. A risk rating range of 1 through 25 (1228) can be associated with a low risk level 1230, a risk rating range of 26 through 50 (1232) can be associated with a medium risk level 1234, a risk rating range of 51 through 75 (1236) can be associated with a serious risk level 1238, and a risk rating range of 76 through 100 (1240) can be associated with a high risk level 1242.

With further regard to the example risk scores in the example risk score matrix 1202, as can be observed in FIG. 12, an anomaly, which is determined to have a marginal impact 1208 on an entity or user and a likelihood of improbable 1216, can have a low risk score (e.g., a risk score of 10 (1244) or other low risk score that ranges from 1 to 25) in the low risk range 1230. On the other end of the spectrum, an anomaly, which is determined to have a catastrophic impact 1214 on an entity or user and a likelihood of frequent 1222, can have a high risk score (e.g., a risk score of 100 (1246) or other high risk score that is 76 up to 100) in the high risk range 1242. For example, a risk score of 100 can indicate that the impact 1204 of the anomaly on an entity or user can be 10, and the likelihood 1206 of the anomaly occurring can be 10. As also can be observed in the example risk score matrix 1202, as indicated at reference numeral 1248, an anomaly, which is determined to have a marginal impact 1208 on an entity or user, can still pose a medium risk 1234, for example, if the likelihood 1206 of such anomaly occurring is probable 1220 or frequent 1222. Generally, as the amount of impact 1204 of an occurrence of an anomaly to an entity or user increases in relation to a particular likelihood, the risk score can increase (and vice versa), and, as the likelihood 1206 of such anomaly occurring increases in relation to a particular impact level, the risk score can increase (and vice versa).

It is to be appreciated and understood that the example risk score matrix system 1200 is but one type of risk score approach that the risk score component 1110 can use to determine risk scores. In accordance with various other embodiments, the risk score component 1110 can utilize virtually any other desired technique, algorithm, approach, calculations, or determinations to determine risk scores, determine an impact of an anomaly if it occurs, or determine a likelihood of an anomaly occurring.

Figure 13:
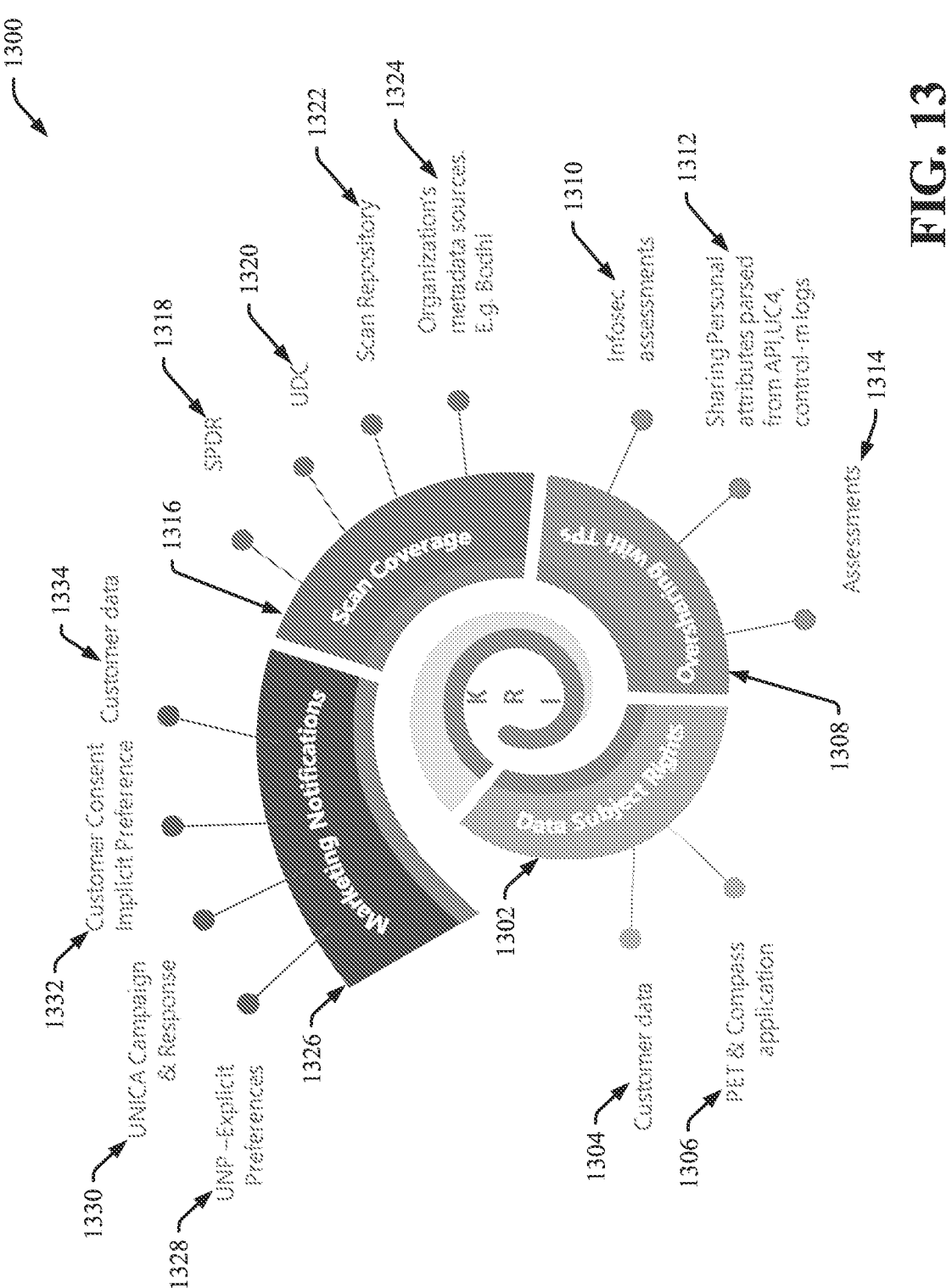
FIG. 13 presents a diagram of example sources that can be accessed to obtain data that can be used to determine key risk indicators (KRIs), in accordance with various aspects and embodiments of the disclosed subject matter.

Turning briefly to FIG. 13 (along with FIGS. 1, 2, 4, and 11), FIG. 13 presents a diagram of example sources 1300 that can be accessed to obtain data that can be used to determine (e.g., derive or calculate) KRIs, in accordance with various aspects and embodiments of the disclosed subject matter. With regard to, and to facilitate evaluating KRIs relating to, data subject rights 1302, the example sources 1300 can include customer data 1304 (e.g., user data) and privacy enhancing technology (PET) and Compass application 1306. For instance, the governance component 404 can obtain information relating to data subject rights 1302 through the customer data 1304, which can be obtained from the customers directly or indirectly from another source, from the secure data store 130, from a data store (e.g., 104, 106, or 108; or 202, 204, or 206), or from another desired source.

The governance component 404 also can obtain information relating to data subject rights 1302 through the PET and/or Compass application 1306. In accordance with various embodiments, the DLDP 102, data management component 132, or governance component 404 can comprise, utilize, or access PETs, the Compass application, or another desired data security or protection technology or application to facilitate performing various aspects of the disclosed subject matter, such as described herein. The DLDP 102, data management component 132, and/or governance component 404 can utilize PETs to facilitate desirably collecting, processing, storing, sharing, or utilizing data of users, in accordance with the set of rules and corresponding laws, regulations, and/or agreements, in accordance with the defined data management criteria. PETs can comprise technologies and/or components (e.g., modules) that can be used to facilitate protecting data of users, ensuring that users can have information that can be suitable to enable a user to give an informed consent with regard to the collecting, processing, storing, sharing, or utilization of their data. PETs also can be utilized to facilitate (e.g., enable) users to exercise their rights (e.g., data subject rights) with regard to data. The Compass application or other data security or protection application can be utilized to facilitate (e.g., enable) desirable managing of data protection of data of users. The governance component 404 can access or obtain information utilized or generated by the PET and/or Compass application 1306 (or other desired technology or application) with regard to data subject rights 1302 of users.

With regard to, and to facilitate evaluating KRIs relating to, sharing or oversharing of data with third parties 1308 (oversharing with TPs), the governance component 404 can obtain information from or relating to information security assessments 1310 (infosec assessments), information from or relating to sharing personal attributes 1312, and/or information from or relating to information risk assessment (IRA), privacy risk assessment (PRA), data protection impact assessment (DPIA), or other types of risk or impact assessments 1314. For instance, the governance component 404 can obtain information from or relating to information security assessments 1310 that can be performed by the governance component 404 or another desired service, such as, for example, Service Now or another desired security service. The governance component 404 also can obtain information from or relating to sharing personal attributes 1312, for example, by parsing such information regarding sharing personal attributes from APIs, UC4, control-m logs, or another desired data transfer or management component or application. The governance component 404 also can obtain information from or relating to IRA, PRA, DPIA, or other types of risk or impact assessments 1314, for example, from Hiperos or another desired risk management component, application, or provider (e.g., another desired third-party risk management component, application, or provider).

With regard to, and to facilitate evaluating KRIs relating to, scan coverage 1316 (oversharing with TPs), the governance component 404 can obtain information relating to scan coverage 1316 from the SPDR 1318 (e.g., scanner component(s) 124, 208, or 210), universal database connector (UDC) 1320, scan repository 1322 (e.g., data store 302 or data store 304 of FIG. 3), and/or metadata resources 1324 of or associated with an entity (e.g., organization). The information relating to scan coverage 1316 can indicate what data stores or databases of an entity have been scanned (e.g., have been scanned during a defined time period), what information (e.g., what types of data and their respective data privacy statuses) has been scanned, what data stores or databases have not been scanned (e.g., have not been scanned during the defined time period), and/or other desired information relating to scan coverage 1316. A UDC 1320 can be associated with a scanner component (e.g., scanner component 124, 208, or 210), and can facilitate desirably connecting to (e.g., efficiently and/or directly connecting to) a data store (e.g., 104, 106, or 108; 202, 204, or 206) to facilitate desirable scanning of data from the data store and/or indexing of the scanned data.

With regard to, and to facilitate evaluating KRIs relating to, marketing notifications 1326, the governance component 404 can obtain information relating to marketing notifications 1326 from a variety of data sources, such as, for example, unified notification platform (UNP)-explicit preferences 1328, UNICA campaign and response 1330, customer consent implicit preference 1332, and customer data 1334. For example, the governance component 404 can receive data relating to preferences (e.g., explicit preferences) of customers with regard to marketing notifications 1326 from the UNP 1328 (or another desired notification platform). As another example, the governance component 404 also can receive data relating to marketing notifications 1326 from the UNICA campaign and response 1330 (or another desired marketing campaign technology, application, or platform).

Figure 14:
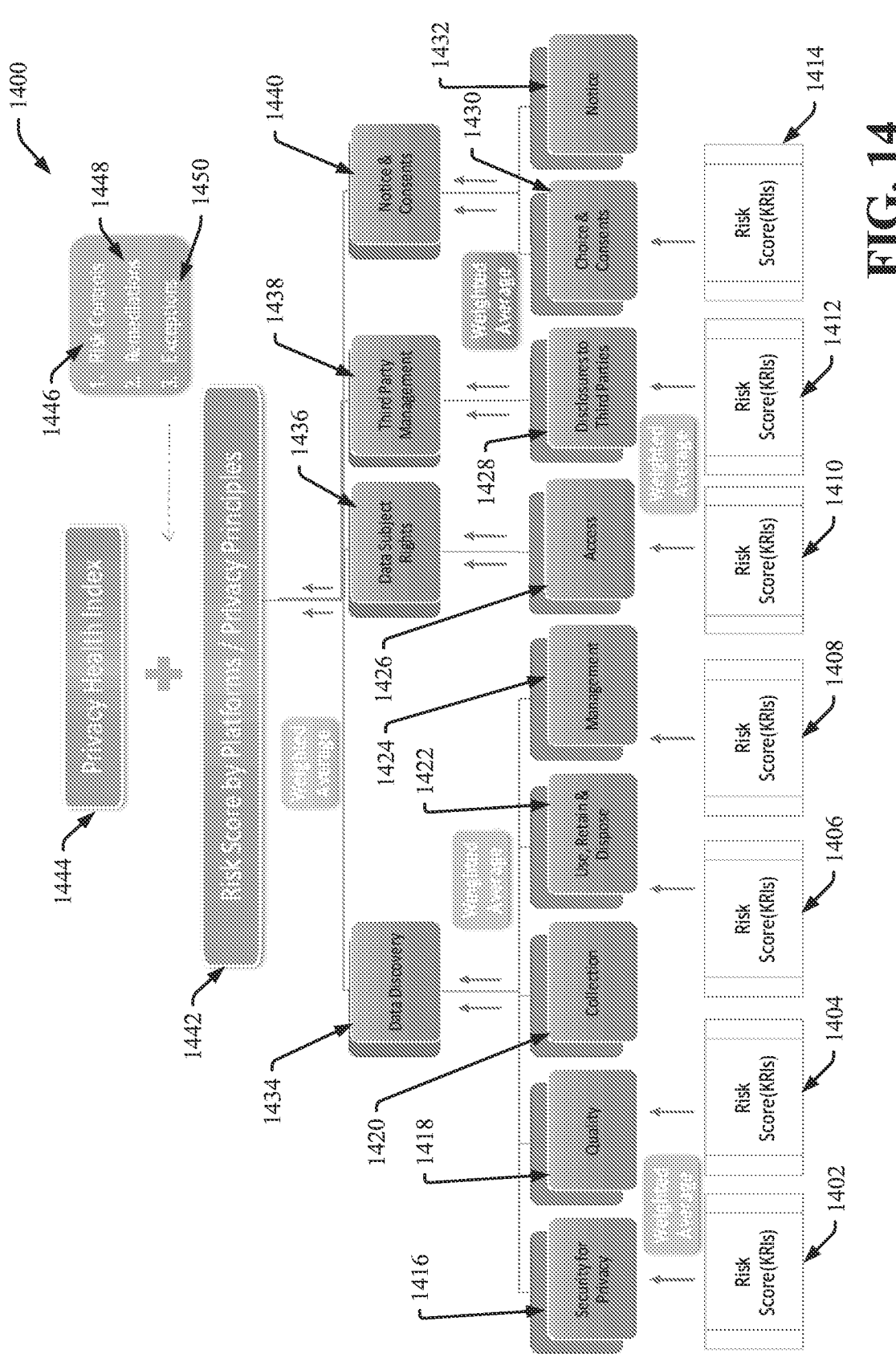
FIG. 14 depicts a block diagram of an example risk score and privacy health index process flow that can be used to facilitate determining risk scores and a privacy health index associated with an entity, in accordance with various aspects and embodiments of the disclosed subject matter.

Referring to FIG. 14 (along with FIGS. 1, 2, 4, and 11), FIG. 14 depicts a block diagram of an example risk score and privacy health index process flow 1400 that can be used to facilitate determining risk scores and a privacy health index associated with an entity, in accordance with various aspects and embodiments of the disclosed subject matter. The governance component 404 can determine various risk scores and a privacy health index for any desired entity that is associated with the DLDP 102, data management component 132, and/or governance component 404. For example, the entity can be an entity that is operating, owning, and/or managing the DLDP 102, data management component 132, governance component 404, and/or one or more data stores associated with (e.g., communicatively connected to) the DLDP 102 and/or governance component 404. As another example, an entity can operate, own, and/or manage a set of data stores located in one or more jurisdictions, wherein the set of data stores can be monitored, scanned, tracked, and/or evaluated (e.g., evaluated for compliance with applicable laws, regulations, or agreements) by the DLDP 102, data management component 132, and/or governance component 404.

In accordance with the example risk score and privacy health index process flow 1400, the governance component 404 (e.g., the risk score component 1110 or other component of the governance component 404) can determine various KRIs, which can be or can comprise risk scores, relating to various risk factors relating to data protection. The risk factors, in part, can relate to risks associated with non-compliance with applicable laws, regulations, or agreements or other anomalies (e.g., irregularities) relating to data protection. The KRIs or risk scores can comprise, for example risk scores (KRIs) 1402, 1404, 1406, 1408, 1410, 1412, and/or 1414 relating to various and respective risk factors, which can be relevant to respective privacy principles.

The privacy principles can comprise, for example, security for privacy 1416, quality 1418, collection 1420, use, retain and dispose 1422, management 1424, access 1426, disclosures to third parties 1428, choice and consents 1430, notice 1432, and/or another desired privacy principle. Security for privacy 1416 can relate to or involve security for privacy of data of users, such as, for example, securing or protecting data from data breaches. Quality 1418 can involve, for example, quality relating to personal data detection accuracy or other desired quality issues or factors relating to data protection. Collection 1420 can relate to, for example, the collection of data users. Use, retain and dispose 1422 can relate to, for example, the use, retention, or disposition of data of users, scanning coverage of the scanning of data of or associated with users, or other desired factors. Management 1424 can involve management of data processing of data of users, including, for example, PIAs, data protection impact assessments (DPIAs), or another desired type of impact or risk assessment. Access 1426 can relate to access of data of users by other users or other entities, data subject requests associated with users, or other data access related issues or factors. Disclosures to third parties 1428 can relate to disclosure of data of users to third party entities, privacy complaints (e.g., privacy complaint from a regulator or user) regarding disclosure of data of users, PIAs relating to disclosure of user data to third party entities, or another issue or factor associated with disclosures to third parties. Choice and consents 1430 can relate to, for example, choices and consents of users with regard to collection and processing of their data, cookies, electronic communications to users, or another issue or factor associated with choices or consents of users. Notice 1432 can relate to notices (e.g., data privacy statement or notice) or transparency issues relating to data collection and processing of data of users, electronic communications to users, or other notice related issues or factors.

A particular risk score (e.g., risk score 1402) and associated risk factor can relate to or apply to one or more privacy principles (e.g., 1416, 1418, 1420, 1422, 1424, 1426, 1428, 1430, and/or 1432). For example, a particular risk score and associated risk factor can relate or apply to only a single privacy principle or a particular risk score and associated risk factor can relate or apply to two or more privacy principles. Also, two or more risk scores or associated risk factors can relate to or apply to a particular privacy principle.

In some embodiments, the risk score component 1110 can apply respective weights (e.g., weight values) to respective risk scores (or respective KRI metrics) to generate respective weighted risk scores (or weighted KRI metrics). For instance, the risk score component 1110 can determine respective weights to apply to respective risk scores based at least in part on the respective significance of the respective risk scores or associated risk factors to a privacy principle (s), in accordance with the defined data management criteria. The risk score component 1110 can apply the applicable weight (e.g., weight value) to a particular risk score to generate the weighted risk score. For example, the weight can be a value that is less than 1.00, equal to 1.00, or more than 1.00, and the risk score component 1110 can determine (e.g., calculate) the weighted risk score as a function of the risk score and the weight (e.g., weighted risk score=risk score×weight value). The weight to be applied to a particular risk score can be the same with regard to each privacy principle with which the particular risk score is going to be used, or the weight to be applied to a particular risk score can be determined based at least in part on the privacy principle with which it is going to be used and/or the risk factor associated with the particular risk score, as indicated or specified by the defined data management criteria.

In certain embodiments, with regard to each privacy principle (e.g., 1416, 1418, 1420, 1422, 1424, 1426, 1428, 1430, or 1432), the risk score component 1110 can determine a risk score of or associated with the privacy principle as a function of the weighted risk scores that are applicable to that privacy principle. For example, the risk score component 1110 can determine (e.g., calculate) a risk score of or associated with a privacy principle as a function of an average of the weighted risk scores that are applicable to that privacy principle. In other embodiments, the risk score component 1110 can determine a risk score of or associated with a privacy principle as or based at least in part on a median value of the weighted risk scores that are applicable to that privacy principle, a trimmed average or mean of such weighted risk scores, a normalized risk score derived from the applicable weighted risk scores, or a peak weighted risk score of all the applicable weighted risk scores, as indicated or specified by the defined data management criteria.

If and as desired, the risk score component 1110 also can determine respective risk scores of or associated with the respective platforms based at least in part on (e.g., as a function of) the respective risk scores of the respective privacy principles, as applicable to a particular platform. The platforms can comprise, for example, the data discovery platform 1434 (e.g., DLDP 102), the data subject rights platform 1436, the third party management platform 1438, the notice and consents platform 1440, and/or another desired platform of or associated with the DLDP 102 (e.g., the governance platform, or the rights management platform, etc.). In some embodiments, privacy principles, such as security for privacy 1416, quality 1418, collection 1420, use, retain and dispose 1422, management 1424, and/or another desired privacy principle can be associated with (e.g., relevant or applicable to) the data discovery platform 1434. Privacy principles, such as access 1426 and/or another desired privacy principle can be associated with the data subject rights platform 1436. Privacy principles, such as disclosures to third parties 1428 and/or another desired privacy principle can be associated with the third party management platform 1438. Privacy principles, such as choices and consents 1430, notice 1432, and/or another desired privacy principle can be associated with the notice and consents platform 1440.

The risk score component 1110 can apply respective weights (e.g., weight values) to respective risk scores associated with the respective privacy principles to generate respective weighted risk scores. For example, the risk score component 1110 can determine respective weights to apply to respective risk scores associated with the respective privacy principles based at least in part on the respective significance of the respective risk scores and associated privacy principles to the particular platform (e.g., 1434, 1436, 1438, or 1440, etc.), in accordance with the defined data management criteria. The risk score component 1110 can apply the applicable weight (e.g., weight value) to a particular risk score to generate the weighted risk score, wherein the weight value can be less than 1.00, equal to 1.00, or more than 1.00, and wherein the risk score component 1110 can determine the weighted risk score as a function of the risk score and the weight (e.g., weighted risk score=risk score×weight value). The weight to be applied to a particular risk score can be the same with regard to each platform with which the particular risk score is going to be used, or the weight to be applied to a particular risk score can be determined based at least in part on the platform with which it is going to be used and/or the privacy principle associated with the particular risk score, as indicated or specified by the defined data management criteria.

In certain embodiments, with regard to each platform (e.g., 1434, 1436, 1438, or 1440, etc.), the risk score component 1110 can determine a risk score of or associated with the platform as a function of the weighted risk scores that are applicable to that platform. For example, the risk score component 1110 can determine (e.g., calculate) a risk score of or associated with a platform (e.g., 1434, 1436, 1438, or 1440, etc.) as a function of an average of the weighted risk scores that are applicable to that privacy principle. In other embodiments, the risk score component 1110 can determine a risk score of or associated with a particular platform as or based at least in part on a median value of the weighted risk scores that are applicable to that platform, a trimmed average or mean of such weighted risk scores, a normalized risk score derived from such weighted risk scores, or a peak weighted risk score of all the applicable weighted risk scores, as indicated or specified by the defined data management criteria.

For example, the risk score component 1110 can determine a risk score of or associated with the data discovery platform 1434 as a function of (e.g., as an average of) the respective weighted risk scores of security for privacy 1416, quality 1418, collection 1420, use, retain and dispose 1422, management 1424, and/or another applicable privacy principle. The risk score component 1110 can determine a risk score of or associated with the data subject rights platform 1436 as a function of (e.g., as an average of) the respective weighted risk scores of the access 1426 and/or another applicable privacy principle (if access 1426 is the only applicable privacy principle, the weight value for that privacy principle can be 1.00 or there may be no weight value used). The risk score component 1110 can determine a risk score of or associated with the third party management platform 1438 as a function of (e.g., as an average of) the respective weighted risk scores of the disclosures to third parties 1428 and/or another applicable privacy principle (if disclosures to third parties 1428 is the only applicable privacy principle, the weight value for that privacy principle can be 1.00 or there may be no weight value used). The risk score component 1110 can determine a risk score of or associated with the notice and consents platform 1440 as a function of (e.g., as an average of) the respective weighted risk scores of choice and consents 1430, notice 1432, and/or another applicable privacy principle.

In some embodiments, the risk score component 1110 can determine an overall risk score associated with an entity or the system (e.g., risk score 1442 by platforms and privacy principles) based at least in part on the respective risk scores of the respective platforms (e.g., 1434, 1436, 1438, or 1440, etc.). For instance, the risk score component 1110 can determine respective weights for the respective platforms (e.g., 1434, 1436, 1438, or 1440, etc.) and can apply the respective weights to the respective risk scores associated with the respective platforms to generate respective weighted risk scores. For example, the risk score component 1110 can determine respective weights to apply to respective risk scores associated with the respective platforms based at least in part on the respective significance of the respective risk scores and associated platforms, in accordance with the defined data management criteria. In some embodiments, the risk score component 1110 can determine (e.g., calculate) a risk score 1442 (e.g., overall risk score) by platforms and privacy principles as a function of an average of the respective weighted risk scores of the respective platforms (e.g., 1434, 1436, 1438, or 1440, etc.). In other embodiments, the risk score component 1110 can determine the risk score 1442 by platforms and privacy principles as or based at least in part on a median value of the respective weighted risk scores of the respective platforms, a trimmed average or mean of such weighted risk scores, a normalized risk score derived from such weighted risk scores, or a peak weighted risk score of such weighted risk scores, as indicated or specified by the defined data management criteria.

The governance component 404 also can comprise a privacy health index component 1112 that can determine a privacy health index 1444 associated with an entity (e.g., organization) or the system based at least in part on the risk score 1442 by platforms and privacy principles, risk controls 1446, remediations 1448, exceptions 1450, and/or another desired factor, in accordance with the defined data management criteria. Risk controls 1446 can relate to regulatory and operational risk controls (e.g., risk policies, procedures, protocols, technologies, processes, techniques, or devices, etc.) that can facilitate (e.g., enable) managing, reducing, or modifying risks with regard to data protection, and facilitate desirable compliance with applicable laws, regulations, and agreements with regard to data protection. The privacy health index component 1112 can quantify (e.g., determine or measure) the risk controls 1446 to generate a risk control score that can represent or indicate the relative level, status, or effectiveness of the risk controls 1446. Remediations 1448 can relate to remediation actions, policies, procedures, protocols, technologies, processes, techniques, or devices, etc., that have or can be implemented to remediate, mitigate, or rectify any non-compliance issues or other anomalies in connection with data protection. The privacy health index component 1112 can quantify the remediations 1448 to generate a remediation score that can represent or indicate the relative level, status, or effectiveness of the remediations 1448. Exceptions 1450 can relate to exceptions actions, notifications, policies, procedures, protocols, technologies, processes, techniques, or devices, etc., that can be used to identify and provide notifications regarding any non-compliance issues or other anomalies in connection with data protection to facilitate notifying an entity (e.g., entity representative) of a non-compliance issue or other anomaly and/or remediating a non-compliance issue or other anomaly. The privacy health index component 1112 can quantify the exceptions 1450 to generate an exceptions score that can represent or indicate the relative level, status, or effectiveness of the exceptions 1450. The privacy health index component 1112 can determine (e.g., calculate) the privacy health index 1444 as a function of (e.g., combination of, sum of, or average of, etc.) the risk score 1442, the quantifiable value (e.g., risk control score) of the risk controls 1446, the quantifiable value (e.g., remediation score) of the remediations 1448, and the quantifiable value (e.g., exceptions score) of the exceptions 1450, in accordance with the defined data management criteria.

The governance component 404 can comprise a validation component 1114 (e.g., validation engine) that can monitor or track the collecting, processing, accessing, storing, sharing, or utilization of data of users, trends relating thereto, information (e.g., IRAs, PRAs, DPIAs, or other assessments, etc.) relating thereto, the set of rules (e.g., the first subset of rules associated with the first jurisdiction, or the second subset of rules associated with the second jurisdiction, etc.), DSRs, etc. The validation component 1114 can analyze the data, information, trends, rules, and/or DSRs, etc. Based at least in part on the results of such analysis, the validation component 1114 can validate or verify the compliance of the DLDP 102, its constituent or associated platforms (e.g., rights management component 402, or governance component 404, etc.), data stores (e.g., 104, 106, and/or 108; and/or 202, 204, and/or 206; etc.) associated with entities with the respective rules of the set of rules (and corresponding laws, regulations, and/or agreements), validate or verify the extent of such compliance, and/or determine or identify non-compliance with the set of rules or other anomalies associated with the data, information, trends, and/or DSRs, etc.

For instance, with regard to a first entity that owns, operates, or manages the DLDP 102, its constituent or associated platforms, and the first set of data stores 104, 106, and 108, the validation component 1114 can validate or verify that the first entity, including the associated DLDP 102, its constituent or associated platforms, and the first set of data stores 104, 106, and 108 are in compliance with the first subset of rules (and corresponding first set of laws and regulations associated with the first jurisdiction and/or first agreement), validate or verify the extent of such compliance, and/or determine or identify (e.g., detect and identify) non-compliance with the first subset of rules or other anomalies associated with the data, information, trends, and/or DSRs, etc., of or associated with first entity.

With regard to a second entity that owns, operates, or manages the second set of data stores 202, 204, and 206, the validation component 1114 can validate or verify that the second entity, including the second set of data stores 202, 204, and 206 (and to the extent applicable, the associated DLDP 102 and its constituent or associated platforms) are in compliance with the second subset of rules (and corresponding second set of laws and regulations associated with the second jurisdiction and/or second agreement), validate or verify the extent of such compliance, and/or determine or identify non-compliance with the second subset of rules or other anomalies associated with the data, information, trends, and/or DSRs, etc., of or associated with second entity.

If the validation component 1114 detects an anomaly (e.g., a non-compliance issue or other anomaly), the validation component 1114 can present anomaly information that can indicate or specify that the anomaly has been detected, the type of anomaly, the entity, platform, and/or data store associated with the anomaly, the date(s)/time(s) of the occurrence(s) the anomaly, the date(s)/time(s) that the anomaly was detected, and/or other desired information relating to the anomaly.

In some embodiments, the governance component 404 can be associated with (e.g., communicatively connected to) an application component 1116 (e.g., front end application) that can access certain information regarding the DLDP 102, its constituent or associated platforms, and/or data stores associated with entities, in accordance with access rights granted to users (e.g., by the rights management component 402). The application component 1116 can be implemented or utilized by a communication device, such as, for example, communication device 138 of FIG. 1.

For example, an authorized user (e.g., associated with the first entity) can utilize the application component 1116 and/or communication device 138 to access certain information regarding the DLDP 102, its constituent or associated platforms, and/or the first set of data stores 104, 106, and/or 108 associated with the first entity, in accordance with access rights granted to such user, wherein such certain information can comprise status or snapshot information regarding the operation of the DLDP 102, its constituent or associated platforms, and/or the first set of data stores, data discovery or scanning results (e.g., real-time scan results or previously performed scanning results) associated with the first set of data stores, risk scores associated with the privacy principles, the DLDP 102, its constituent or associated platforms, and/or the first set of data stores, a privacy health index (e.g., privacy health index 1444) associated with the first entity, and/or compliance, non-compliance, and/or anomaly information relating to the DLDP 102, its constituent or associated platforms, and/or the first set of data stores, etc. The data management component 132, including the governance component 404, can present or facilitate presenting such certain information to the application component 1116 and/or communication device 138 for viewing by the authorized user.

With regard to the second entity and associated second set of data stores 202, 204, and/or 206, if an authorized user (e.g., the authorized user associated with the first entity or another authorized user associated with the second entity) has certain access rights to access certain information (e.g., status or snapshot information; risk scores; privacy health index; and/or compliance, non-compliance, and/or anomaly information; etc.) relating to the second set of data stores 202, 204, and/or 206 associated with the second entity, the authorized user can utilize the application component 1116 and/or communication device 138 to access such certain information relating to second set of data stores associated with the second entity. Such certain information can comprise information stored in the DLDP 102 (e.g., secure data store 130 of the DLDP 102), its constituent or associated platforms (e.g., rights management component 402, or governance component 404, etc.) that relates to the second set of data stores and/or information obtained from scanning (e.g., real-time scanning or previously performed scanning) the second set of data stores (e.g., scanning results stored in the scanner component 210).

Depending in part on the type and/or severity of an anomaly, it can or may be desirable (e.g., wanted, appropriate, necessary, or required) to provide a notification regarding the anomaly, and/or to perform a remediation action to remedy, correct, or mitigate the anomaly, for example, when doing so is in accordance with the set of rules, corresponding laws, regulations, or agreements, and the corresponding defined data management criteria. In that regard, the governance component 404 can comprise a remediation component 1118 and notification component 1120 (e.g., notification engine) that can facilitate addressing non-compliance issues or other anomalies. For instance, in response to detecting an anomaly (e.g., non-compliance issue or other anomaly) for which notification and/or remediation can be desirable, the validation component 1114 can initiate a remediation with the remediation component 1118 and initiate a notification with the notification component 1120 to facilitate addressing the anomaly, as more fully described herein.

The notification component 1120 can generate and provide (e.g., communicate) notification or alert messages relating to operation of the DLDP 102, its constituent or associated platforms, the first set of data stores 104, 106, and/or 108, and/or second set of data stores 202, 204, and/or 206, including notification or alert messages regarding an anomaly (e.g., non-compliance issue or other anomaly) detected by the governance component 404. For example, in response to the validation component 1114 detecting an anomaly (e.g., a privacy breach with regard to data of users; a breach of a condition with regard to sending electronic communications to a user; a breach with regard to a consent issue involving a user(s); or a breach of a condition or threshold level relating to data of users; etc.), the validation component 1114 can present the anomaly information to the notification component 1120. The notification component 1120 can generate a notification message that can comprise the anomaly information. In some embodiments, the notification component 1120 can communicate the notification message to a user (e.g., an entity representative who can handle data privacy breaches or anomalies), for example, via a communication device, such as communication device 138, to notify the user regarding the anomaly. The notification message can be or can comprise an exception or alert ticket relating to the anomaly. The notification message also can request that the anomaly issue be reviewed to determine whether the anomaly is valid and/or determine whether a remediation action is to be performed to remedy, correct, or mitigate the anomaly.

Figure 15:
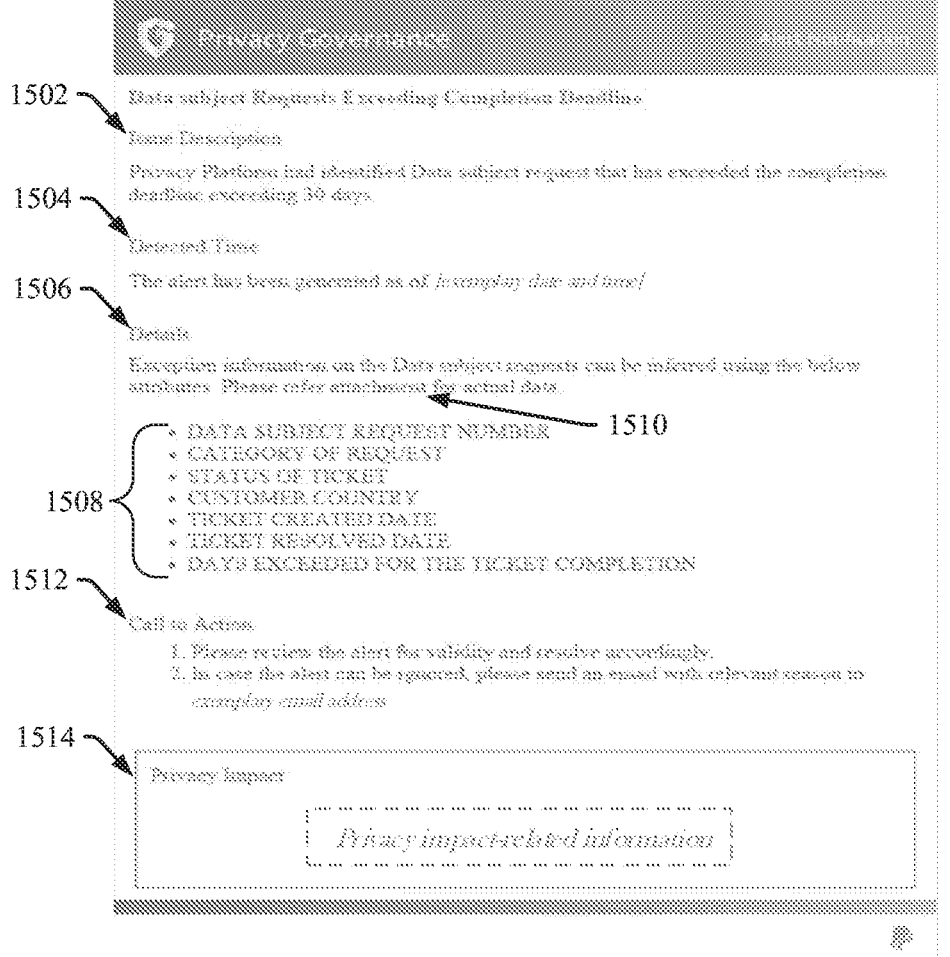
FIG. 15 presents a diagram of an example exception message relating to an example anomaly issue relating to data subject requests, in accordance with various aspects and embodiments of the disclosed subject matter.

Referring briefly to FIG. 15 (along with FIGS. 1, 2, 4, and 11), FIG. 15 presents a diagram of an example exception message 1500 (e.g., exception or alert ticket message) relating to an example anomaly issue relating to data subject requests, in accordance with various aspects and embodiments of the disclosed subject matter. The example exception message 1500 can comprise an issue description 1502 that can describe the anomaly issue that was detected. For instance, in the example exception message 1500, the issue description 1502 indicates that the Privacy Platform (e.g., governance platform) identified a data subject request(s) that exceeded the completion deadline of 30 days. The example exception message 1500 also can include a detected time 1504 that can indicate the time that the anomaly was detected and/or the alert of the anomaly was generated.

The example exception message 1500 also can comprise details 1506 regarding the anomaly. The details 1506 can comprise various attributes 1508 that can indicate and/or provide information regarding the anomaly. In the example exception message 1500 regarding the anomaly involving data subject requests exceeding the completion deadline, the attributes 1508 can comprise, for example, data subject request number, category of request, status of ticket (e.g., exception ticket), customer country, ticket creation date, ticket resolution date, and/or the days exceeded for ticket completion. In some embodiments, the example exception message 1500 can indicate that there is an attachment 1510 that can be referenced to obtain additional or more specific information (e.g., additional details) regarding the anomaly.

The example exception message 1500 further can comprise a call to action 1512 that can request that the message recipient take appropriate action (e.g., remediation action) to determine validity of the anomaly and remediate or resolve the anomaly issue. For example, the call to action 1512 can request that the message recipient review the alert (e.g., exception message 1500 and/or attached information) for validity and resolve the exception ticket and/or anomaly accordingly, and, in case the alert can be ignored (e.g., due to there being no actual problem, such as no actual non-compliance issue that has to be remedied or corrected), send a message (e.g., email message) with the reason that the exception ticket can be ignored. For instance, the call to action 1512 can request that the anomaly issue be reviewed by a user (e.g., entity representative) to determine whether the anomaly is valid and/or determine whether a remediation action is to be performed to remedy, correct, or mitigate the anomaly; and, if a remediation action is to be performed, perform the remediation action and report back that the remediation action has been performed and the anomaly issue has been resolved or otherwise remediated; and, if the anomaly is determined to not be valid (e.g., is not an issue that has to be remediated), report that the anomaly is determined to not be valid or otherwise does not have to be addressed.

The example exception message 1500 also can include a privacy impact statement 1514 that can include information (e.g., privacy impact-related information) that can indicate legal and/or contractual information relating to the anomaly issue. For example, with regard to an anomaly involving data subject requests not being completed in a timely manner, the privacy impact statement 1514 can provide information relating to an applicable privacy law and/or agreement (e.g., SLA) regarding data subject requests, and/or information relating to the impact or potential impact of failing to comply with the applicable privacy law and/or agreement.

In some embodiments, the notification component 1120 also can communicate an exception message (e.g., a different type of notification message) to an exception component 1122, which can be part of the back end 1104 of the governance component 404. The exception message can comprise same or similar information, or additional information, regarding the anomaly that was contained in the notification message sent to the user. The exception component 1122 (e.g., exception engine) can analyze and process the exception message. Based at least in part on the results of the analysis and processing, the exception component 1122 can document the exception incident (e.g., the anomaly) and can present or make available information (e.g., anomaly information) relating to the exception incident, so that a user (e.g., entity representative) can address (e.g., check out, remediate, or take other appropriate action with regard to) the anomaly. For example, if the anomaly relates to customers, who opted out of receiving marketing emails from the entity, continuing to receive marketing emails from the entity, the exception component 1122 can present or make available, to the user, information relating to this anomaly of improperly sending marketing emails to customers who opted out of receiving such emails. As another example, if the anomaly relates to data subject requests that being completed within the applicable deadline, the exception component 1122 can present or make available, to the user, information relating to the anomaly of data subject requests not being completed by the applicable deadline.

In some embodiments, the exception component 1122 can be associated with (e.g., communicatively connected to) or can comprise core platforms 1124 that can facilitate analyzing and processing exception tickets regarding anomalies, working in conjunction with appropriate users to handle or address the exception tickets (e.g., working in conjunction with a marketing representative or a software engineer or programmer regarding a problem relating to improperly sending of marketing emails to customers; working in conjunction with a representative of the second entity regarding a privacy breach of data of users involving the second set of data stores 202, 204, and/or 206; or working in conjunction with an entity representative, who handles issues relating to data subject requests, that there are data subject requests that are not being processed and completed within the applicable time limit), performing or facilitating performing remediation actions, and/or reporting results of validation of an anomaly issue or remediation of an anomaly issue. The core platforms 1124 can comprise or employ resources, devices, user interfaces, servers, file systems, applications, technologies, processes, procedures, and protocols that can facilitate performing the various operations or actions, such as described herein, to desirably address exception tickets and resolve anomaly issues.

The remediation component 1118 can monitor and track the progress of the remediation or exception validation being performed by the exception component 1122, core platforms 1124, and/or user(s) that are addressing the anomaly issue. If the remediation component 1118 determines that the anomaly issue is not being suitably or timely addressed by the user, the remediation component 1118 or notification component 1120 can send out a reminder message or other suitable message to a communication device or messaging account (e.g., email account, or text messaging account) of the user to notify or remind the user that the anomaly issue still has not been addressed.

In response to being notified of the anomaly issue, the user or another user can check out the anomaly issue to determine whether it is valid, and, if so, can perform a remediation action to resolve or remediate the anomaly issue. For example, with regard to the improper sending of marketing emails to customers who opted out, the user may find that part of the coding relating to the sending of marketing emails contains an error that is resulting in marketing emails being sent to customers who opted out of receiving marketing emails. The user or another user can modify the coding to eliminate the error. The user can report back to the exception component 1122 or remediation component 1118 that the anomaly issue has been resolved or remediated. In response, the remediation component 1118 can close out the file on the exception ticket relating to that anomaly, noting that the anomaly issue was resolved or remediated. If, instead, the user determines that the anomaly issue is not valid or otherwise does not have to be remediated, the user can report back to the exception component 1122 or remediation component 1118 that the anomaly issue was not valid or otherwise did not have to be remediated. In response, the remediation component 1118 can close out the file on the exception ticket relating to that anomaly, noting that the anomaly issue was determined to not be valid or it was determined that the anomaly did not have to be remediated.

In certain embodiments, the system 1100 can comprise a representational state transfer (REST) API component 1126 that can comprise a set of RESTful APIs that can be web service APIs (e.g., HTTP-based APIs) that can follow or comply with certain REST architectural constraints. The REST architectural constraints can be or can comprise certain rules that can allow programs to communicate with each other, wherein, for example, an API can be created on a server and a client device (e.g., communication device) can communicate with the API on the server. For instance, the set of RESTful APIs can enable users to access content of a website or a platform(s) (e.g., DLDP 102, or governance component 404, etc.) using their client devices to communicate with the APIs of or associated with the governance component 404 or other components of the system 1100.

In some embodiments, the system 1100 can include a bug tracking component 1128 that can comprise various desired bug tracking tools that can enable users to detect, identify, record, and/or track bugs (e.g., a computer software, firmware, or hardware error, flaw, or fault) or potential bugs in a computer-based system. The bug tracking tools employed by the bug tracking component 1128 can comprise, for example, Jira bug tracking tools, Flowable bug tracking tools, or other desired bug tracking tools that can enable users (e.g., software developers or programmers) detect, identify, record, and/or track bugs or potential bugs in the DLDP 102 and its constituent or associated components (e.g., rights management component 402, governance component 404, or scanner component(s) (e.g., 124, 208, or 210), etc.), and can facilitate correcting or eliminating bugs in the DLDP 102 and its constituent or associated components. In some embodiments, one or more of the bug tracking tools employed by the bug tracking component 1128 can be open-source bug tracking tools.

Figure 16:
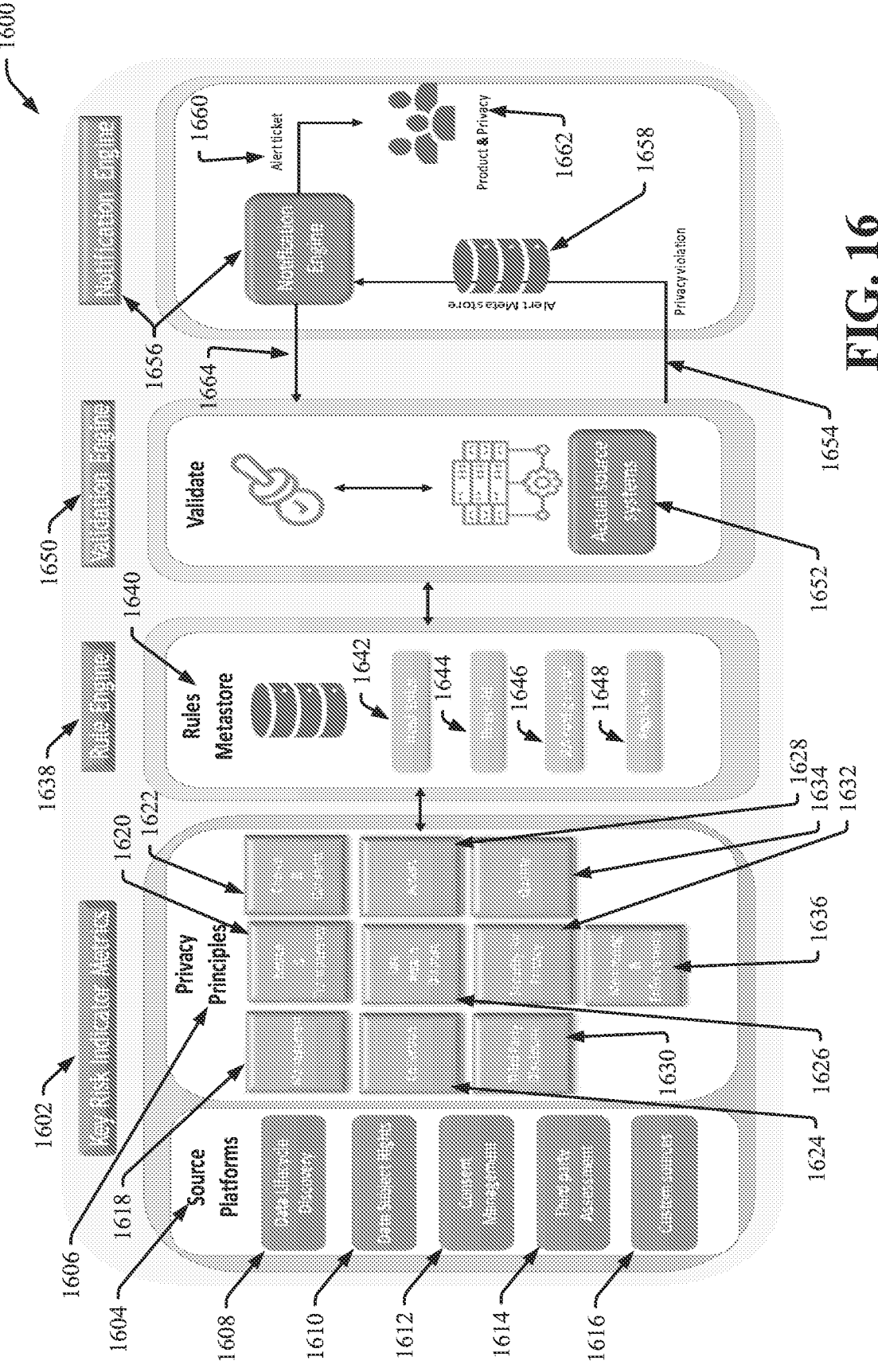
FIG. 16 illustrates a diagram of an example governance flow for governing the collecting, processing, accessing, storing, sharing, and utilization of data of users and information relating to data of users, in accordance with various aspects and embodiments of the disclosed subject matter.

Referring to FIG. 16 (along with FIGS. 1, 2, 4, and 11), FIG. 16 illustrates a diagram of an example governance flow 1600 for governing the collecting, processing, accessing, storing, sharing, and utilization of data of users and information relating to data of users, in accordance with various aspects and embodiments of the disclosed subject matter. In some embodiments, the governance component 404 can employ the example governance flow 1600 to facilitate governing the collecting, processing, accessing, storing, sharing, and utilization of data of users, in accordance with the defined data management criteria, which can correspond to and/or be based at least in part on respective laws and regulations of respective jurisdictions and/or respective agreements between entities (e.g., between organizations and users, such as customers). The governance component 404 can evaluate KRI metrics 1602 associated with source platforms 1604 and privacy principles 1606, such as more fully described herein. The privacy principles 1606 can be based at least in part on the laws, regulations, and/or agreements.

The source platforms 1604 can comprise, for example, the data lifecycle discovery platform (DLDP) 1608, data subject rights platform 1610, consent management platform 1612, third party assessment platform 1614, custom sources 1616, and/or other platforms (e.g., governance component 404), such as described herein. The DLDP 102 can manage discovery, scanning, storing, and/or processing of data, such as described herein. The data subject rights platform 1610 can manage data subject rights of users (e.g., customers) with regard to their data, access to data of users (e.g., access of users to their personal information), modification of data by users, etc., as more fully described herein. The consent management platform 1612 can manage consent of users to allow entities (e.g., organizations) to collect, process, access, store, share, and utilize data of users, send electronic communications (e.g., emails, text messages, or phone calls) to users, consent to use cookies with regard to users, etc., such as more fully described herein. The third party assessment platform 1614 can manage sharing of data of users with third party entities and performing assessments (e.g., privacy and/or risk assessments, such as IRAs or PRAs) relating to sharing of data of users with third party entities, such as described herein. Custom sources 1616 can comprise modules or platforms that can be added to facilitate collecting, processing, accessing, storing, sharing, and utilizing of data of users.

The privacy principles 1606 can comprise, for example, management 1618, notice and transparency 1620, choice and consents 1622, collection 1624, use, retain and dispose 1626, access 1628, third party disclosure 1630, security for privacy 1632, quality 1634, monitoring and enforcements 1636, and/or another desired privacy principle, such as more fully described herein. Respective privacy principles (e.g., 1620 through 1636) of the privacy principles 1606 can be applicable or relevant to respective source platforms (e.g., 1608 through 1616) of the source platforms 1604.

The rules engine 1638 can determine and generate the set of rules based at least in part on applicable laws and regulations of jurisdictions relating to data protection, and applicable agreements relating to data protection, as more fully described herein. The rules engine 1638 can incorporate or take into account the privacy principles 1606, which can be embodied in or derived from the laws, regulations, and/or agreements, when determining the rules of the set of rules. The rules engine 1638 can comprise or be associated with a rules metastore 1640 (e.g., one or more data stores) in which the rules engine 1638 can store the set of rules, or information relating to the set of rules (e.g., information relating to the laws, regulations, and/or agreements; metadata; information relating to privacy principles 1606; or information relating to source platforms 1604; etc.). The rules engine 1638 can structure various rules of the set of rules to have conditions (e.g., rule conditions) that can be utilized to indicate when anomalies (e.g., data privacy anomalies or breaches) relating to data of users are or may be occurring, wherein the rules engine 1638 can determine the conditions of the rules based at least in part on the obligations (e.g., obligations on the entity(ies)) that the rules engine 1638 can determine or derive from the laws, regulations, and/or agreements. The conditions in the rules can relate to, for example, trend spikes 1642 in information trends relating to data of users, thresholds 1644 that can be employed to facilitate determining when conditions have been satisfied (e.g., breached; met or exceeded), SLA configuration 1646 that can facilitate determining or implementing the conditions for the set of rules (e.g., in accordance with an agreement, such as an SLA), and regulation 1648 regarding the laws and regulations relating to data protection.

For instance, the rules engine 1638 can determine or formulate a condition in a rule to facilitate (e.g., enable) detecting a trend spike 1642 in information relating to user data, wherein the trend spike 1642 can indicate an anomaly that can or potentially can be a violation of an obligation (e.g., legal or contractual obligation) derived from an applicable law, regulation, or agreement. The rules engine 1638 also can determine thresholds 1644 that can be applied with regard to trend spikes 1642, time limits, data limits, consent limits, data retention limits, enforcement limits, notice limits, messaging limitations, and/or other conditions or limits relating to data protection, in accordance with applicable laws, regulations, and/or agreements.

For example, the rules engine 1638 can determine a threshold 1644, such as a defined threshold amount of time (e.g., 10 days, 15 days, 30 days, or other applicable amount of time) for completing a data subject request, in accordance with an applicable law, regulation, or agreement, and can determine and formulate a rule that can include a condition and the defined threshold amount of time, where the rule can indicate or specify that a data subject request has to be completed within the defined threshold amount of time after the data subject request has been received by the entity (e.g., received by the website or platform of or associated with the entity). As another example, the rules engine 1638 can determine a threshold 1644, such as a defined threshold amount of time (e.g., 10 days (e.g., 10 business days), 15 days, or other applicable amount of time) for discontinuing the sending of electronic communications to a user who has unsubscribed from or opted out of receiving the electronic communications, in accordance with an applicable law, regulation, or agreement. The rules engine 1638 can determine and formulate a rule that can include a condition and the defined threshold amount of time for discontinuing the sending of electronic communications to a user, where the rule can indicate or specify that the entity has to discontinue the sending of electronic communications to a user within the defined threshold amount of time after the request to unsubscribe or opt out has been received by the entity (e.g., received by the website or platform of or associated with the entity).

The set of rules determined and generated by the rules engine 1638 can be provided or made available to a validation engine 1650 (e.g., validation component 1114), as part of the governance flow 1600. The validation engine 1650 can utilize and apply respective (e.g., applicable) rules (e.g., first subset of rules, or second subset of rules, etc.) of the set of rules to respective entities associated with respective jurisdictions, as more fully described herein. The validation engine 1650 can be associated with (e.g., communicatively connected to, interfaced with) the source systems 1652 (e.g., first set of data stores 104, 106, and 108; or second set of data stores 202, 204, and 206; etc.) associated with respective entities as well as the various platforms (e.g., source platforms 1604) to facilitate monitoring and tracking the collecting, processing, accessing, storing, sharing, and utilization of data of users by the source systems 1652 associated with the entities and the various platforms. In connection with the monitoring and tracking, the validation engine 1650 can apply the respective rules of the set of rules to the respective source systems 1652 associated with the respective entities and the platforms to validate or verify whether the respective source systems 1652 and/or platforms are in compliance with applicable rules of the set of rules or whether there exist any anomalies relating to data protection associated with the collecting, processing, accessing, storing, sharing, and utilization of data of users. For instance, the validation engine 1650 can apply the respective rules of the set of rules to the respective source systems 1652 associated with the respective entities and the platforms to determine whether the respective source systems 1652 and/or platforms are in compliance with applicable rules of the set of rules or are in non-compliance with any applicable rules of the set of rules; if in non-compliance, determine to what extent a source system 1652 or platform is in non-compliance and the type(s) of non-compliance; and/or determine other anomalies or potential anomalies associated with the collecting, processing, accessing, storing, sharing, and utilization of data of users, such as more fully described herein.

As part of the governance flow 1600, if the validation engine 1650 detects an anomaly (e.g., a non-compliance or potential non-compliance issue or other anomaly, such as, for example, a privacy violation) during the validation process, the validation engine 1650 can communicate a message 1654, comprising information relating to the anomaly, to the notification engine 1656. For instance, the message 1654 can be received and stored in an alert meta-store 1658 of or associated with the notification engine 1656. The notification engine 1656 can analyze the information relating to the anomaly contained in the message 1654. Based at least in part on the analysis of the information relating to the anomaly, the notification engine 1656 can generate an alert ticket 1660 (e.g., exception or alert ticket) that can comprise information (e.g., details) regarding the anomaly and a request to validate the anomaly and, if there is an actual problem, remediate or resolve the anomaly, as more fully described herein. The notification engine 1656 can communicate the alert ticket 1660 to an appropriate user 1662 (e.g., service representative, such as a product and privacy representative involved in validating and resolving anomalies).

After the user 1662 has validated and/or resolved the anomaly or potential anomaly identified in the alert ticket 1660, the user 1662 can communicate with the notification engine 1656 or other component of the governance platform to inform (e.g., provide update or remediation information to) the notification engine 1656 or other component of the governance platform that the alert ticket 1660 has been addressed (e.g., the anomaly was validated and was resolved or mitigated; or the anomaly turned out to not be valid). The notification engine 1656 (or other component of the governance platform) can send a message 1664, comprising the update or remediation information, to the validation engine 1650 to inform the validation engine 1650 that the alert ticket 1660 has been addressed.

Figure 17:
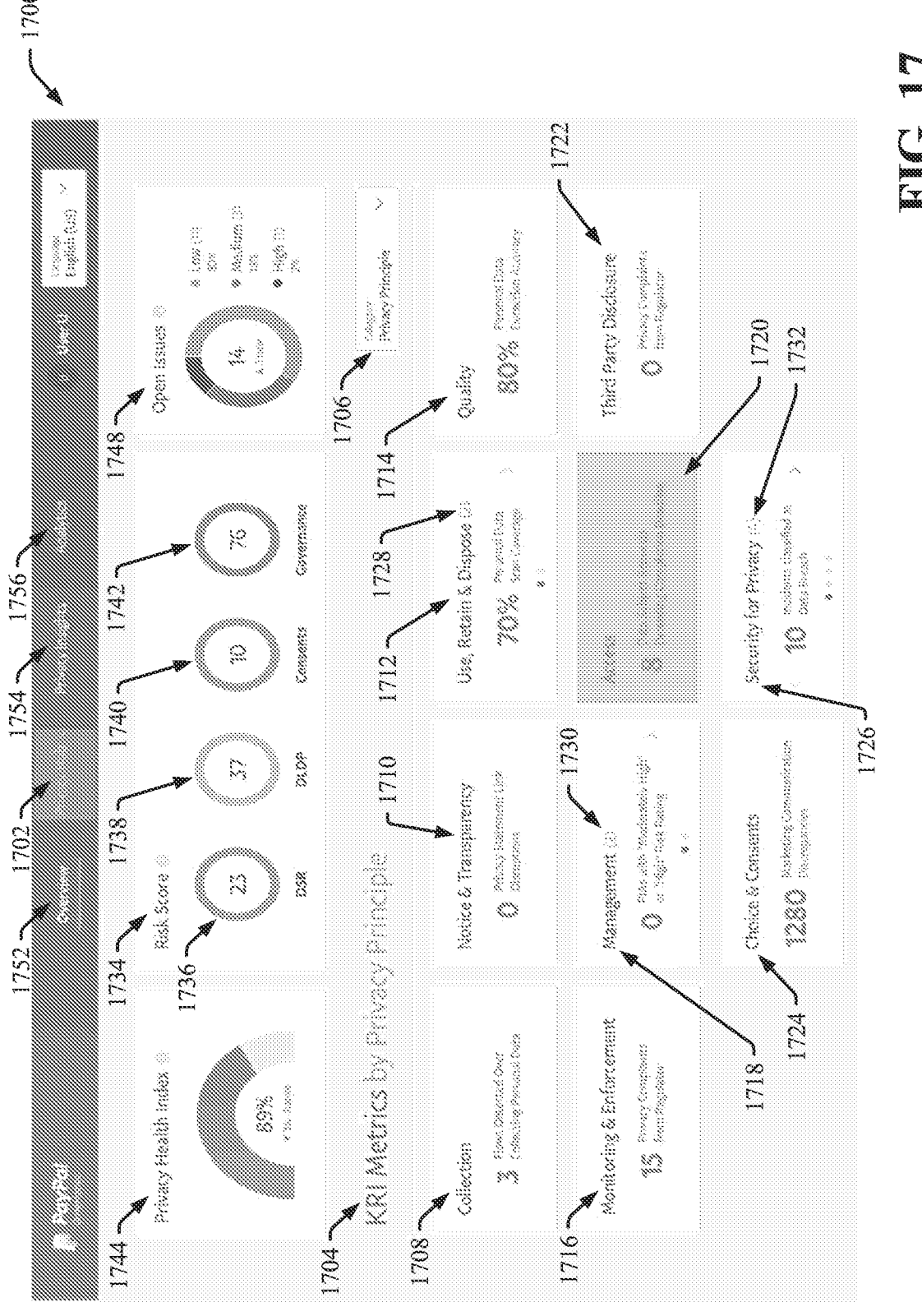
FIG. 17 illustrates a diagram of an example user interface of a privacy hub that can provide information regarding KRI metrics associated with privacy principles, risk scores, a privacy health index, and other information, in accordance with various aspects and embodiments of the disclosed subject matter.

Referring to FIG. 17 (along with FIGS. 1, 2, 4, and 11), FIG. 17 illustrates a diagram of an example user interface 1700 of a privacy hub that can provide information regarding KRI metrics associated with privacy principles, risk scores, a privacy health index, and other information, in accordance with various aspects and embodiments of the disclosed subject matter. The example user interface 1700 can comprise information that can be generated by the governance component 404. The governance component 404 and user interface component 128 can provide or facilitate providing the example user interface 1700 to a communication device (e.g., client device), such as communication device 138, for viewing by an authorized user.

The example user interface 1700 can be part of a privacy hub of or associated with the governance component 404, and can be generated by the governance component 404 in response to selection of the privacy hub button 1702. The example user interface 1700 can comprise, for example, KRI metrics 1704 by privacy principle. For instance, the user can select a category filter 1706 for privacy principle. Based at least in part on the selected category filter 1706 of privacy principle, the governance component 404 can provide various KRI metrics 1704 associated with various privacy principles. The privacy principles can comprise, for example, collection 1708, notice and transparency 1710, use, retain and dispose 1712, quality 1714, monitoring and enforcement 1716, management 1718, access 1720, third party disclosure 1722, choice and consents 1724, and security for privacy 1726, such as more fully described herein.

The KRI metrics regarding collection 1708 can indicate, for example, a number (e.g., 3) of flows that have been detected over collecting personal data of users. The governance component 404 also can provide other desired KRI metrics data regarding collection 1708 via the user interface 1700 or another user interface as well. The KRI metrics regarding notice and transparency 1710 can indicate, for example, that there have been zero privacy statement link disruptions detected (e.g., over a defined period of time, or since that KRI metric was last checked). Thus, there has been no detection of a disruption of the link to the privacy statement that is to be provided to users. As desired, the governance component 404 also can provide other desired KRI metrics data regarding notice and transparency 1710 via the user interface 1700 or another user interface.

The KRI metrics regarding use, retain and dispose 1712 can indicate, for example, a percentage (e.g., 70%) of personal data scan coverage performed on a set of data stores (e.g., data stores 104, 106, and 108) associated with an entity (e.g., over a defined period of time, or since that KRI metric was last checked). As desired, the governance component 404 also can provide other desired KRI metrics data regarding use, retain and dispose 1712 via the user interface 1700 or another user interface. For example, the user interface 1700 indicates that there are two items of KRI metrics data regarding use, retain and dispose 1712 (as indicated at reference numeral 1728). The user can select the button for use, retain and dispose 1712 to access and view a second item of KRI metrics data regarding use, retain and dispose 1712 (e.g., a second item that can indicate which particular data stores, or portions thereof, have been scanned for personal data of users, and/or indicate which particular data stores, or portions thereof, remain to be scanned for personal data).

The KRI metrics regarding quality 1714 can indicate, for example, a percentage (e.g., 80%) of personal data detection accuracy attained via the scanning of the set of data stores (e.g., data stores 104, 106, and 108) associated with the entity. As desired, the governance component 404 also can provide other desired KRI metrics data regarding quality 1714 via the user interface 1700 or another user interface.

The KRI metrics regarding monitoring and enforcement 1716 can indicate, for example, a number (e.g., 15) of privacy complaints from a regulator (e.g., data privacy regulator) in connection with the entity (e.g., over a defined period of time, or since that KRI metric was last checked). The governance component 404 also can provide other desired KRI metrics data regarding monitoring and enforcement 1716 via the user interface 1700 or another user interface as well.

The KRI metrics regarding management 1718 can indicate, for example, a number (e.g., 0) of PIAs that have a "moderately high" or "high" risk rating. As desired, the governance component 404 also can provide other desired KRI metrics data regarding management 1718 via the user interface 1700 or another user interface. For example, the user interface 1700 indicates that there are two items of KRI metrics data regarding management 1718 (as indicated at reference numeral 1730). The user can select the button for management 1718 to access and view a second item of KRI metrics data regarding management 1718.

The KRI metrics regarding access 1720 can indicate, for example, that a number (e.g., 8) of data subject requests exceeding the completion deadline in connection with the entity. As desired, the governance component 404 also can provide other desired KRI metrics data regarding access 1720 via the user interface 1700 or another user interface.

The KRI metrics regarding third party disclosure 1722 can indicate, for example, a number (e.g., 0) of privacy complaints from the regulator regarding sharing of data of users with third party entities, in connection with the entity. As desired, the governance component 404 also can provide other desired KRI metrics data regarding third party disclosure 1722 via the user interface 1700 or another user interface.

The KRI metrics regarding choice and consents 1724 can indicate, for example, a number (e.g., 1280) of marketing communication discrepancies in connection with the entity. As desired, the governance component 404 also can provide other desired KRI metrics data regarding choice and consents 1724 via the user interface 1700 or another user interface.

The KRI metrics regarding security for privacy 1726 can indicate, for example, a number (e.g., 10) of incidents classified as data breach associated with an entity (e.g., over a defined period of time, or since that KRI metric was last checked). As desired, the governance component 404 also can provide other desired KRI metrics data regarding security for privacy 1726 via the user interface 1700 or another user interface. For example, the user interface 1700 indicates that there are four items of KRI metrics data regarding security for privacy 1726 (as indicated at reference numeral 1732). The user can select the button for security for privacy 1726 to access and view a second, third, or fourth item of KRI metrics data regarding security for privacy 1726.

In some embodiments, the governance component 404 can present, via the user interface 1700, various risk scores 1734 for various platforms and/or privacy principles. For example, the governance component 404 can present, via the user interface 1700, a risk score (e.g., 23) for DSR 1736, a risk score (e.g., 37) for DLDP 1738, a risk score (e.g., 10) for consents 1740, a risk score (e.g., 76) for governance 1742 (e.g., governance platform), and/or other risk scores. The governance component 404 also can present, via the user interface 1700, a privacy health index (e.g., 89%) 1744 associated with an entity. The governance component 404 also can present, via the user interface 1700, also can indicate the percentage (e.g., down 3%) of change 1746 in the privacy health index (e.g., over a defined period of time, or since that KRI metric was last checked).

In certain embodiments, the governance component 404 can present, via the user interface 1700, can present other information (e.g., governance-related information), such as information regarding a number (e.g., 14) of open issues 1748. The governance component 404 also can present, via the user interface 1700, the respective importance levels 1750 (e.g., low, medium, and high priority or risk levels) of the open issues, and the respective numbers or percentages of open issues at the respective importance levels 1750.

The user also can select an overview button 1752 to obtain overview information relating to governance issues. In response, the governance component 404 can present, via the user interface 1700 or another interface, the overview information relating to governance issues relating to data of users to the user. As desired, the user also can select a privacy insights button 1754 to access privacy insights information relating to governance. In response, the governance component 404 can present, via the user interface 1700 or another interface, the privacy insights information relating to governance to the user. The user also can select an analytics button 1756 to access analytics information relating to governance. In response to selection of the analytics button 1756, the governance component 404 can generate analytics information relating to various analytics performed on data of users and/or information relating to management of data of users (or can access previously generated analytics information), and can present, via the user interface 1700 or another interface, the analytics information to the user.

Figure 18:
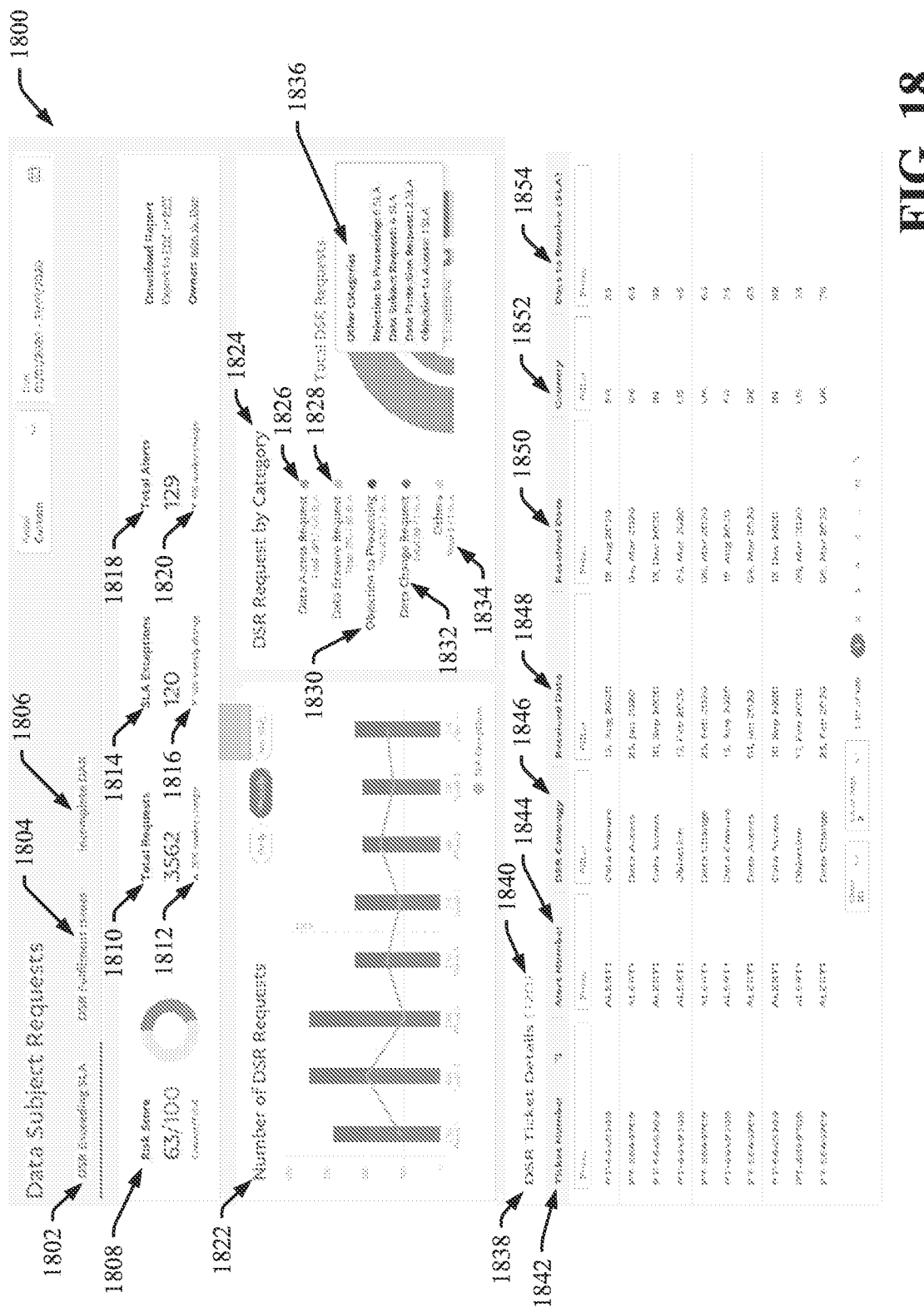
FIG. 18 depicts a diagram of an example user interface that can provide various information regarding data subject requests of users, in accordance with various aspects and embodiments of the disclosed subject matter.

Turning to FIG. 18 (along with FIGS. 1, 2, 4, and 11), FIG. 18 depicts a diagram of an example user interface 1800 that can provide various information regarding data subject requests of users, in accordance with various aspects and embodiments of the disclosed subject matter. The governance component 404 can determine and generate the various types of information regarding data subject requests of users, based at least in part on an analysis of data of users and/or information relating to management of data of users, including information relating to the processing of data subject requests of users. In the example user interface 1800, DSR exceeding SLA 1802 has been selected, and the user interface 1800 is presenting various items of information relating to DSRs that have exceeded the SLA (e.g., exceeded the time limit to complete DSRs of users, as such time limit is specified by the SLA). As desired, a user also can select DSR fulfillment issues 1804 to obtain information regarding issues that exist with regarding to fulfilling DSR requests or incomplete data access requests (DARs) 1806 to obtain information relating to incomplete DARs.

With further regard to DSR exceeding SLA 1802, the user interface 1800 can present a risk score (e.g., 63/100) 1808 associated with DSRs with regard to an entity, as determined by the governance component 404. The user interface 1800 also can present a total number (e.g., 3562) of requests 1810 that can provide the total number of DSR requests during the defined time period, and the percentage (e.g., up 20%) of weekly change 1812 in the total number of DSR requests, as determined by the governance component 404. The user interface 1800 can present a number (e.g., 120) of SLA exceptions 1814 that can indicate the number of exception incidents relating to DSRs (e.g., a number of exception incidents due to DSRs not being completed within the time limit provided in the SLA) during the defined time period, and the percentage (e.g., down 18%) of weekly change 1816 in the number of SLA exceptions, as determined by the governance component 404. The user interface 1800 further can present a total number (e.g., 129) of alerts 1818 that can indicate the total number of alerts relating to DSRs during the defined time period, and the percentage (e.g., down 6%) of weekly change 1820 in the number of alerts, as determined by the governance component 404.

The example user interface 1800 also can provide a graph of the number of DSR requests 1822, which, as depicted, can present information regarding the number of DSR requests per week and the number of SLA exceptions per week, over a given time period (e.g., December and January), as such information has been determined by the governance component 404. As desired, the user can view a graph of the number of DSR requests per day or per month.

The governance component 404 also can determine, and the example user interface 1800 can present, information regarding DSR requests by category 1824, including information regarding data access requests 1826 (e.g., number of data access requests and number of SLA exceptions regarding data access requests), information regarding data erasure requests 1828 (e.g., number of data erasure requests and number of SLA exceptions regarding data erasure requests), information regarding objections to processing 1830 DSRs (e.g., number of objections to processing DSRs and number of SLA exceptions regarding objections to processing DSRs), information regarding data change requests 1832 (e.g., number of data change requests and number of SLA exceptions regarding data change requests), and information regarding other requests 1834 (e.g., number of other types of requests and number of SLA exceptions regarding the other requests). The governance component 404 further can determine, and the example user interface 1800 can present, information regarding other categories 1836 relating to DSRs, including a number of SLA exceptions relating to rejection to processing DSRs, a number of SLA exceptions relating to DSRs, a number of SLA exceptions relating to data protection requests, and a number of SLA exceptions with regard to objection to access.

In some embodiments, the governance component 404 can determine, and the example user interface 1800 can present, DSR ticket details 1838 relating to exception tickets for exception incidents relating to DSRs during the given time period. The DSR ticket details 1838 can comprise a number (e.g., 120) of DSR tickets 1840 during the given time period. The DSR ticket details 1838 also can present specific information regarding individual DSR tickets, including, for example, a ticket number 1842 of DSR tickets, an alert number 1844 of DSR tickets, a DSR category 1846 of the DSR tickets (e.g., data access, data erasure, or objection, etc.), a received date 1848 that can indicate the date a DSR ticket was received, a resolved date 1850 that can indicate the date a DSR ticket was resolved, a country 1852 associated with the DSR ticket (e.g., the country where the DSR-related exception occurred), and a number of days to resolve 1854 the SLA exceptions relating to DSRs.

Figure 19:
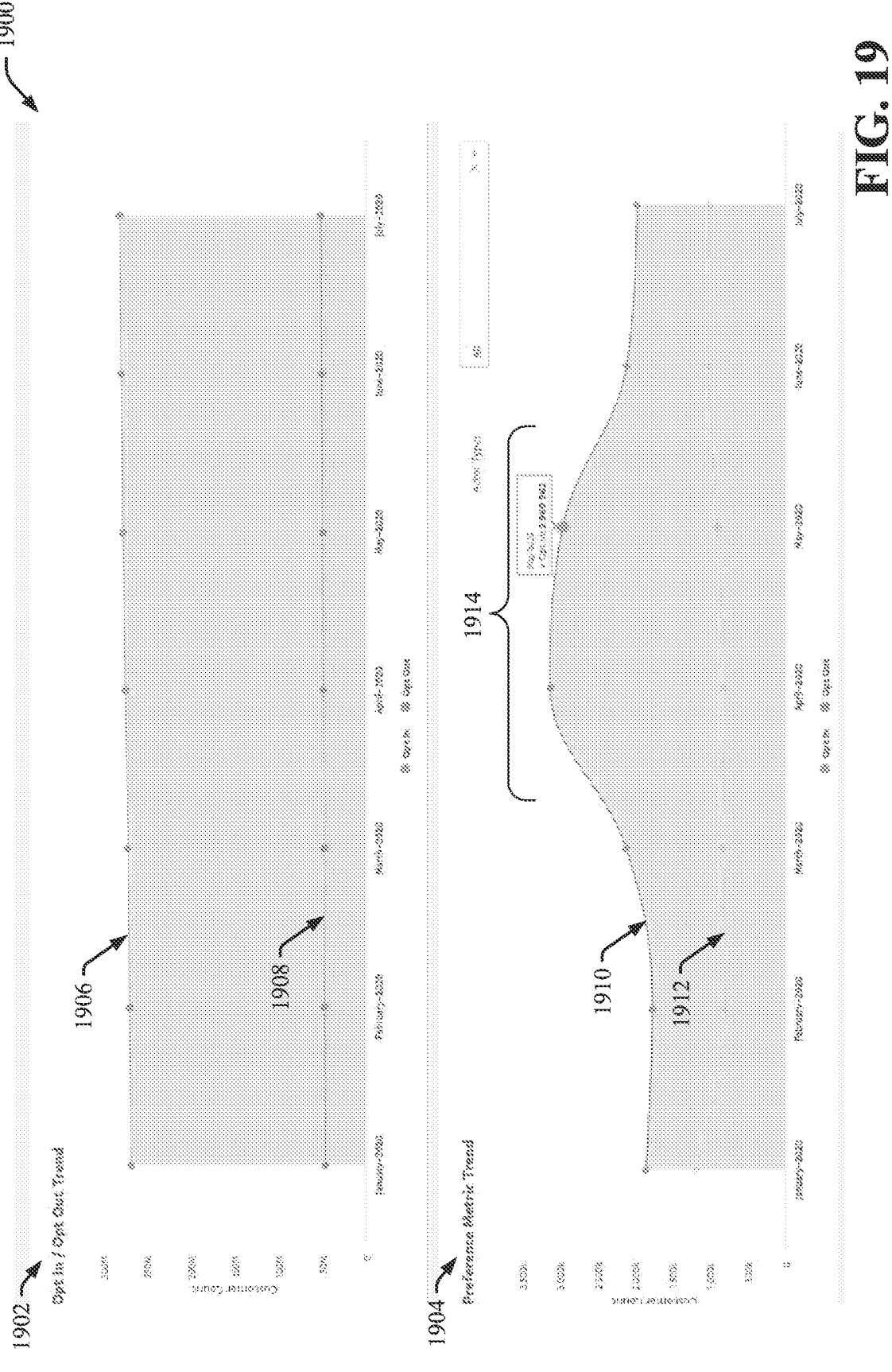
FIG. 19 presents a diagram of example graphs that can provide information regarding certain opt in and opt out trends, in accordance with various aspects and embodiments of the disclosed subject matter.

Referring briefly to FIG. 19 (along with FIGS. 4 and 11), FIG. 19 presents a diagram of example graphs 1900 that can provide information regarding certain opt in and opt out trends, in accordance with various aspects and embodiments of the disclosed subject matter. The governance component 404 can determine and generate the information regarding opt in and opt out trends, based at least in part on an analysis of information that can indicate, for example, when users (e.g., customers) have opted in to receiving electronic communications from an entity and when users have opted out of receiving electronic communications from the entity, with regard to a given time period.

The example graphs 1900 can comprise an opt in/opt out trend graph 1902 and a preference metric trend graph 1904. The opt in/opt out trend graph 1902 can comprise opt in data 1906 (e.g., in graphical form) that can indicate the total number of users who have opted in to receiving electronic communications from the entity for each month during the given time period and opt out data 1908 (e.g., in graphical form) that can indicate the total number of users who have opted out of receiving electronic communications from the entity for each month during the given time period.

The preference metric trend graph 1904 can comprise monthly opt in data 1910 (e.g., in graphical form) that can indicate, for each month during the given time period, the number of users who have opted in to receiving electronic communications from the entity during that month and monthly opt out data 1912 (e.g., in graphical form) that can indicate, for each month during the given time period, the number of users who have opted out of receiving electronic communications from the entity during that month. As can be observed from the preference metric trend graph 1904, the governance component 404 can identify, and the preference metric trend graph 1904 can show, any abnormal spikes, such as graph region 1914, in the user opt in/opt out trend, wherein the graph region 1914 can indicate an abnormal spike in the opt in trend data during April and May. If the governance component 404 (e.g., validation component 1114 of the governance component 404) determines that an abnormal spike in the number of users opting in during a particular month(s) exceeds a defined threshold number of opt in users, as provided in an applicable rule of the set of rules (e.g., a rule that applies to the entity), the governance component 404 can generate an exception ticket regarding the anomaly (e.g., the abnormal spike) to initiate validation and/or remediation of the anomaly issue, as more fully described herein.

Figure 20:
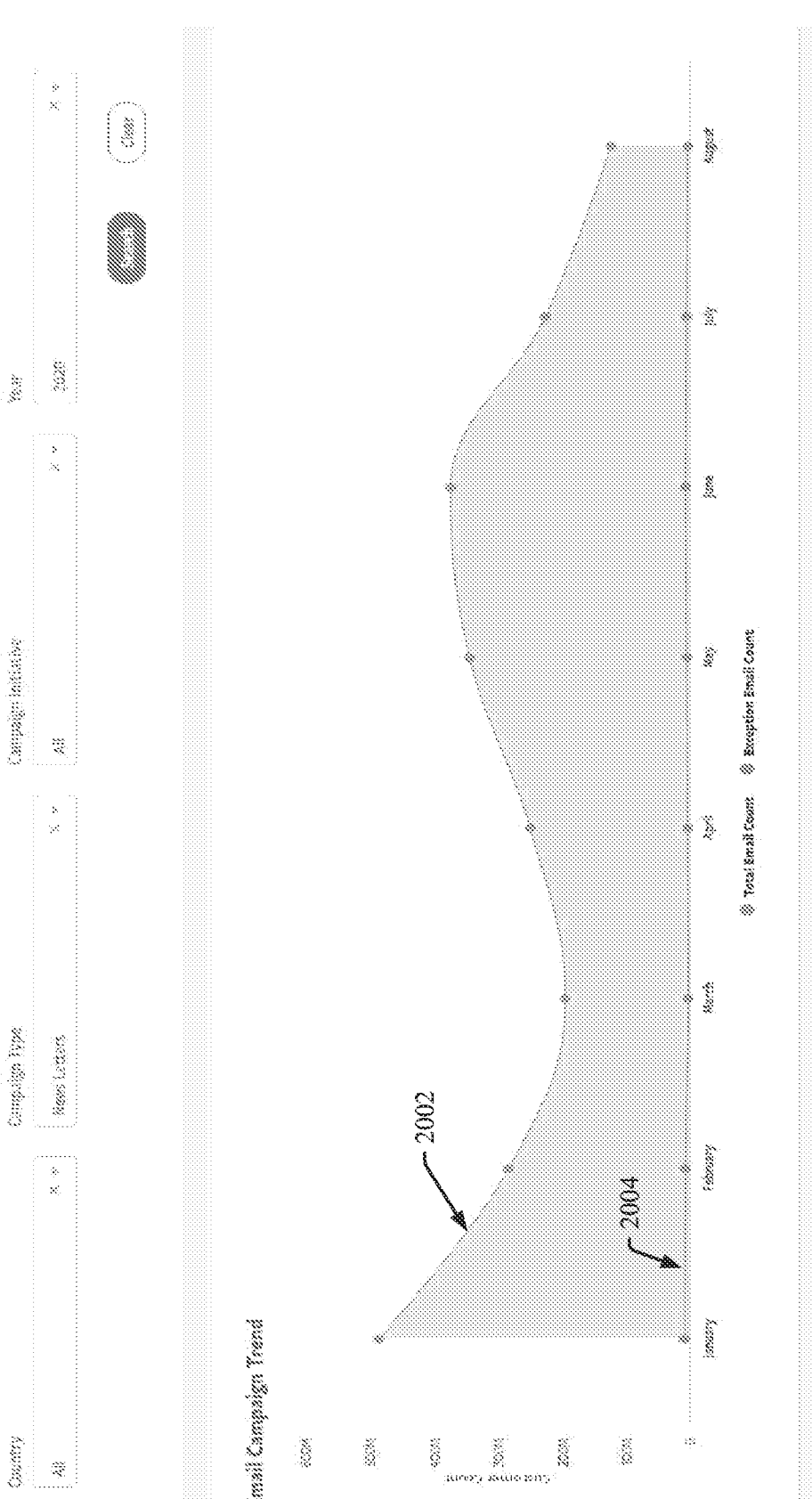
FIG. 20 presents a diagram of an example graph that can provide information regarding marketing opt-out exception incidents in relation to total email messages sent by an entity during a given time period, in accordance with various aspects and embodiments of the disclosed subject matter.

Turning briefly to FIG. 20 (along with FIGS. 4 and 11), FIG. 20 presents a diagram of an example graph 2000 that can provide information regarding marketing opt-out exception incidents in relation to total email messages sent by an entity during a given time period, in accordance with various aspects and embodiments of the disclosed subject matter. The governance component 404 can determine and generate the information regarding the marketing opt-out exception incidents in relation to the total email messages sent by the entity during the given time period, based at least in part on an analysis of information regarding emails sent to users by the entity each month and exception tickets relating to the sending of emails to users by the entity each month, during the given time period.

The graph 2000 can comprise email count data 2002 (e.g., in graphical form) that can indicate, for each month during the given time period, the total number of emails sent to users by the entity during the month. The graph 2000 also can comprise exception email count data 2004 (e.g., in graphical form) that can indicate, for each month during the given time period, the total number of exception tickets regarding exception incidents arising out of emails improperly sent, or at least potentially improperly sent, to users by the entity during the month. As can be observed from the graph 2000, the number of exception tickets generated each month is relatively and desirably low and also is relatively and desirable steady (e.g., no abnormal spikes).

Figure 21:
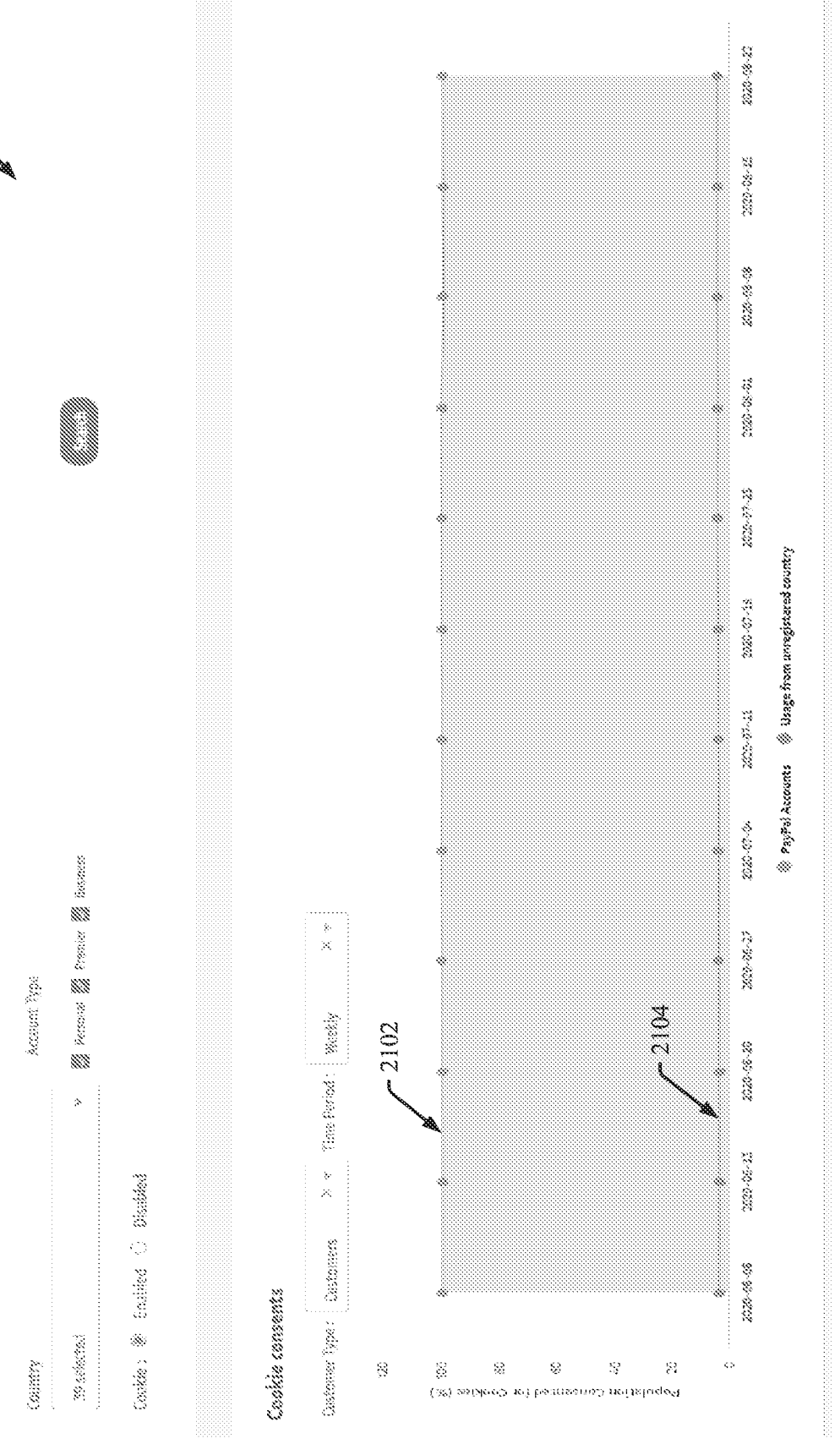
FIG. 21 presents a diagram of an example graph that can provide information regarding cookie consents of users associated with an entity in relation to consents associated with unregistered countries during a given time period, in accordance with various aspects and embodiments of the disclosed subject matter.

Referring briefly to FIG. 21 (along with FIGS. 4 and 11), FIG. 21 presents a diagram of an example graph 2100 that can provide information regarding cookie consents of users associated with an entity in relation to consents associated with unregistered countries during a given time period, in accordance with various aspects and embodiments of the disclosed subject matter. The governance component 404 can determine and generate the information regarding the cookie consents (e.g., cookie acceptances) of users associated with the entity in relation to consents associated with unregistered countries during the given time period, based at least in part on an analysis of information regarding cookie consents of users associated with entity accounts each month and information regarding consents usage from unregistered countries each month, during the given time period.

The graph 2100 can comprise entity account consent data 2102 (e.g., in graphical form) that can indicate, for each month during the given time period, the percentage of population (e.g., users) who consented for cookies with regard to the entity during the month. The graph 2100 also can comprise usage from unregistered country data 2104 (e.g., in graphical form) that can indicate, for each month during the given time period, a percentage of population who consented for cookies with regard to unregistered countries during the month. As can be observed from the graph 2100, the percentage of population (e.g., users) who consented for cookies with regard to the entity for each month of the given time period is relatively and desirably high (e.g., at or almost 100%) and also is relatively and desirable steady (e.g., no abnormal dips (e.g., declines) in the percentage). As also can be observed from the graph 2100, the percentage of population who consented for cookies with regard to unregistered countries for each month of the given time period is relatively and desirably low (e.g., relatively close to 0%) and also is relatively and desirable steady (e.g., no abnormal spikes in the percentage).

Figure 22:
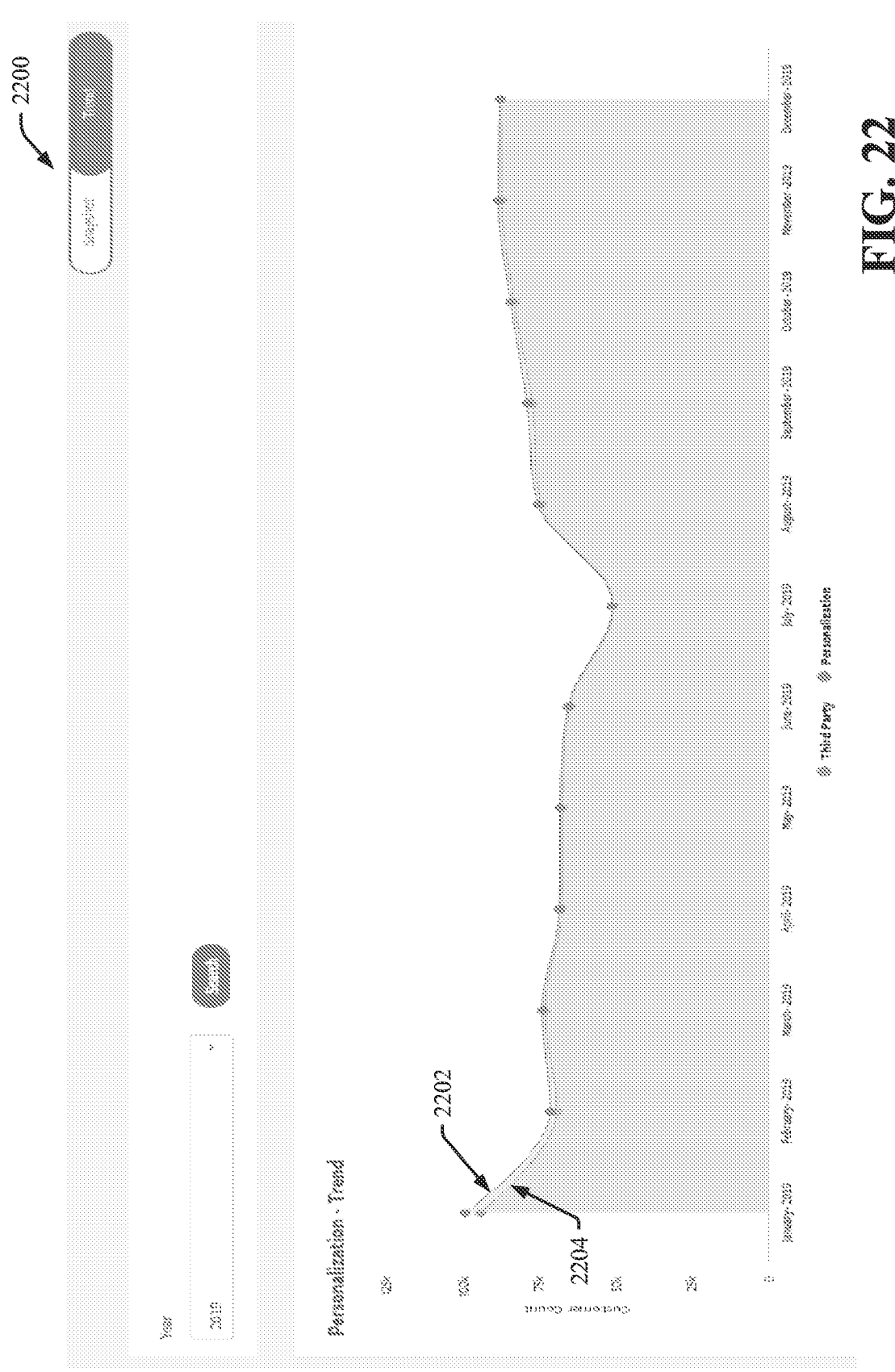
FIG. 22 presents a diagram of an example graph that can provide information regarding a personalization trend within an entity and third party entities during a given time period, in accordance with various aspects and embodiments of the disclosed subject matter.

Turning briefly to FIG. 22 (along with FIGS. 4 and 11), FIG. 22 presents a diagram of an example graph 2200 that can provide information regarding a personalization trend within an entity and third party entities during a given time period, in accordance with various aspects and embodiments of the disclosed subject matter. The governance component 404 can determine and generate the information regarding the personalization trend associated with personalization with regard to users (e.g., customers) within the entity and third party entities (e.g., third party merchants) during the given time period, based at least in part on an analysis of information relating to personalization associated with users (e.g., personalization of experience for users through the tracking, collection, and use of personal data of users) within the entity and third party entities each month, during the given time period.

The graph 2200 can comprise entity-related customer personalization count data 2202 (e.g., in graphical form) that can indicate, for each month during the given time period, the number of customers (e.g., users) who consented to personalization (e.g., by giving one or more consents to allow the entity to track, collect, and use their personal data) with the entity during the month. The graph 2200 also can comprise third party entity-related customer personalization count data 2204 (e.g., in graphical form) that can indicate, for each month during the given time period, the number of customers who consented to personalization with third party entities during the month. As can be observed from the graph 2200, the number of customers who consented to personalization with the entity for each month is substantially consistent with the number of customers who consented to personalization with third party entities for that month. This can indicate that there are no abnormalities, or at least it is likely that there are no abnormalities, with regard to personalization for users within the entity or personalization for users within third party entities. Had there been a significant difference between the entity-related customer personalization count data 2202 and the third party entity-related customer personalization count data 2204 for a particular month, such significant difference may have been an indication that there was an abnormality with regard to personalization for users within the entity and/or with regard to personalization for users within third party entities.

Figure 23:
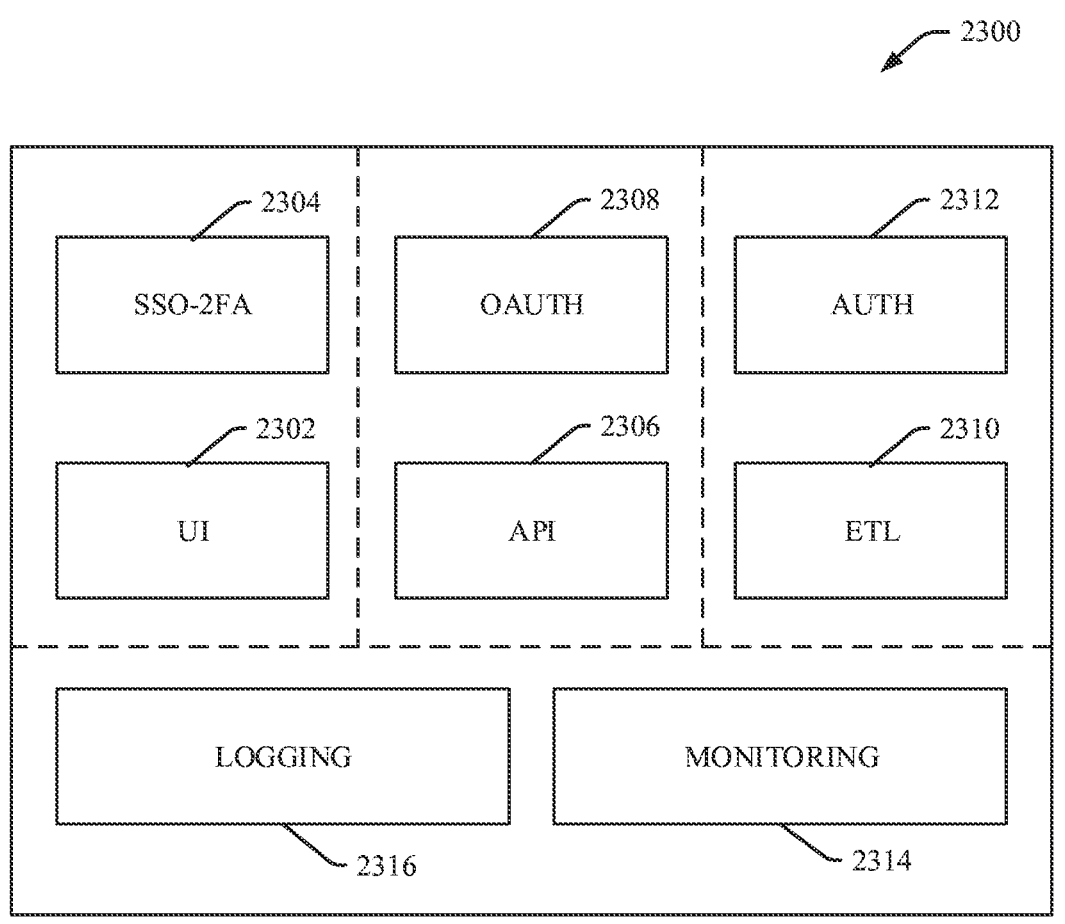
FIG. 23 depicts a block diagram of an example system that can be employed by the DLDP and its constituent or associated platforms to facilitate managing data of users, in accordance with various aspects and embodiments of the disclosed subject matter.

FIG. 23 depicts a block diagram of an example system 2300 that can be employed by the DLDP and its constituent or associated platforms to facilitate managing data of users, in accordance with various aspects and embodiments of the disclosed subject matter. The system 2300 can have a modular design that can enable flexibility to develop and roll out individual components as separate modules. The modular design of system 2300 can enable targeted adaptation of modules for external environments. The decoupled architecture, which can be enabled by employing a modular design, can provide desirable flexibility to develop interoperable modules independently.

The system 2300 can comprise a user interface component 2302 (UI) that can generate and provide various desired user interfaces that can enable users, when authenticated and as permitted, to access, perceive (e.g., view, hear, or otherwise experience), and retrieve data, including their data and information relating to their data, and/or data of other users and information relating to data of other users. The various desired user interfaces can comprise, for example, the various user interfaces described herein.

The system 2300 can employ desirable authentication protocols, technologies, and algorithms to facilitate secure authentication of users attempting to access the DLDP and its constituent or associated platforms, and access data of or relating to users. In accordance with various embodiments, the system 2300 can comprise single sign-on and two-factor authentication component 2304 (SSO-2FA). Single sign on can allow users to authenticate with and gain access to the DLDP, its constituent or associated platforms, and/or associated applications through a single log in by presenting appropriate (e.g., valid) authentication credentials (e.g., username, password, passcode, personal identification number (PIN), or biometric identification information, etc.). Two-factor authentication (or multi-factor authentication) can allow users to authenticate with and gain access to the DLDP, its constituent or associated platforms, and/or associated applications through a two-factor (or multi-factor) authentication process by presenting two (or more) types of appropriate authentication credentials (e.g., username/password, passcode, personal identification number (PIN), biometric identification information, authentication token or key, authentication credentials via a device, such as a smart phone, or user providing answers to personal questions, etc.).

The system 2300 can employ an API component 2306 (API) that can comprise various APIs that can be utilized to enable desirable interfacing and communication of information between various components (e.g., secure data store, UI component, data management component, governance platform, rights management platform, or notification component, etc.) of or associated with the DLDP, in accordance with various protocols and data formats supported by the API component 2306, such as described herein.

The system 2300 also can employ an open authorization component 2308 (OAUTH) that can provide applications, websites, and services, when authorized and/or authenticated, secure designated access to data of users. The OAUTH 2308 can be or comprise an open-standard authorization protocol or framework that can enable an application, website, or service, when authorized by a user, to access data of the user via the DLDP, its constituent or associated platforms (e.g., governance platform, or rights management platform, etc.), or associated data stores, without the user having to provide the application, website, or service the user's authentication credentials. In certain embodiments, the application, website, or service can utilize an authorization token to prove its identity and prove that it is authorized to access the data of the user via the DLDP, its constituent or associated platforms, or associated data stores.

The system 2300 can comprise an ETL component 2310 (ETL) that can employ an ETL process (e.g., ETL batch process) and/or can comprise an ETL server that can utilize an ETL process, wherein the ETL process and/or ETL server can facilitate reading and transferring scan results from a scanner component of or associated with the DLDP to the batch server component. The ETL process of the ETL component 2310 can integrate or combine data from multiple data sources into a single, consistent set of data that can be stored in a desired data store or communicated to a desired component of or associated with the DLDP. During the extraction operation of the ETL process, data can be copied and/or communicated from the source locations of the data to a staging area, wherein the data can be structured data or unstructured data (e.g., information contained in or associated with emails; image data (e.g., visual images, such as digital images, photographs, video images, or other type of image data); or other type of unstructured data), and wherein the source locations (e.g., server, data store, system, file, email, or web page, etc.) can be structured or unstructured. In the staging area, the extracted data (e.g., raw data) can be transformed to convert or format the data to a form that can be useful or suitable for analysis (e.g., by the DLDP, governance platform, or rights management platform, etc.) or to conform to a schema of a data store (e.g., relational database stored in a data store) in which the transformed data can be stored. The transformation of the data can comprise, for example, formatting, filtering, validating, authenticating, translating, summarizing, performing calculations on, encrypting or performing a data security or cryptographic process on, and/or normalizing the data. During the load operation, the transformed data can be transferred from the stage area to the target destination, which can be a data store or a component of or associated with the DLDP.

The system 2300 also can include an authentication component 2312 (AUTH) that can employ desired authentication protocols, techniques, keys, or algorithms, for example, in connection with the ETL component 2310. The authentication component 2312 can be employed to authenticate data during the transformation operation and/or authenticate with a component or interface (e.g., API) during the extraction operation to extract data via a component or interface.

The system 2300 also can include a monitoring component 2314 that can monitor activity, data traffic, operations, etc., of or associated with the DLDP, its constituent or associated platforms, data stores associated with the DLDP, or other components (e.g., scanner component, docker component, bug tracking component, or artificial intelligence component, etc.), devices (e.g., communication device), or systems associated with the DLDP. For instance, the monitoring component 2314 can monitor operations, activity, and data traffic associated with the UI component 2302, API component 2306, and ETL component 2310, as well as other desired components.

The system 2300 further can comprise a logging component 2316 that can log information relating to events of or associated with the DLDP, its constituent or associated platforms, data stores associated with the DLDP, or other components, devices, or systems associated with the DLDP. The logging component 2316 can log the time of an event, operations that were performed during or in connection with an event, errors associated with an event, components or devices associated with an event, or other desired information relating to an event. The logging component 2316 can store the information relating to events in log files, which can be stored in a desired data store.

The code for UI component 2302, API component 2306, and the common data privacy model employed by the system 2300 (e.g., employed by the DLDP and its constituent or associated platforms) can be independently designed to enable the relevant modules to be changed, modified, or replaced to enhance the performance, operation, and functionality of the modules employed in the system 2300 and, accordingly, enhance the performance, operation, and functionality of the system 2300 overall.

Figure 24:
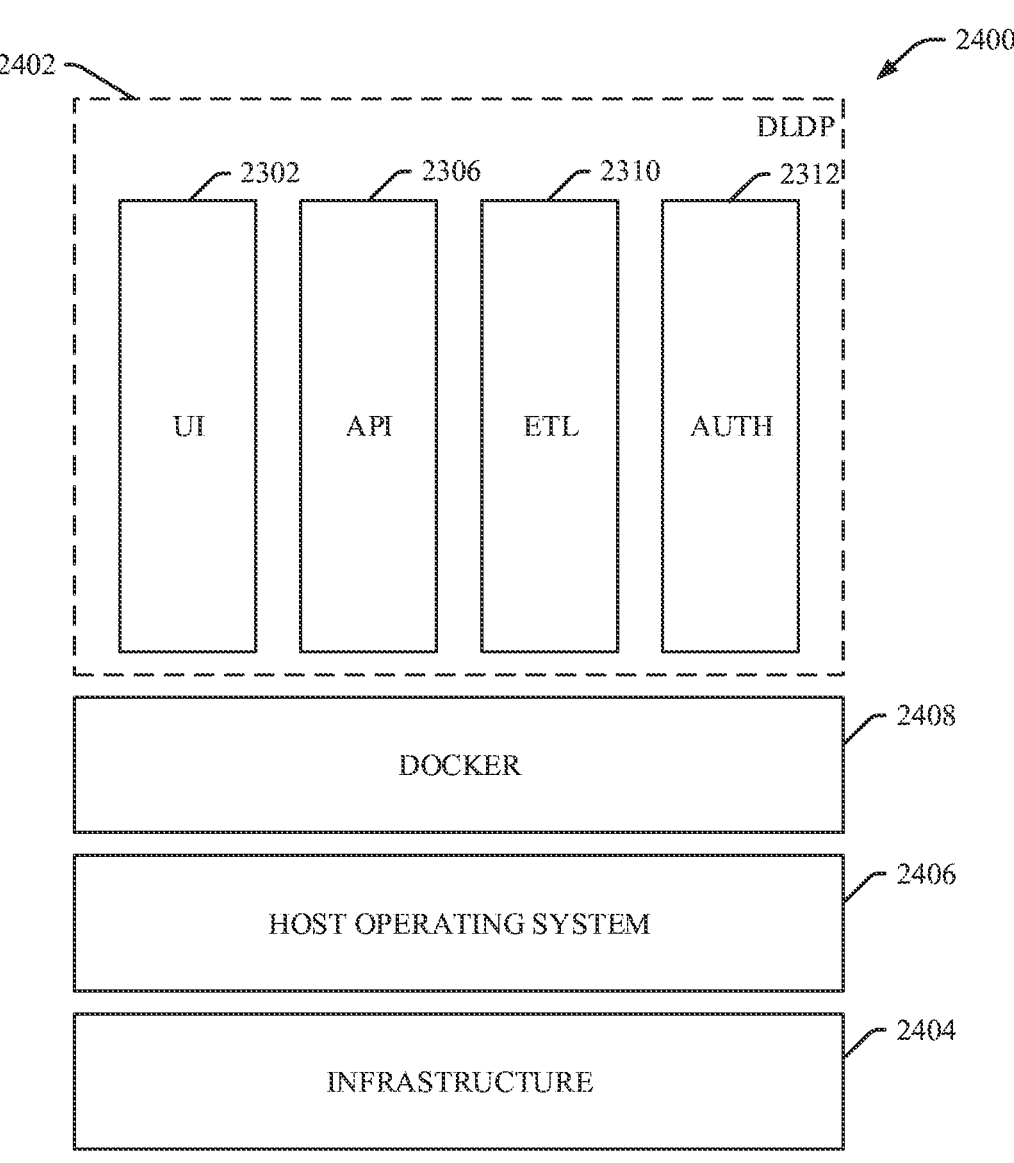
FIG. 24 depicts a block diagram of an example system that can comprise a DLDP that can utilize containerized application technology, in accordance with various aspects and embodiments of the disclosed subject matter.

FIG. 24 depicts a block diagram of an example system 2400 that can comprise a DLDP that can utilize containerized application technology, in accordance with various aspects and embodiments of the disclosed subject matter. The example system 2400 can comprise a DLDP 2402 that can perform data discovery and data tracking in a secure and efficient manner to facilitate desirable data protection of the data of users and information relating thereto, in accordance with the defined data management criteria, as more fully described herein. Every module of the application employed by the DLDP 2402 can be deployed as a container. Based on the infrastructure capacity of or associated with the system 2400, including the DLDP 2402, the deployment of the modules of the application as containers can be desirably bundled to enable more efficient use of the resources of the system 2400. The DLDP 2402 or another component associated therewith can generate and maintain a configuration file that can comprise information relating to, and that can define, application dependencies and deployment (e.g., deployment of modules of the application as containers), and can utilize (e.g., execute) the configuration file for automated deployment of the modules of the application as containers.

The DLDP 2402 can comprise the UI component 2302, API component 2306, ETL component 2310, and authentication component 2312, and/or other components, and each component can comprise respective functionality, such as more fully described herein. The system 2400 can include infrastructure 2404 that can be utilized to implement and provide resources to the DLDP 2402 and other components, devices, or sub-systems of the system 2400 to enable the operation of the DLDP 2402 and the other components, devices, or sub-systems of the system 2400. In some embodiments, the infrastructure 2404 can comprise one or more computer systems, servers, interfaces, and/or peripheral components, etc., that can provide the desired resources to the DLDP 2402 and other components, devices, or sub-systems of the system 2400, wherein the one or more computer systems, servers, interfaces, and/or peripheral components, etc., can be as more fully described herein. In some embodiments, all or part of the system 2400, including all or part of the infrastructure 2404, can be located in a cloud computing environment.

The system 2400 also can comprise a host operating system 2406 that can be associated with and can operate on the infrastructure 2404. The host operating system 2406 can comprise software components (e.g., software code) that can interact with on operate on the infrastructure 2404 (e.g., computer hardware of the infrastructure 2404) to facilitate performing various computing operations. The host operating system 2406 can be the primary operating system that can be installed on a hard drive of the computer (e.g., of the infrastructure 2404). In some embodiments, the system 2400 also can comprise one or more virtual operating systems (not shown) that can operate within or in association with the host operating system 2406. The host operating system 2406 can utilize container-based virtualization, wherein modules of the application(s) can be deployed as containers, such as described herein. Containers can allow applications on a server to share the same operating system kernel, while also still being able to provide desirable hardware isolation between the applications.

The system 2400 further can comprise a docker component 2408 that can be associated with and can operate on the host operating system 2406. The docker component 2408 can comprise all or a desired portion of the docker functionality of the docker host, docker image, docker registry, docker pull, docker build, docker run, and/or docker file, etc., to facilitate generating and implementing desired containers (e.g., docker containers) for applications, such as more fully described herein. In accordance with various embodiments, one or more components of the DLDP 2402, and/or its constituent or associated platforms (e.g., governance platform, or rights management platform, etc.), including, for example, all or part of the UI component 2302, API component 2306, ETL component 2310, and/or authentication component 2312 can be implemented as individual or independent containers.

Figure 25:
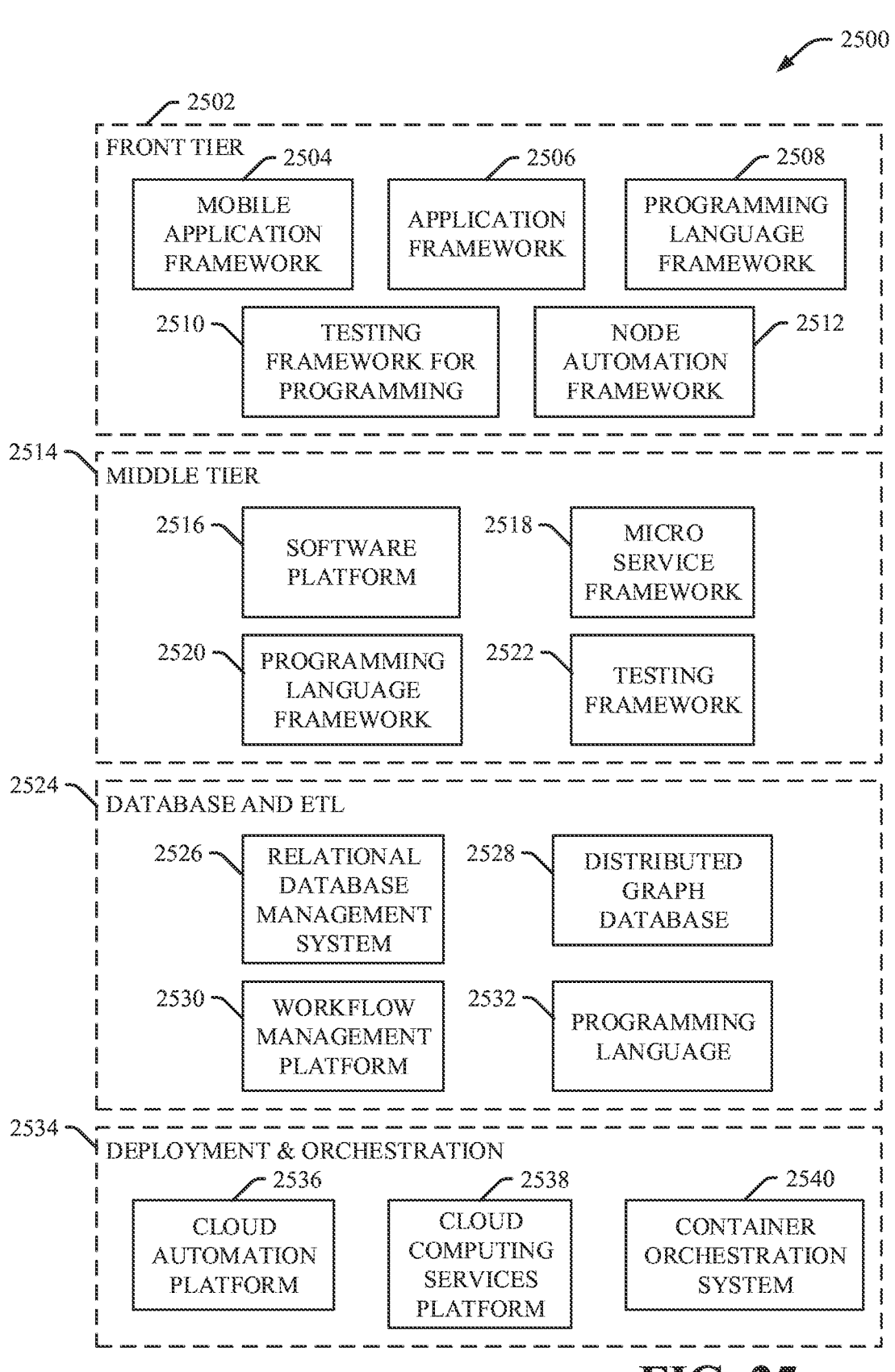
FIG. 25 illustrates a block diagram of an example open source stack that can be employed by the DLDP and its constituent or associated platforms, in accordance with various aspects and embodiments of the disclosed subject matter.

FIG. 25 illustrates a block diagram of an example open source stack 2500 that can be employed by the DLDP and its constituent or associated platforms, in accordance with various aspects and embodiments of the disclosed subject matter. The DLDP and its constituent or associated platforms can be built or formed on an approved and supported open source stack 2500 to take advantage of the cutting edge developments in software and infrastructure.

The open source stack can comprise a front tier 2502 that can include a mobile application framework 2504, an application framework 2506, a programming language framework 2508, a testing framework for programming 2510, and a node automation framework 2512. The mobile application framework 2504 can be utilized to develop applications (e.g., mobile applications) for mobile devices and mobile device operating system platforms (e.g., iOS, Android, Web, or Universal Windows Platform (UWP)). In some embodiments, the mobile application framework 2504 can be an open-source mobile application framework. The application framework 2506 can comprise a web application framework that can be utilized to develop web applications for communication devices (e.g., computers, servers, Internet of Things (IoT) devices, or other devices). The programming language framework 2508 can employ a programming language, a programming language engine, APIs, programming language libraries, and/or other components that can be utilized to facilitate developing and running applications, such as web-based applications. The testing framework for programming 2510 can facilitate ensuring correctness or integrity of a programming codebase. The testing framework for programming 2510 can be utilized to generate tests that can be utilized to test the correctness or integrity of a programming codebase, wherein an API can be utilized to facilitate developing the tests. The node automation framework 2512 can be an open-source node.js automation framework comprising tools, including browser testing tools, that can be utilized to add automation to node.js web projects and applications, for example, to facilitate testing of such web projects and applications. In accordance with various embodiments, the front tier 2502 can employ, for example, React Native, Paypal Kraken, JavaScript (JS), Jest, Nemo.js, and/or other desired frameworks. For instance, the user interface component can utilize Kraken or another desired type of application framework to facilitate generating and providing (e.g., presenting) desired user interfaces.

The open source stack 2500 can include a middle tier 2514 that can comprise a software platform 2516, a micro service framework 2518, a programming language framework 2520, and a testing framework 2522. The software platform 2516 can be utilized to develop applications and deploy applications in a computing environment. The software platform 2516 can be utilized in a variety of desired computing platforms. The micro service framework 2518 can be utilized to create applications and associated micro services. The micro service framework 2518 can be an open source Java-based framework that can be used to develop the micro services. The programming language framework 2520 can comprise an open-source data query and manipulation language that can be used for APIs. The programming language framework 2520 can be utilized to facilitate efficiently processing (e.g., responding to) queries and accessing data and/or the related information from a desired data source (e.g., data store). The testing framework 2522 can be an open-source testing framework that can be utilized for software platforms, such as, for example, Java. In accordance with various embodiments, the middle tier 2514 can employ, for example, Java, Springboot, GraphQL, Mockito, and/or other desired platforms or frameworks. For instance, various APIs and services described herein can utilize open-source Java and Springboot.

The open source stack 2500 also can include a database and ETL 2524, which can comprise a relational database management system 2526, a distributed graph database 2528, a workflow management platform 2530, and a programming language 2532. The relational database management system 2526 can be utilized for relational databases, such as relational databases that can be stored in a data store of an entity or in the secure data store of the DLDP. In some embodiments, the relational database management system 2526 can be an open-source relational database management system. The distributed graph database 2528 can be an open-source, distributed, and/or scalable graph database that can be utilized for storing and querying graphs, including relatively large graphs comprises a large number (e.g., thousands, millions, or billions) of vertices and edges distributed across a multi-machine cluster. The workflow management platform 2530 can be an open-source workflow management platform that can programmatically author, schedule, and monitor workflows and tasks, such as workflows or tasks of or associated with the DLDP or its constituent or associated platforms. The programming language 2532 can be a desired high level and general purpose programming language. The programming language 2532 can be a multi-paradigm programming language that can support object-oriented programming, structured programming, functional programming, and/or aspect-oriented programming. In accordance with various embodiments, the database and ETL 2524 can employ, for example, Percona server, JanusGraph, Apache Airflow, Python, and/or other desired database and ETL functions, systems, and databases. For instance, the back end of the DLDP can employ open-source Percona for MySQL.

The open source stack 2500 can further comprise deployment and orchestration 2534 that can include cloud automation platform 2536, a cloud computing services platform 2538, and a container orchestration system 2540. The cloud automation platform 2536 can be used for process automation, such as automation of business processes, and can comprise a desirable process management environment, which can include a design-time environment and a runtime environment, wherein the process management environment can include development, testing, production, and management of processes that can be performed in the cloud. The cloud computing services platform 2538 can provide a suite of cloud computing services, which can be modular cloud services that can include, for example, various services relating to computing, data storage, data analytics, and machine learning, and also can provide various management tools. The container orchestration system 2540 can be an open-source container orchestration system that can automate application deployment, scaling, and management (e.g., management of containerized workloads and services). For instance, the container orchestration system 2540 can facilitate automating deployment, scaling, and operations of application containers. The container orchestration system 2540 can comprise a variety of services, support, and tools that can facilitate such automating of application deployment, scaling, and management. In accordance with various embodiments, the deployment and orchestration 2534 can comprise and utilize Process Cloud Service (PCS), Google Cloud, Kubernetes, or other desired platforms and systems for deployment and orchestration associated with the DLDP and its constituent or associated platforms (e.g., governance platform, or rights management platform, etc.).

The system 2600 can provide a variety of benefits, such as, for example, desirable flexibility and agility in forming the DLDP and its constituent or associated platforms, cost effectiveness, utilization of productive and cutting edge industry technologies, and desirable externalization.

Figure 26:
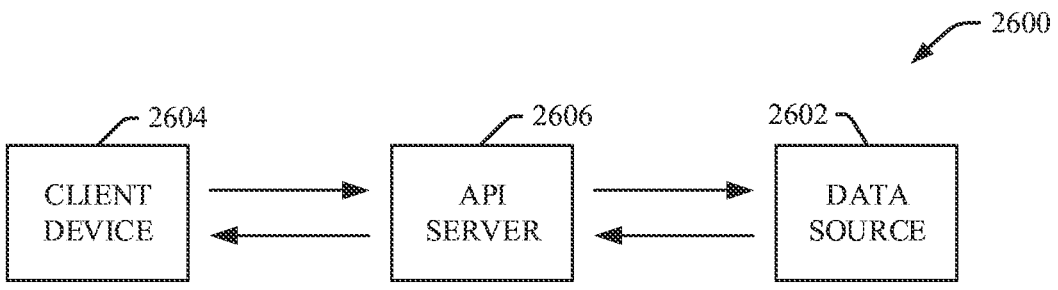
FIG. 26 illustrates a block diagram of an example system that can employ an application programming interface (API) and server to facilitate enabling client applications and devices to query and access data, to facilitate desirable processing and communication of data of users in connection with the DLDP, in accordance with various aspects and embodiments of the disclosed subject matter.

FIG. 26 illustrates a block diagram of an example system 2600 that can employ an API and server to facilitate enabling client applications and devices to query and access data, to facilitate desirable processing and communication of data of users in connection with the DLDP, in accordance with various aspects and embodiments of the disclosed subject matter. The system 2600 can comprise a data source 2602, which can be or can comprise one or more data stores associated with an entity, such as described herein. The data source 2602 can store data of users and information relating to the data of users (e.g., information derived from the processing of data of users or otherwise based at least in part on the data of users). The system 2600 also can comprise a client device 2604 that can comprise and/or utilize a client application to access data of users and/or information relating to the data of users from the data source 2602, for example, as the client device 2604 or associated user is permitted (e.g., authorized) to access such data and/or related information.

To enable desirable access to the data and/or related information, the system 2600 further can comprise an API server component 2606 that can be associated with (e.g., communicatively connected to) the data source 2602 and the client device 2604. The API server component 2606 can be part of the DLDP (not shown in FIG. 26; and as more fully described herein). In some embodiments, the API server component 2606 can be a GraphQL server that can utilize a GraphQL language, which can be an open-source data query and manipulation language that can be used for APIs of the system 2600, and can be utilized to facilitate processing (e.g., responding to) queries and accessing data and/or the related information from the data source 2602. In other embodiments, another desired data query and data manipulation language and protocol can be utilized for the APIs of the system 2600. The user interfaces and APIs of the various modules of the DLDP and its constituent or associated platforms (e.g., governance component, or rights management component, etc.) can be integrated using GraphQL or other desired data query and data manipulation language and protocol. Employing GraphQL or the other desired data query and data manipulation language and protocol can provide a desirable (e.g., robust or powerful) capability to expose and manipulate the underlying data from the data source 2602 to desirably satisfy (e.g., to desirably suit or meet) the data, business, or personal demands (e.g., wants, desires, or needs) of users.

In response to a data request or query for data of users and/or related information received from the client device 2604, the API server component 2606 can desirably process the data request or query to efficiently retrieve desired data of users and/or related information that can be responsive to the data request or query from the data source 2602 (which can comprise one or more data sources in one or more locations) without retrieving or providing extraneous or undesired data (or at least substantially minimizing or mitigating the retrieving and communicating of extraneous or undesired data) in response to the data request or query. The API server component 2606 can provide the desired data and/or related information responsive to the data request or query to the client device 2604.

Employing the API server component 2606 can provide a number of benefits. For instance, there can be increased API reusability. There can be no, or at least minimal, over-fetching and under-fetching of data and/or related information from the data source 2602. The API server component 2606, by employing GraphQL or other language and protocol, can allow users to select and choose the fields in the response object with regard to a data request or query. Since there can be no, or at least minimal, over-fetching and under-fetching of data and/or related information from the data source 2602, network data traffic can be desirably reduced. Another benefit can be that the API server component 2606, by employing GraphQL or other language and protocol, can enable validation and type-checking of fields to be inbuilt. Also, there can be desirable developer productivity through enhanced (e.g., improved, easier, or more efficient) API exploration. Tools, such as GraphQL or the other desired language and protocol that can be employed by the API server component 2606, can enable developers to desirably (e.g., quickly and efficiently) understand and be effective in using the APIs of the system 2600.

Figure 27:
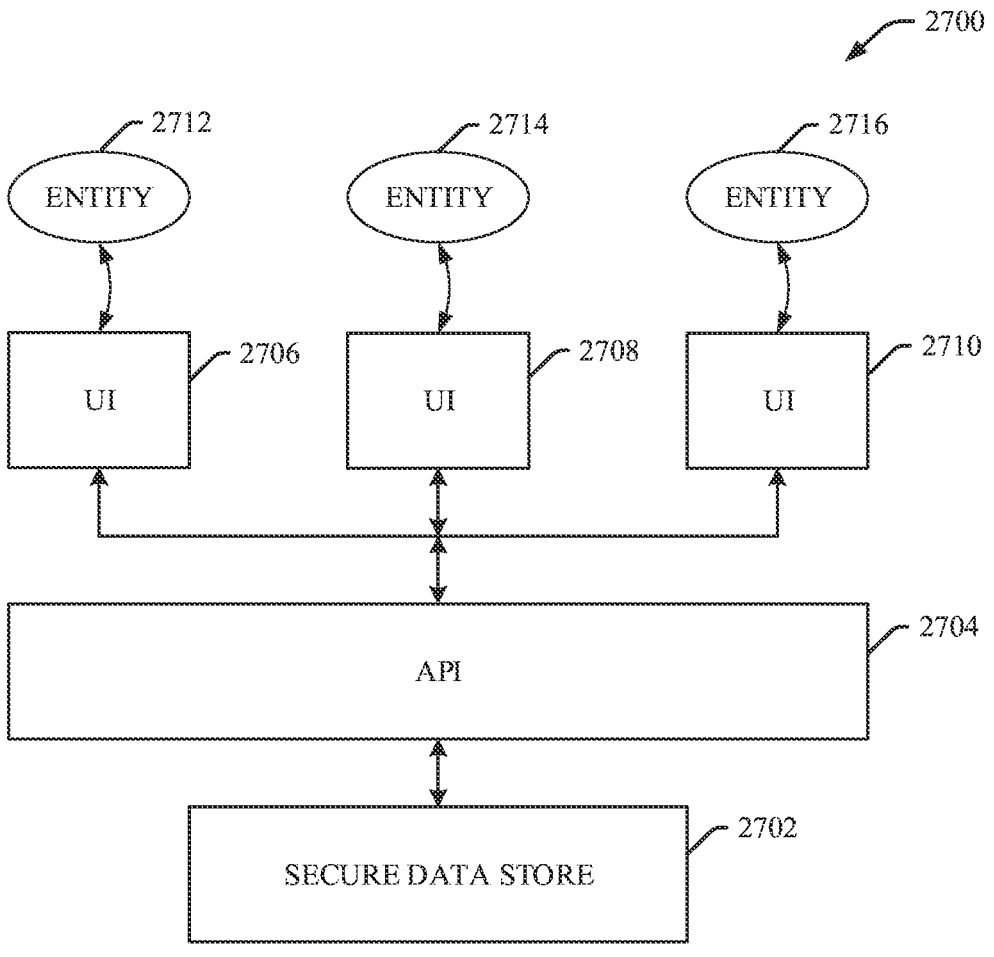
FIG. 27 depicts a block diagram of an example system that can support multiple tenant entities to facilitate desirably managing data of users and information relating thereto with regard to multiple tenant entities associated with the DLDP, in accordance with various aspects and embodiments of the disclosed subject matter.

FIG. 27 depicts a block diagram of an example system 2700 that can support multiple tenant entities to facilitate desirably managing data of users and information relating thereto with regard to multiple tenant entities associated with the DLDP, in accordance with various aspects and embodiments of the disclosed subject matter. The system 2700 can comprise a multi-tenant data store 2702 that can store data of users and/or information relating to the data of users, which can be collected or derived in connection with multiple tenant entities (e.g., multiple organizations, business, or merchants), wherein respective users can be associated with respective entities. The multi-tenant data store 2702 can be associated with (e.g., communicatively connected to) or part of the DLDP, as more fully described herein. The multi-tenant data store 2702 can be designed or structured to support a centralized data aggregation model to facilitate supporting multiple tenant entities.

The system 2700 also can comprise an API component 2704 that can be associated with (e.g., communicatively connected to) the multi-tenant data store 2702. The API component 2704 can comprise various APIs that can be utilized to enable desirable interfacing and communication of information between various components (e.g., secure data store, UI component, data management component, governance platform, rights management platform, or notification component, etc.) of or associated with the DLDP (not shown in FIG. 27), in accordance with various protocols and data formats supported by the API component 2704, such as described herein. The API component 2704 can employ GraphQL or other desired language and protocol to facilitate desirably (e.g., efficiently) retrieving data of users and/or information relating thereto from the multi-tenant data store 2702 in response to data requests or queries from clients, such as more fully described herein.

The system 2700 can comprise multiple user interfaces, including user interface component 2706, user interface component 2708, and user interface component 2710, that can be associated with (e.g., communicatively connected to) the API component 2704 and can be respectively associated with tenant entities, including entity 2712, entity 2714, and entity 2716. The user interface components (e.g., 2706, 2708, and 2710, etc.) can generate and provide various desired user interfaces that can enable the entities (e.g., 2712, 2714, and 2716, etc.), when authenticated and as permitted, to access, perceive (e.g., view, hear, or otherwise experience), and retrieve data, including respective data of users that are associated with the respective entities (e.g., 2712, 2714, and 2716, etc.) and/or respective information relating to the respective data from the multi-tenant data store 2702 via the API component 2704.

At various times, the respective entities (e.g., 2712, 2714, and 2716, etc.) can utilize the respective user interface components (e.g., 2706, 2708, and 2710, etc.) to communicate respective data requests or queries to the API component 2704 in order to request respective data of users or respective information relating thereto. The API component 2704 can process the respective data requests or queries and, in response to the respective data requests or queries, can access the multi-tenant data store 2702 to retrieve the respective data of users or respective information relating thereto from the multi-tenant data store 2702. At the various times, the API component 2704 can communicate the respective data of users or respective information relating thereto, which can be respectively responsive to the respective data requests or queries, to the respective user interface components (e.g., 2706, 2708, and 2710, etc.) of the respective entities (e.g., 2712, 2714, and 2716, etc.).

The system 2700, by being able to support centralized data aggregation of multiple tenant entities, efficient processing of data requests or queries, and efficient processing of data of users and information relating thereto, can provide a number of benefits. For instance, the system 2700 can provide a desirably streamlined deployment process, can enable desirable (e.g., easier or more efficient) application maintenance, can facilitate desirable onboarding of new tenant entities, can desirably reduce data duplication, can enable desirable patching and upgrades, and can provide a single source (e.g., data source) of desired data.

In view of the example systems and/or devices described herein, example methods that can be implemented in accordance with the disclosed subject matter can be further appreciated with reference to flowcharts in FIGS. 28-34. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 28 depicts a flow diagram of an example, non-limiting method 2800 that can desirably (e.g., efficiently or optimally) manage data discovery of data stored in data stores associated with one or more entities to facilitate determining compliance of the data stores and entities with obligations arising out laws and/or agreements relating to data protection, in accordance with various aspects and embodiments described herein. The method 2800 can be employed by, for example, a system comprising the DLDP, its constituent or associated platforms (e.g., governance platform), a processor component (e.g., of or associated with the DLDP), and/or a data store (e.g., of or associated with the DLDP).

At 2802, discovery of the presence of items of data of users stored in a set of data stores can be managed, in accordance with the defined data management criteria. At 2804, the items of data can be discovered in the set of data stores based at least in part on scanning of the set of data stores, in accordance with the management of the discovery, wherein information relating to the items of data can be generated based at least in part on the scanning. The data management component of or associated with the DLDP can manage (e.g., control) the discovery (e.g., detection) of the presence of items of data of users stored in the set of data stores associated with an entity, in accordance with the defined data management criteria. A scanner component of or associated with the DLDP can scan the set of data stores and can detect the items of data stored in the set of data stores, based at least in part on the scanning. The scanner component, a machine learning component of or associated with the DLDP, or the data management component can generate the information relating to the items of data based at least in part on the results (e.g., scanning results) of the scanning of the set of data stores.

At 2806, the information relating to the items of data and/or a portion of the items of data can be stored in a secure data store of the DLDP. The data management component can store the information relating to the items of data and/or the portion of the items of data in the secure data store of the DLDP.

At 2808, a determination can be made regarding compliance of the set of data stores with a set of obligations relating to data protection based at least in part on the results of analyzing the information relating to the items of data and/or the portion of the items of data. The data management component can determine the compliance (e.g., the extent or level of compliance) of the set of data stores with the set of obligations relating to data protection based at least in part on the results of analyzing the information relating to the items of data and/or the portion of the items of data.

In that regard, the data management component (e.g., the governance component of the data management component) can analyze laws, regulations, and/or agreements determined to be applicable to the set of data stores, the one or more entities, and/or the users. For instance, the data management component can determine or identify a first subset of laws, regulations, and/or agreements relating to data protection that can be applicable to the set of data stores. Based at least in part on the results of analyzing the first subset of laws, regulations, and/or agreements, the data management component can determine the set of obligations (e.g., legal and/or contractual requirements, responsibilities, duties, constraints, or provisions). The data management component can determine a set of rules that can correspond to the set of obligations and can be used to facilitate enforcing the set of obligations against the set of data stores, the DLDP, and/or the entity, and determining the extent or level of compliance of the set of data stores, the DLDP, and/or the entity with the set of obligations. The data management component can determine the compliance of the set of data stores, the DLDP, and/or the entity with the set of obligations based at least in part on the results of analyzing the information relating to the items of data, the portion of the items of data, and/or the set of rules.

FIG. 29 illustrates a flow diagram of an example, non-limiting method 2900 that can desirably (e.g., efficiently or optimally) determine a set of rights of a user with regard to data of the user that is stored in a set of data stores associated with an entity, in accordance with various aspects and embodiments described herein. The method 2900 can be employed by, for example, a system comprising the DLDP, its constituent or associated platforms (e.g., rights management platform, or governance platform, etc.), a processor component (e.g., of or associated with the DLDP), and/or a data store (e.g., of or associated with the DLDP).

At 2902, items of data of users can be detected in a set of data stores associated with an entity based at least in part on the results of scanning the set of data stores. At 2904, information relating to the items of data can be determined based at least in part on the results of the scanning. A scanner component of or associated with the DLDP can scan the set of data stores. Based at least in part on the results of scanning the set of data stores, the scanner component can detect the items of data of the users that are stored in the set of data stores. The scanner component, machine learning component, or data management component can determine and generate the information relating to the items of data based at least in part on the results of the scanning and analysis of the scanning results.

At 2906, the information relating to the items of data and/or a portion of the items of data can be stored in a secure data store of the DLDP. The data management component can store the information relating to the items of data and/or the portion of the items of data in the secure data store of the DLDP.

At 2908, a set of rights of a user, with regard to a subset of the information and a subset of the items of data associated with the user, can be determined based at least in part on a set of rules, wherein the set of rules can be determined based at least in part on a set obligations associated with the set of data stores and related to data protection. The rights management platform can determine the set of rights of the user (and the scope of the set of rights) with regard to the subset of the information and the subset of the items of data associated with the user, based at least in part on the set of rules. The governance platform can determine the set of obligations based at least in part on the results of analyzing a first subset of laws, regulations, and/or agreements determined to be applicable to the set of data stores and associated entity, at least with regard to the user. The laws and regulations of the first subset can be associated with at least a first jurisdiction of the set of data stores and/or the entity, and/or can be associated with the user. The agreement(s) in the first subset can be associated with the set of data stores, entity, and/or user.

The set of rights of the user can relate to, for example, one or more of the right to information, the right of access, the right of rectification, the right of erasure, the right to restriction of processing, the right to data portability, the right to object, the right to avoid automated decision making, and/or other rights, with regard to the subset of data of the user and/or the subset of the information relating thereto, as such rights are more fully described herein. The DLDP, rights management platform, and/or governance platform can facilitate enabling the user to exercise the set of rights with regard to the subset of data of the user and/or the subset of the information relating thereto, as more fully described herein.

FIG. 30 illustrates a flow diagram of an example, non-limiting method 3000 that can desirably (e.g., efficiently or optimally) determine a set of obligations and corresponding set of rules relating to data protection, and determine compliance with the set of obligations by a set of data stores and associated entity, in accordance with various aspects and embodiments described herein. The method 3000 can be employed by, for example, a system comprising the DLDP, its constituent or associated platforms (e.g., governance platform), a processor component (e.g., of or associated with the DLDP), and/or a data store (e.g., of or associated with the DLDP).

At 3002, items of data of users can be detected in a set of data stores associated with an entity based at least in part on scanning of the set of data stores. At 3004, information relating to the items of data can be generated based at least in part on the results of the scanning. The scanner component can scan the set of data stores associated with an entity. Based at least in part on the results of scanning the set of data stores, the scanner component can detect the items of data of the users that are stored in the set of data stores. The scanner component, machine learning component, or data management component can determine and generate the information relating to the items of data based at least in part on the results of the scanning and analysis of the scanning results.

At 3006, the items of data, the information relating thereto, and a set of rules can be analyzed, wherein the set of rules can relate to a set of obligations regarding data protection, and wherein the set of obligations can be determined to be applicable to the set of data stores. The governance component can determine the set of obligations based at least in part on the results of analyzing a subset of laws, regulations, and/or agreements determined to be applicable to the set of data stores and the entity. The governance component also can determine the set of rules based at least in part on the set of obligations.

For instance, the governance component can employ the rules engine, which can analyze the laws and regulations relating to data protection that are determined to be application to the jurisdiction (e.g., legal and/or geographical jurisdiction) associated with the set of data stores (e.g., the jurisdiction in which the set of data stores resides or with regard to which the set of data stores and/or items of data of users stored therein are subject or governed). The rules engine also can analyze an agreement (e.g., SLA) that is determined to be applicable to the set of data stores, the entity, and/or the users. Based at least in part on the results of analyzing the subset of laws, regulations, and/or agreements, the rules engine can determine the set of obligations, comprising legal obligations and/or contractual obligations, that stem from the subset of laws, regulations, and/or agreements. The rules engine can determine and generate the set of rules based at least in part on the set of obligations, as more fully described herein.

At 3008, based at least in part on the results of the analysis, a determination can be made regarding whether the set of data stores is in compliance with the set of obligations. Based at least in part on the analysis results, the governance component can determine whether the set of data stores and associated entity are in compliance with the set of obligations. For instance, the governance component can perform a compliance assessment on the set of data stores to determine the extent or level of compliance of the set of data stores with the set of rules and correspondingly the set of obligations. Based at least in part on the results of the compliance assessment, the governance component can determine the extent or level of compliance of the set of data stores, and associated entity, with the set of rules and corresponding set of obligations, in accordance with the defined data management criteria. The compliance assessment also can indicate an extent or level of compliance of the DLDP and/or its constituent or associated platforms with the set of rules and corresponding set of obligations as well. Depending in part on the results of the compliance assessment, the governance component or DLDP, for example can present (e.g., report or display) information relating to the compliance assessment (e.g., via a user interface component) and indicating the extent or level of compliance of the set of data stores and associated entity (and/or the DLDP and/or its constituent or associated platforms), or can generate a notification message or exception ticket to indicate an anomaly that can indicate that there is a non-compliance or potential non-compliance issue, or another anomaly that is to be evaluated and/or resolved (e.g., checked out and/or remediated by an appropriate representative of or associated with the entity).

FIG. 31 illustrates a flow diagram of another example, non-limiting method 3100 that can desirably identify data, data types of data, and languages of data stored in data stores associated with entities, in accordance with various aspects and embodiments described herein. The method 3100 can be employed by, for example, a system comprising the DLDP, its constituent or associated platforms (e.g., governance platform, rights management platform, etc.), a processor component (e.g., of or associated with the DLDP), and/or a data store (e.g., of or associated with the DLDP).

At 3102, first data stored in a first data store associated with a first tenant entity can be scanned, wherein the first data can be associated with a first user. At 3104, a first language and a first data type of the first data can be identified based at least in part on the scanning of the first data and a machine learning function. The scanner component can scan the first data store associated with the first tenant entity. Based at least in part on the results of scanning the first data store, the scanner component can detect the first data of the first user that is stored in the first data store. The scanner component or data management component, employing the machine learning component, can identify or determine the first language and the first data type of the first data, based at least in part on the scanning results and the machine learning function of the machine learning component.

At 3106, second data stored in a second data store associated with a second tenant entity can be scanned, wherein the second data can be associated with a second user. At 3108, a second language and a second data type of the second data can be identified based at least in part on the scanning of the second data and the machine learning function. The scanner component can scan the second data store associated with the second tenant entity. Based at least in part on the results of scanning the second data store, the scanner component can detect the second data of the second user that is stored in the second data store. The scanner component or data management component, employing the machine learning component, can identify or determine the second language and the second data type of the second data, based at least in part on the scanning results and the machine learning function of the machine learning component.

FIG. 32 illustrates a flow diagram of another example, non-limiting method 3200 that can desirably (e.g., efficiently or optimally) determine respective risk scores associated with KRI metrics, privacy principles, and/or data management platforms, in accordance with various aspects and embodiments described herein. The method 3200 can be employed by, for example, a system comprising the DLDP, its constituent or associated platforms (e.g., governance platform), a processor component (e.g., of or associated with the DLDP), and/or a data store (e.g., of or associated with the DLDP).

At 3202, KRI metrics can be analyzed in relation to items of data of users stored in a set of data stores associated with an entity and a level of compliance with a set of rules and corresponding set of obligations. The governance component (e.g., employing a risk assessment component) can analyze the KRI metrics in relation to items of data stored in the set of data stores associated with the entity and the level of compliance with the set of rules and corresponding set of obligations by the set of data stores, the entity, and/or the DLDP or its constituent or associated platforms. The governance component (e.g., employing a rules engine) can determine the set of obligations (e.g., legal and/or contractual obligations) based at least in part on the results of analyzing information relating to a law(s) and/or an agreement(s) that is applicable to the entity and/or the set of data stores. The governance component can determine the set of rules based at least in part on the set of obligations. Respective KRI metrics can relate to respective privacy principles, one or more respective source or data management platforms (e.g., DLDP, governance platform, rights management platform, DSR platform, consent management platform, third party management platform, and/or custom sources platform, etc.), and/or the set of data stores associated with the entity.

At 3204, respective risk scores can be determined with regard to the respective KRI metrics based at least in part on the results of the analysis at reference numeral 3202. The governance component can determine the respective risk scores associated with respective KRI metrics based at least in part on the results of such analysis. For each KRI metric, based at least in part on the analysis, the governance component can determine the amount of impact that one or more occurrences of one or more anomalies relating to the one or more obligations of the set of obligations can have, with respect to the KRI metric, associated data management platform and/or the entity; and, for each of the one or more occurrences of the one or more anomalies, can determine the likelihood that an occurrence of an anomaly relating to an obligation.

At 3206, for each KRI metric, a weight value can be applied to the risk score associated with the KRI metric to generate a weighted risk score associated with the KRI metric. The governance component can determine respective weight values to apply to the KRI metrics, wherein a weight value for one KRI metric can be different from or same as another weight value of another KRI metric depending on various factors (e.g., an amount of influence or importance a particular KRI metric has relative to another KRI metric), in accordance with the defined data management criteria. For each KRI metric, the governance component can determine (e.g., calculate) or generate the weighted risk score associated with the KRI metric based at least in part on the application of the weight value to the risk score associated with the KRI metric.

At 3208, for each privacy principle, a risk score associated with the privacy principle can be determined based at least in part on respective weighted risk scores associated with respective KRI metrics that are associated with the privacy principle. For each privacy principle, the governance component can determine the risk score associated with the privacy principle based at least in part on (e.g., as a function of) respective weighted risk scores associated with respective KRI metrics that are associated with (e.g., related or applicable to) the privacy principle. For example, for each privacy principle, the governance component can determine the risk score associated with the privacy principle as an average risk score, a median risk score, a trimmed average or mean risk score, or a normalized risk score derived from the applicable weighted risk scores of KRI metrics associated with the privacy principle, or as a peak weighted risk score of all the applicable weighted risk scores associated with the privacy principle. The defined data management criteria can indicate which type of risk score determination (e.g., average, median, trimmed average, trimmed mean, normalized, or peak) is to be used.

At 3210, for each privacy principle, a weight value can be applied to the risk score associated with the privacy principle to generate a weighted risk score associated with the privacy principle. The governance component can determine respective weight values to apply to the respective privacy principles, wherein a weight value for one privacy principle can be different from or same as another weight value of another privacy principle depending on various factors (e.g., an amount of influence or importance a particular privacy principle has relative to another privacy principle), in accordance with the defined data management criteria. For each privacy principle, the governance component can determine (e.g., calculate) or generate the weighted risk score associated with the privacy principle based at least in part on the application of the weight value to the risk score associated with the privacy principle.

At 3212, for each data management platform, a risk score associated with the data management platform can be determined based at least in part on respective weighted risk scores associated with respective privacy principles that are associated with the data management platform. For each data management platform, the governance component can determine the risk score associated with the data management platform based at least in part on (e.g., as a function of) respective weighted risk scores associated with respective privacy principles that are associated with (e.g., related or applicable to) the data management platform. For example, for each data management platform, the governance component can determine the risk score associated with the data management platform as an average, a median, a trimmed average, a trimmed mean, or a normalized risk score derived from the applicable weighted risk scores associated with the data management platform, or as a peak weighted risk score of all the applicable weighted risk scores associated with the privacy principle. The defined data management criteria can indicate which type of risk score determination (e.g., average, median, trimmed average, trimmed mean, normalized, or peak) is to be used At 3214, for each data management platform, a weight value can be applied to the risk score associated with the data management platform to generate a weighted risk score associated with the data management platform. The governance component can determine respective weight values to apply to the respective data management platforms, wherein a weight value for one data management platform can be different from or same as another weight value of another data management platform depending on various factors (e.g., an amount of influence or importance a particular data management platform has relative to another data management platform). For each data management platform, the governance component can determine (e.g., calculate) or generate the weighted risk score associated with the data management platform based at least in part on the application of the weight value to the risk score associated with the data management platform.

At 3216, an overall risk score by platforms and privacy principles can be determined based at least in part on the respective weighted risk scores associated with the data management platforms. The governance component can determine (e.g., calculate) the overall risk score by platforms and privacy principles based at least in part on (e.g., as a function of) the respective weighted risk scores associated with the respective data management platforms, wherein the respective weighted risk scores associated with the respective data management platforms can be derived in part from the respective weighted risk scores associated with the respective privacy principles, such as described herein.

At 3218, the overall risk score by platforms and privacy principles, the risk scores associated with the data management platforms, the risk scores associated with the privacy principles, and/or the risk scores associated with the KRI metrics can be presented via a user interface. The governance platform can facilitate presenting (e.g., displaying or conveying), via the user interface component, the overall risk score by platforms and privacy principles and/or risk scores associated with the data management platforms, privacy principles, and/or the KRI metrics. An authorized and/or authenticated user can view, via the user interface component, the overall risk score by platforms and privacy principles and/or risk scores associated with the data management platforms, privacy principles, and/or the KRI metrics. Additionally or alternatively, the authorized and/or authenticated user can view, via the user interface component, the underlying data that was utilized to determine the respective risk scores.

At this point, the method 3200 can proceed to reference point A, wherein, in some embodiments, the method 3300 of FIG. 33 can proceed from reference point A, as more fully described herein.

FIG. 33 illustrates a flow diagram of another example, non-limiting method 3300 that can desirably (e.g., efficiently or optimally) determine a privacy health index associated with an entity that is associated with a set of data stores that store data of users, in accordance with various aspects and embodiments described herein. The method 3300 can be employed by, for example, a system comprising the DLDP, its constituent or associated platforms (e.g., governance platform), a processor component (e.g., of or associated with the DLDP), and/or a data store (e.g., of or associated with the DLDP). In some embodiments, the method 3300 can proceed from reference point A of the method 3200 of FIG. 32.

At 3302, with regard to the data management platforms and the set of data stores, information relating to risk controls associated with the data management platforms and the set of data stores, exception indicators relating to anomalies associated with the data management platforms and the set of data stores, and remediation measures implemented to remedy or mitigate anomalies associated with the data management platforms and the set of data stores can be analyzed. With regard to the data management platforms and the set of data stores, the governance component can analyze the information relating to the risk controls, the exception indicators, and the remediation measures associated with the data management platforms and the set of data stores.

At 3304, based at least in part on the overall risk score by platforms and privacy principles, and the results of analyzing the respective information relating to the risk controls, the exception indicators, and the remediation measures, a privacy health index associated with the entity, the set of data stores, and/or the data management platforms overall can be determined. In some embodiments, for each data management platform or data store, the governance component can quantify (e.g., determine or calculate a value for) the results of analyzing respective information relating to the risk controls, the exception indicators, and the remediation measures associated with the data management platform or data store. The governance component can determine (e.g., calculate) the privacy health index (e.g., privacy health index value, rating, or score) associated with the entity, the set of data stores, and/or the data management platforms overall based at least in part on (e.g., as a function of) the overall risk score by platforms and privacy principles, and the one or more quantifying values associated with the risk controls, the exception indicators, and the remediation measures, as derived from the analysis of the information.

At 3306, the privacy health index associated with the entity can be presented via a user interface. The governance platform can facilitate presenting (e.g., displaying or conveying), via the user interface component, the privacy health index (e.g., the privacy health index value) associated with the entity, the set of data stores, and/or the data management platforms overall. An authorized and/or authenticated user can view, via the user interface component, the privacy health index. In some embodiments, the privacy health index can be presented, via the user interface component, along with the overall risk score by platforms and privacy principles, risk scores associated with the data management platforms, privacy principles, or KRI metrics, information or quantifying values associated with the risk controls, the exception indicators, and the remediation measures, and/or other desired underlying or related information.

FIG. 34 presents a flow diagram of an example, non-limiting method 3400 that can determine and utilize a set of rules that can correspond to the set of obligations application to a set of data stores, an associated entity, and/or the DLDP and its constituent or associated platforms, in accordance with various aspects and embodiments of the disclosed subject matter. The method 3400 can be employed by, for example, a system comprising the DLDP, its constituent or associated platforms (e.g., rights management platform, governance platform, etc.), a processor component (e.g., of or associated with the DLDP), and/or a data store (e.g., of or associated with the DLDP).

At 3402, a set of laws and a set of agreements associated with a set of data stores, an entity, and/or one or more data management platforms can be analyzed. The one or more data management platforms can be associated with the set of data stores in which items of data associated with users can be stored, wherein the set of data stores can comprise one or more data stores. The set of data stores can be associated with the entity. The set of laws can comprise one or more laws that can relate to data protection, and can be applicable to the jurisdiction(s) (e.g., legal or geographical jurisdiction) associated with the set of data stores, the entity, and/or the one or more data management platforms associated with the entity. The set of agreements can comprise one or more agreements (e.g., contracts) that can relate to data protection, and can be applicable to the set of data stores, the entity, and/or the one or more data management platforms. For instance, the set of laws and/or set of agreements can comprise various provisions that can indicate what the entity is obliged (e.g., required) to do in order to comply with the set of laws and/or set of agreements. The governance component (e.g., employing a rules engine) can analyze the set of laws and the set of agreements to facilitate determining a set of obligations (e.g., legal obligations, such as legal requirements or conditions, and/or contractual obligations, such as contractual requirements or conditions) of or associated with the entity that arise out of the set of laws and the set of agreements.

At 3404, a set of obligations of or associated with the entity, which can arise out of the set of laws and the set of agreements, can be determined based at least in part on the results of the analysis of the set of laws and the set of agreements. Based at least in part on the results of analyzing the set of laws and/or set of agreements, the governance component can identify or determine the set of obligations of or associated with the entity and/or the set of data management platforms.

At 3406, a set of rules, which can correspond to the set of obligations, can be determined based at least in part on the set of obligations. The governance component can determine the set of rules based at least in part on the set of obligations. For example, if a legal or contractual obligation indicates that a particular type of information (e.g., Social Security Number, financial account number, etc.) of users is to be secured from being accessed by unauthorized users, the governance component (e.g., employing the rules engine) can determine and generate a rule that can indicate or provide that the particular type of information of users is to be secured from being accessed by unauthorized users and only can be accessed by users who satisfy certain authorization and/or authentication conditions.

At 3408, the set of rules can be applied to the set of data stores, the entity, and/or the one or more data management platforms to facilitate enforcing the set of rules against the set of data stores, the entity, and/or the one or more data management platforms. The governance platform can apply and enforce the set of rules against the set of data stores, the entity, and/or the one or more data management platforms to facilitate securing (e.g., protecting) items of data associated with users, in accordance with the set of obligations, and accordingly, the set of laws and/or the set of agreements.

FIG. 35 depicts a flow diagram of an example, non-limiting method 3500 that can determine an anomaly with regard to data of users has been detected and initiate a remediation action to remedy or mitigate the anomaly, in accordance with various aspects and embodiments of the disclosed subject matter. The method 3500 can be employed by, for example, a system comprising the DLDP, its constituent or associated platforms (e.g., governance platform, rights management platform, etc.), a processor component (e.g., of or associated with the DLDP), and/or a data store (e.g., of or associated with the DLDP).

At 3502, a set of data stores associated with an entity and a set of data management platforms can be monitored. The governance component can monitor and/or track activity (e.g., requests for data, access of data, usage of data, etc.) of or associated with the set of data stores and the set of data management platforms. The entity that operates, owns, or manages the set of data management platforms can be same or different entity than the one that operates, owns, or manages the set of data stores. Such monitoring and/or tracking can be performed by the governance component to determine whether items of data of users that are stored in or associated with the set of data stores, and/or information relating to the items of data, are being secured in accordance with a set of rules relating to data protection. The governance component can determine the set of rules based at least in part on obligations (e.g., legal and/or contractual obligations) determined from a law(s) or agreement(s) relating to data protection, and associated with the entity and/or the set of data management platforms, as more fully described herein.

At 3504, based at least in part on the monitoring and/or tracking, a determination can be made regarding whether a condition has been satisfied that indicates an anomaly relating to data protection associated with the set of data stores or the set of data management platforms is detected. Based at least in part on the monitoring and/or tracking, the governance component can determine whether a condition has been satisfied (e.g., a defined threshold value of a condition has been met, breached, or exceeded) that indicates that an anomaly (e.g., a non-compliance issue, potential non-compliance issue, or other anomaly) has occurred and has been detected. The condition can relate to a rule relating to data protection being breached or potentially being breached. For example, a breach of a condition and associated rule can relate to an undesirable number of users (e.g., a defined threshold number of users) continuing to receive solicitation emails from the entity, via a platform of or associated with the entity, beyond a defined period of time (e.g., 30 days) after the users have requested to no longer receive such solicitation emails. As some other examples, a breach of a condition and associated rule can relate to a sensitive or private type of information associated with a user being improperly (e.g., illegally or without authorization) collected by a data management platform or improperly accessed from the platform by another user.

If it is determined that the condition has not been satisfied, which can indicate that no anomaly has been detected, the method 3500 can return to reference numeral 3502 wherein the set of data stores and the set of data management platforms can continue to be monitored. If, instead, at reference numeral 3504, it is determined that the condition has been satisfied (e.g., breached), which can indicate that an anomaly has been detected, the method 3500 can proceed to reference numeral 3506.

At 3506, in response to detecting that the condition has been satisfied indicating the anomaly is detected, an exception indicator can be generated, wherein the exception indicator can indicate that the anomaly has been detected. In response to detecting that the condition has been satisfied indicating the anomaly is detected, the governance component, employing an exception engine, can generate the exception indicator (e.g., exception ticket or message).

At 3508, the exception indicator can be communicated to facilitate remediation of the anomaly. In some embodiments, the exception engine can communicate the exception indicator to a remediation component and/or a person associated with the entity to facilitate remediation of the anomaly.

At 3510, a remediation action can be performed to remedy or mitigate the anomaly. The remediation component, of or associated with the governance component, and/or the person can perform a desired remediation action (e.g., remediation measure) to remedy or mitigate the anomaly. For example, if the anomaly involves an undesirable number of users (e.g., a defined threshold number of users) continuing to receive solicitation emails from the entity, via a platform of or associated with the entity, beyond a defined period of time after the users have requested to no longer receive such solicitation emails, the desired remediation action can comprise instructing the person of or associated with the entity to review code relating to the sending of solicitation emails and, if appropriate, to modify the code to ensure that undesired solicitation emails are no longer sent to users who have requested to no longer receive such solicitation emails. For instance, a notification component can send a notification message, comprising information relating to the exception indicator, to the person to notify the person of the anomaly and request that a remediation action be taken or performed to remedy or mitigate the anomaly.

In some embodiments, the exception ticket or notification message can request that the person validate (e.g., verify) the anomaly to ensure that an actual anomaly exists and has to be addressed (e.g., remediated). If the person determines that the anomaly is not valid, the person can send a message (e.g., using communication device) to the governance platform, wherein the message can indicate the anomaly was determined to not be valid, so no remediation action was taken.

At 3512, remediation information, which can indicate that the anomaly has been remedied or mitigated, can be received. In response to the anomaly being remedied or mitigated, the remediation component can communicate the remediation information, which can indicate that the anomaly has been remedied or mitigated, to the exception engine or other component of the governance component to indicate that the anomaly has been remedied or mitigated to bring the entity and/or associated data management platform into compliance with the rule(s) and associated obligation (s).

At 3514, information relating to a KRI metric(s) associated with the set of data stores and/or a data management platform(s), a risk score(s) associated with the KRI metric (s), platform(s), or set of data stores, and/or a privacy health index associated with the entity can be updated in response to the anomaly being remedied or mitigated. In response to the remediation information indicating that the anomaly has been remedied or mitigated, the governance component can update the information relating to the KRI metric(s), the risk score(s) associated with the KRI metric(s), platform(s), or set of data stores, and/or the privacy health index associated with the entity to indicate or reflect that (e.g., to take into account that) the anomaly has been remedied or mitigated. For example, the governance component can update a risk score associated with the KRI metric or associated platform to decrease the risk score and/or can update the privacy health index to increase the privacy health index based at least in part on the remediation information indicating that the anomaly has been remedied or mitigated.

Figure 36:
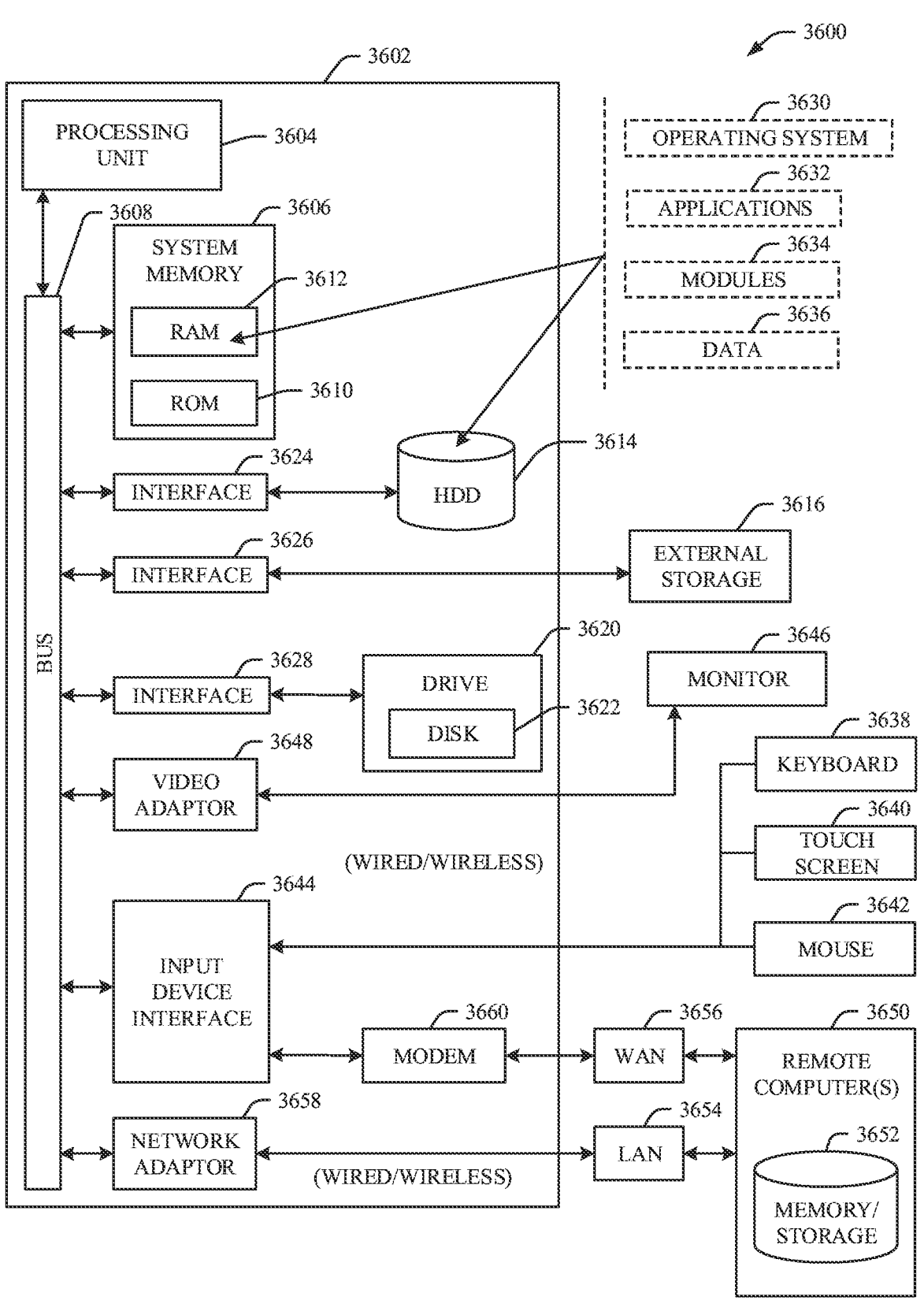
FIG. 36 illustrates a block diagram of an example, non-limiting operating environment in which one or more embodiments described herein can be facilitated.

In order to provide additional context for various embodiments described herein, FIG. 36 and the following discussion are intended to provide a brief, general description of a suitable computing environment 3600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 36, the example environment 3600 for implementing various embodiments of the aspects described herein includes a computer 3602, the computer 3602 including a processing unit 3604, a system memory 3606 and a system bus 3608. The system bus 3608 couples system components including, but not limited to, the system memory 3606 to the processing unit 3604. The processing unit 3604 can be any of various commercially available processors. Dual microprocessors and other multi-processor architectures can also be employed as the processing unit 3604.

The system bus 3608 can be any of several types of bus structure that can further interconnect to a memory bus (with or without a memory controller), a peripheral bus, and a local bus using any of a variety of commercially available bus architectures. The system memory 3606 includes ROM 3610 and RAM 3612. A basic input/output system (BIOS) can be stored in a non-volatile memory such as ROM, erasable programmable read only memory (EPROM), EEPROM, which BIOS contains the basic routines that help to transfer information between elements within the computer 3602, such as during startup. The RAM 3612 can also include a high-speed RAM such as static RAM for caching data.

The computer 3602 further includes an internal hard disk drive (HDD) 3614 (e.g., EIDE, SATA), one or more external storage devices 3616 (e.g., a magnetic floppy disk drive (FDD) 3616, a memory stick or flash drive reader, a memory card reader, etc.) and a drive 3620, e.g., such as a solid state drive, an optical disk drive, which can read or write from a disk 3622, such as a CD-ROM disc, a DVD, a BD, etc. Alternatively, where a solid state drive is involved, disk 3622 would not be included, unless separate. While the internal HDD 3614 is illustrated as located within the computer 3602, the internal HDD 3614 can also be configured for external use in a suitable chassis (not shown). Additionally, while not shown in environment 3600, a solid state drive (SSD) could be used in addition to, or in place of, an HDD 3614. The HDD 3614, external storage device(s) 3616 and drive 3620 can be connected to the system bus 3608 by an HDD interface 3624, an external storage interface 3626 and a drive interface 3628, respectively. The interface 3624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3612, including an operating system 3630, one or more application programs 3632, other program modules 3634 and program data 3636. All or portions of the operating system, applications, modules, and/or data can also be cached in the RAM 3612. The systems and methods described herein can be implemented utilizing various commercially available operating systems or combinations of operating systems.

Computer 3602 can optionally comprise emulation technologies. For example, a hypervisor (not shown) or other intermediary can emulate a hardware environment for operating system 3630, and the emulated hardware can optionally be different from the hardware illustrated in FIG. 36. In such an embodiment, operating system 3630 can comprise one virtual machine (VM) of multiple VMs hosted at computer 3602. Furthermore, operating system 3630 can provide runtime environments, such as the Java runtime environment or the .NET framework, for applications 3632. Runtime environments are consistent execution environments that allow applications 3632 to run on any operating system that includes the runtime environment. Similarly, operating system 3630 can support containers, and applications 3632 can be in the form of containers, which are lightweight, standalone, executable packages of software that include, e.g., code, runtime, system tools, system libraries and settings for an application.

Further, computer 3602 can be enable with a security module, such as a trusted processing module (TPM). For instance with a TPM, boot components hash next in time boot components, and wait for a match of results to secured values, before loading a next boot component. This process can take place at any layer in the code execution stack of computer 3602, e.g., applied at the application execution level or at the operating system (OS) kernel level, thereby enabling security at any level of code execution.

A user can enter commands and information into the computer 3602 through one or more wired/wireless input devices, e.g., a keyboard 3638, a touch screen 3640, and a pointing device, such as a mouse 3642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3604 through an input device interface 3644 that can be coupled to the system bus 3608, but can be connected by other interfaces, such as a parallel port, an IEEE 1394 serial port, a game port, a USB port, an IR interface, a BLUETOOTH® interface, etc.

A monitor 3646 or other type of display device can be also connected to the system bus 3608 via an interface, such as a video adapter 3648. In addition to the monitor 3646, a computer typically includes other peripheral output devices (not shown), such as speakers, printers, etc.

The computer 3602 can operate in a networked environment using logical connections via wired and/or wireless communications to one or more remote computers, such as a remote computer(s) 3650. The remote computer(s) 3650 can be a workstation, a server computer, a router, a personal computer, portable computer, microprocessor-based entertainment appliance, a peer device or other common network node, and typically includes many or all of the elements described relative to the computer 3602, although, for purposes of brevity, only a memory/storage device 3652 is illustrated. The logical connections depicted include wired/wireless connectivity to a local area network (LAN) 3654 and/or larger networks, e.g., a wide area network (WAN) 3656. Such LAN and WAN networking environments are commonplace in offices and companies, and facilitate enterprise-wide computer networks, such as intranets, all of which can connect to a global communications network, e.g., the Internet.

When used in a LAN networking environment, the computer 3602 can be connected to the local network 3654 through a wired and/or wireless communication network interface or adapter 3658. The adapter 3658 can facilitate wired or wireless communication to the LAN 3654, which can also include a wireless access point (AP) disposed thereon for communicating with the adapter 3658 in a wireless mode.

When used in a WAN networking environment, the computer 3602 can include a modem 3660 or can be connected to a communications server on the WAN 3656 via other means for establishing communications over the WAN 3656, such as by way of the Internet. The modem 3660, which can be internal or external and a wired or wireless device, can be connected to the system bus 3608 via the input device interface 3644. In a networked environment, program modules depicted relative to the computer 3602 or portions thereof, can be stored in the remote memory/storage device 3652. It will be appreciated that the network connections shown are example and other means of establishing a communications link between the computers can be used.

When used in either a LAN or WAN networking environment, the computer 3602 can access cloud storage systems or other network-based storage systems in addition to, or in place of, external storage devices 3616 as described above, such as but not limited to a network virtual machine providing one or more aspects of storage or processing of information. Generally, a connection between the computer 3602 and a cloud storage system can be established over a LAN 3654 or WAN 3656 e.g., by the adapter 3658 or modem 3660, respectively. Upon connecting the computer 3602 to an associated cloud storage system, the external storage interface 3626 can, with the aid of the adapter 3658 and/or modem 3660, manage storage provided by the cloud storage system as it would other types of external storage. For instance, the external storage interface 3626 can be configured to provide access to cloud storage sources as if those sources were physically connected to the computer 3602.

The computer 3602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 37 is a schematic block diagram of a sample computing environment 3700 with which the disclosed subject matter can interact. The sample computing environment 3700 includes one or more client(s) 3710. The client(s) 3710 can be hardware and/or software (e.g., threads, processes, computing devices). The sample computing environment 3700 also includes one or more server(s) 3730. The server(s) 3730 can also be hardware and/or software (e.g., threads, processes, computing devices). The servers 3730 can house threads to perform transformations by employing one or more embodiments as described herein, for example. One possible communication between a client 3710 and a server 3730 can be in the form of a data packet adapted to be transmitted between two or more computer processes. The sample computing environment 3700 includes a communication framework 3750 that can be employed to facilitate communications between the client(s) 3710 and the server(s) 3730. The client(s) 3710 are operably connected to one or more client data store(s) 3720 that can be employed to store information local to the client(s) 3710. Similarly, the server (s) 3730 are operably connected to one or more server data store(s) 3740 that can be employed to store information local to the servers 3730.

The disclosed subject matter can be a system, a method, an apparatus and/or a computer program product at any possible technical detail level of integration. The computer program product can include a computer readable storage medium (or media) having computer readable program instructions thereon for causing a processor to carry out aspects of the disclosed subject matter. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of the disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

It is to be appreciated and understood that components (e.g., communication device, communication network, pool management component, pool component, event component, contact management component, artificial intelligence component, processor component, data store, etc.), as described with regard to a particular system or method, can include the same or similar functionality as respective components (e.g., respectively named components or similarly named components) as described with regard to other systems or methods disclosed herein.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor; and
a non-transitory computer readable medium having stored thereon instructions that are executable by the processor to perform operations comprising:
determining, by a trained machine learning model, a risk score for each of a plurality of items of data, wherein the determination of the risk score is based on at least one of an impact of an anomaly or a likelihood of the anomaly, the determination of the risk score is further based on an impact of an occurrence of non-compliance with an obligation, and the obligation relates to protection of the plurality of items of data;
for each of the plurality of items having a respective risk score above a threshold value, determining a predicted effectiveness for each of a set of response actions on the determined risk score; and
automatically executing the response action of the set of response actions having a highest respective predicted effectiveness.

2. The system of claim 1, wherein determining the predicted risk score for an item of the plurality of items of data comprises:
assigning, to the item, an integer indicative of a predicted negative effect of the anomaly on an entity associated with the item;
assigning, to the item, a percentage value indicative of a probability that the anomaly occurs; and
generating the risk score based on the assigned integer and on the assigned percentage value.

3. The system of claim 1, wherein determining the predicted effectiveness for a response action comprises determining a change in the risk score for an item before and after the response action is implemented.

4. The system of claim 1, wherein determining the predicted risk score for each of the plurality of items of data comprises:
defining one or more batches of items;

assigning each of the plurality of items of data to a respective batch based on a location of a respective data store on which each of the plurality of items of data is stored; and
scanning each batch of items separately from other batches based on requirements associated with the location of the respective data store.

5. The system of claim 4, wherein:
the non-transitory computer readable medium further comprises a highly restricted zone (HRZ); and
the plurality of items of data are stored in the HRZ during the batching and the scanning.

6. The system of claim 1, wherein the determined risk score is based on requirements associated with a geographic location of an entity associated with the respective item of data.

7. The system of claim 1, wherein the operations further comprise:
generating a graphical user interface comprising a visual representation of each of the plurality of items and of the risk score corresponding to each of the plurality of items.

8. A system, comprising:
a processor; and
a non-transitory computer readable medium having stored thereon instructions that are executable by the processor to cause the system to perform operations comprising:
receiving, via a graphical user interface, an indication of a dataset;
scanning the dataset to determine at least one characteristic of the dataset, the at least one characteristic comprising one or more of:
an entity associated with the dataset;
a type of datum within the dataset; or
an applicable jurisdiction for the dataset;
retrieving a set of requirements for the dataset based on the at least one characteristic;
determining a risk score relating to compliance of the dataset with the set of requirements, wherein the determination of the risk score is based on an impact of an occurrence of non-compliance with the set of requirements, and the set of requirements relates to protection of the dataset; and
in response to the risk score indicating that the dataset complies with the set of requirements, presenting an interactive element on the graphical user interface.

9. The system of claim 8, wherein an interaction with the interactive element initiates a recommended remediation action for the dataset in response to the determined compliance indicating an anomaly in the dataset.

10. The system of claim 9, wherein the operations further comprise:
determining an impact of the anomaly;
generating a remediation score for each of a plurality of remediation actions, the remediation score indicative of an amount that the remediation action would reduce the impact of the anomaly; and
designating the recommended remediation action as the remediation action having a highest respective remediation score.

11. The system of claim 8, wherein an interaction with the interactive element initiates access to the dataset in response to the determined compliance indicating that the dataset is compliant with the set of requirements.

12. The system of claim 11, wherein the operations further comprise:

receiving, through the graphical user interface, a request to access the dataset, the request comprising an identity of a requesting user and a scope of the requested access; and selectively approving the request based on a set of rights associated with the dataset.

13. The system of claim 8, wherein the set of requirements is associated with a geographic location of an entity associated with the dataset.

14. The system of claim 13, wherein:

the nature of the request comprises deletion of data associated with the requesting user; and selectively approving the request comprises, in response to determining that the requesting user has the right of erasure based on the identity of the requesting user, deleting the data from the dataset.

15. The system of claim 13, wherein:

the nature of the request comprises downloading of data associated with the requesting user;

selectively approving the request comprises, in response to determining that the requesting user does not have the right to data portability based on the identity of the requesting user, presenting a notification on the graphical user interface.

16. The system of claim 13, wherein:

the nature of the request comprises viewing of data associated with the requesting user; and selectively approving the request comprises, in response to determining that the requesting user has the right of access based on the identity of the requesting user, generating a data map of data stores within the dataset, the data map identifying types and locations of data to which the requesting user is allowed access.

17. A method comprising:

retrieving a set of data stores;

scanning the set of data stores to determine a jurisdiction for the set of data stores;

determining a set of requirements for the set of data stores based on the determined jurisdiction;

determining, for each data store, a level of compliance based on the set of requirements;

determining, for each data store, a risk score based on the level of compliance and an impact of an occurrence of non-compliance with the set of requirements;

generating a graphical user interface having a visual representation of at least one of the level of compliance of each data store in the set or the risk score of each data store in the set; and in response to receiving, via the graphical user interface, an input on an icon corresponding to a data store having a respective level of compliance below a threshold value, presenting a proposed remedial action for the data store.

18. The method of claim 17, further comprising:

receiving, via the graphical user interface, an identity of a user; and generating, for each data store, based on the received identity, a visual marker indicating whether data associated with the user are stored within the respective data store.

19. The method of claim 17, further comprising:

receiving, via the graphical user interface, a request to access a data store, the request comprising an identity of a user and a nature of the requested access;

selectively approving the request based on a set of rights associated with the determined jurisdiction; and presenting, on the graphical user interface, a notification indicative of the selective approval.

20. The method of claim 19, wherein the presented notification comprises a denial of the request in response to determining that the nature of the request is not included in the set of rights.

* * * * *